(12) United States Patent
Uken et al.

(10) Patent No.: US 10,829,052 B2
(45) Date of Patent: Nov. 10, 2020

(54) REARVIEW MIRROR ASSEMBLY FOR VEHICLE

(71) Applicant: DONNELLY CORPORATION, Holland, MI (US)

(72) Inventors: John T. Uken, Jenison, MI (US); Lee Karner, Holland, MI (US); Richard R. Hook, Hudsonville, MI (US); Niall R. Lynam, Holland, MI (US)

(73) Assignee: DONNELLY CORPORATION, Holland, MI (US)

( * ) Notice: Subject to any disclaimer, the term of this patent is extended or adjusted under 35 U.S.C. 154(b) by 0 days.

(21) Appl. No.: 16/658,201

(22) Filed: Oct. 21, 2019

(65) Prior Publication Data
US 2020/0047673 A1 Feb. 13, 2020

Related U.S. Application Data

(60) Continuation of application No. 16/227,643, filed on Dec. 20, 2018, now Pat. No. 10,449,903, which is a
(Continued)

(51) Int. Cl.
*B60R 1/04* (2006.01)
*B60R 1/12* (2006.01)
(Continued)

(52) U.S. Cl.
CPC ............... *B60R 1/12* (2013.01); *B60K 35/00* (2013.01); *B60R 1/02* (2013.01); *B60R 1/04* (2013.01);
(Continued)

(58) Field of Classification Search
CPC ........... B60R 1/04; B60R 1/083; B60R 1/086; B60R 1/088; B60R 1/12; B60R 1/1207; B60R 2011/0033; G02B 5/0808
(Continued)

(56) References Cited

U.S. PATENT DOCUMENTS 1,096,452 A 5/1914 Perrin
1,563,258 A 11/1925 Cunningham
(Continued)

FOREIGN PATENT DOCUMENTS

DE 2362191 A1 6/1975
DE 2808260 A1 8/1979
(Continued)

*Primary Examiner* — Ricky D Shafer
(74) *Attorney, Agent, or Firm* — Honigman LLP

(57) ABSTRACT

A vehicular interior rearview mirror assembly includes a prismatic mirror reflective element having a glass substrate with a planar front surface and a circumferential edge along the periphery of the glass substrate. A plastic molding is circumferentially disposed about the circumferential edge of the glass substrate without overlapping onto the front surface of the glass substrate, with an outermost part of the plastic molding providing a curved transition between the planar front surface of the prismatic mirror reflective element and another part of the plastic molding. The outermost part of the plastic molding includes an outer curved surface and lacks an exposed sharp edge. The plastic molding includes a portion of a mirror housing of the interior rearview mirror assembly. A mounting structure is configured to mount the vehicular interior rearview mirror assembly at an interior portion of the equipped vehicle.

56 Claims, 39 Drawing Sheets

Related U.S. Application Data division of application No. 15/727,685, filed on Oct. 9, 2017, now Pat. No. 10,166,927, which is a continuation of application No. 15/413,465, filed on Jan. 24, 2017, now Pat. No. 9,783,115, which is a continuation of application No. 13/964,135, filed on Aug. 12, 2013, now Pat. No. 9,557,584, which is a continuation of application No. 13/689,800, filed on Nov. 30, 2012, now Pat. No. 8,508,384, which is a continuation of application No. 13/284,197, filed on Oct. 28, 2011, now Pat. No. 8,325,055, which is a continuation of application No. 13/035,297, filed on Feb. 25, 2011, now Pat. No. 8,049,640, which is a continuation of application No. 11/926,882, filed on Oct. 29, 2007, now Pat. No. 7,978,094, which is a continuation of application No. 10/556,754, filed as application No. PCT/US2004/015424 on May 18, 2004, now Pat. No. 7,289,037.

(60) Provisional application No. 60/556,259, filed on Mar. 25, 2004, provisional application No. 60/525,537, filed on Nov. 26, 2003, provisional application No. 60/471,546, filed on May 19, 2003.

(51) Int. Cl.
  *G02B 5/08*      (2006.01)
  *B60R 1/08*      (2006.01)
  *B60K 35/00*     (2006.01)
  *B60R 1/02*      (2006.01)
  *B60R 11/02*     (2006.01)
  *G02F 1/157*     (2006.01)
  *B60R 11/00*     (2006.01)

(52) U.S. Cl.
  CPC .............. *B60R 1/086* (2013.01); *B60R 1/088* (2013.01); *B60R 1/1207* (2013.01); *B60R 11/02* (2013.01); *G02B 5/0808* (2013.01); *G02F 1/157* (2013.01); *B60K 2370/777* (2019.05); *B60R 11/0235* (2013.01); *B60R 2001/1215* (2013.01); *B60R 2011/0033* (2013.01)

(58) Field of Classification Search
  USPC .................................. 359/604, 606, 839, 872
  See application file for complete search history.

(56) References Cited

U.S. PATENT DOCUMENTS

| | | |
|---|---|---|
| 1,949,138 A | 2/1934 | Bell |
| 2,069,368 A | 2/1937 | Horinstein |
| 2,166,303 A | 7/1939 | Hodney et al. |
| 2,263,382 A | 11/1941 | Gotzinger |
| 2,397,947 A | 4/1946 | Colbert |
| 2,414,223 A | 1/1947 | De Virgilis |
| 2,457,348 A | 12/1948 | Chambers |
| 2,561,582 A | 7/1951 | Marbel |
| 2,580,014 A | 12/1951 | Gazda |
| 2,616,335 A | 11/1952 | Mazur |
| 2,913,958 A | 11/1959 | Mead et al. |
| 2,993,410 A | 7/1961 | Bedell et al. |
| 3,004,473 A | 10/1961 | Athur et al. |
| 3,029,701 A | 4/1962 | Nelson |
| 3,059,539 A | 10/1962 | Meade |
| 3,075,430 A | 1/1963 | Woodward et al. |
| 3,112,656 A | 12/1963 | Ponce |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,253,508 A | 5/1966 | Warhol |
| 3,266,016 A | 8/1966 | Maru |
| 3,280,701 A | 10/1966 | Donnelly et al. |
| 3,432,225 A | 3/1969 | Rock |
| 3,439,977 A | 4/1969 | Meade |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,550,456 A | 12/1970 | Pringle |
| 3,557,265 A | 1/1971 | Chisholm et al. |
| 3,565,985 A | 2/1971 | Schrenk et al. |
| 3,612,654 A | 10/1971 | Klein et al. |
| 3,614,210 A | 10/1971 | Caplan |
| 3,628,851 A | 12/1971 | Robertson |
| 3,656,830 A | 4/1972 | Kurschner et al. |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,815,976 A | 6/1974 | Kurz, Jr. |
| 3,821,590 A | 6/1974 | Kosman et al. |
| 3,837,129 A | 9/1974 | Losell |
| 3,860,847 A | 1/1975 | Carley |
| 3,862,798 A | 1/1975 | Hopkins |
| 3,870,404 A | 3/1975 | Wilson et al. |
| 3,874,773 A | 4/1975 | Kurz, Jr. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage, Jr. |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Giglia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |

(56) References Cited

U.S. PATENT DOCUMENTS

| | | |
|---|---|---|
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,581,827 A | 4/1986 | Higashi |
| 4,588,267 A | 5/1986 | Pastore |
| 4,603,946 A | 8/1986 | Kato et al. |
| 4,623,222 A | 11/1986 | Itoh et al. |
| 4,625,210 A | 11/1986 | Sagl |
| 4,626,850 A | 12/1986 | Chey |
| 4,630,040 A | 12/1986 | Haertling |
| 4,630,109 A | 12/1986 | Barton |
| 4,630,904 A | 12/1986 | Pastore |
| 4,634,835 A | 1/1987 | Suzuki |
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,671,619 A | 6/1987 | Kamimori et al. |
| 4,678,281 A | 7/1987 | Bauer |
| 4,679,906 A | 7/1987 | Brandenburg |
| 4,682,083 A | 7/1987 | Alley |
| 4,692,798 A | 9/1987 | Seko et al. |
| 4,694,295 A | 9/1987 | Miller et al. |
| 4,697,883 A | 10/1987 | Suzuki et al. |
| 4,701,022 A | 10/1987 | Jacob |
| 4,702,566 A | 10/1987 | Tukude |
| 4,704,740 A | 11/1987 | McKee et al. |
| 4,711,544 A | 12/1987 | Iino et al. |
| 4,712,879 A | 12/1987 | Lynam et al. |
| 4,713,685 A | 12/1987 | Nishimura et al. |
| RE32,576 E | 1/1988 | Pastore |
| 4,718,756 A | 1/1988 | Lancaster |
| 4,721,364 A | 1/1988 | Itoh et al. |
| 4,729,068 A | 3/1988 | Ohe |
| 4,729,076 A | 3/1988 | Masami et al. |
| 4,731,669 A | 3/1988 | Hayashi et al. |
| 4,733,335 A | 3/1988 | Serizawa et al. |
| 4,733,336 A | 3/1988 | Skogler et al. |
| 4,740,838 A | 4/1988 | Mase et al. |
| 4,761,061 A | 8/1988 | Nishiyama et al. |
| 4,773,740 A | 9/1988 | Kawakami et al. |
| 4,780,752 A | 10/1988 | Angerstein et al. |
| 4,781,436 A | 11/1988 | Armbruster |
| 4,789,904 A | 12/1988 | Peterson |
| 4,793,690 A | 12/1988 | Gahan et al. |
| 4,793,695 A | 12/1988 | Wada et al. |
| 4,794,261 A | 12/1988 | Rosen |
| D299,491 S | 1/1989 | Masuda |
| 4,799,768 A | 1/1989 | Gahan |
| 4,803,599 A | 2/1989 | Trine et al. |
| 4,807,096 A | 2/1989 | Skogler et al. |
| 4,820,933 A | 4/1989 | Hong et al. |
| 4,825,232 A | 4/1989 | Howdle |
| 4,826,289 A | 5/1989 | Vandenbrink et al. |
| 4,827,086 A | 5/1989 | Rockwell |
| 4,837,551 A | 6/1989 | Iino |
| 4,842,378 A | 6/1989 | Flasck et al. |
| 4,845,402 A | 7/1989 | Smith |
| 4,847,772 A | 7/1989 | Michalopoulos et al. |
| 4,855,161 A | 8/1989 | Moser et al. |
| 4,855,550 A | 8/1989 | Schultz, Jr. |
| 4,859,813 A | 8/1989 | Rockwell |
| 4,859,867 A | 8/1989 | Larson et al. |
| 4,860,171 A | 8/1989 | Kojima |
| 4,860,815 A | 8/1989 | Parker et al. |
| 4,862,594 A | 9/1989 | Schierbeek et al. |
| 4,871,917 A | 10/1989 | O'Farrell et al. |
| 4,872,051 A | 10/1989 | Dye |
| 4,882,466 A | 11/1989 | Friel |
| 4,882,565 A | 11/1989 | Gallmeyer |
| 4,883,349 A | 11/1989 | Mittelhauser |
| 4,884,135 A | 11/1989 | Schiffman |
| 4,886,960 A | 12/1989 | Molyneux et al. |
| 4,889,412 A | 12/1989 | Clerc et al. |
| 4,891,828 A | 1/1990 | Kawazoe |
| 4,892,345 A | 1/1990 | Rachael, III |
| 4,902,103 A | 2/1990 | Miyake et al. |
| 4,902,108 A | 2/1990 | Byker |
| 4,906,085 A | 3/1990 | Sugihara et al. |
| 4,909,606 A | 3/1990 | Wada et al. |
| 4,910,591 A | 3/1990 | Petrossian et al. |
| 4,916,374 A | 4/1990 | Schierbeek et al. |
| 4,926,170 A | 5/1990 | Beggs et al. |
| 4,930,742 A | 6/1990 | Schofield et al. |
| 4,933,814 A | 6/1990 | Sanai |
| 4,935,665 A | 6/1990 | Murata |
| 4,936,533 A | 6/1990 | Adams et al. |
| 4,937,796 A | 6/1990 | Tendler |
| 4,937,945 A | 7/1990 | Schofield et al. |
| 4,943,796 A | 7/1990 | Lee |
| 4,948,242 A | 8/1990 | Desmond et al. |
| 4,953,305 A | 9/1990 | Van Lente et al. |
| 4,956,591 A | 9/1990 | Schierbeek et al. |
| 4,957,349 A | 9/1990 | Clerc et al. |
| 4,959,247 A | 9/1990 | Moser et al. |
| 4,959,865 A | 9/1990 | Stettiner et al. |
| 4,970,653 A | 11/1990 | Kenue |
| 4,973,844 A | 11/1990 | O'Farrell et al. |
| 4,974,122 A | 11/1990 | Shaw |
| 4,978,196 A | 12/1990 | Suzuki et al. |
| 4,983,951 A | 1/1991 | Igarashi et al. |
| 4,985,809 A | 1/1991 | Matsui et al. |
| 4,987,357 A | 1/1991 | Masaki |
| 4,996,083 A | 2/1991 | Moser et al. |
| 5,001,386 A | 3/1991 | Sullivan et al. |
| 5,001,558 A | 3/1991 | Burley et al. |
| 5,005,213 A | 4/1991 | Hanson et al. |
| 5,006,971 A | 4/1991 | Jenkins |
| 5,014,167 A | 5/1991 | Roberts |
| 5,016,988 A | 5/1991 | Iimura |
| 5,016,996 A | 5/1991 | Ueno |
| 5,017,903 A | 5/1991 | Krippelz, Sr. |
| 5,018,839 A | 5/1991 | Yamamoto et al. |
| 5,027,200 A | 6/1991 | Petrossian et al. |
| 5,037,182 A | 8/1991 | Groves et al. |
| 5,038,255 A | 8/1991 | Nishihashi et al. |
| 5,052,163 A | 10/1991 | Czekala |
| 5,056,899 A | 10/1991 | Warszawski |
| 5,057,974 A | 10/1991 | Mizobe |
| 5,058,851 A | 10/1991 | Lawlor et al. |
| 5,059,015 A | 10/1991 | Tran |
| 5,066,108 A | 11/1991 | McDonald |
| 5,066,112 A | 11/1991 | Lynam et al. |
| 5,069,535 A | 12/1991 | Baucke et al. |
| 5,070,323 A | 12/1991 | Iino et al. |
| 5,073,012 A | 12/1991 | Lynam |
| 5,076,673 A | 12/1991 | Lynam et al. |
| 5,076,674 A | 12/1991 | Lynam |
| 5,078,480 A | 1/1992 | Warszawski |
| 5,096,287 A | 3/1992 | Kakinami et al. |
| 5,100,095 A | 3/1992 | Haan et al. |

(56) References Cited

U.S. PATENT DOCUMENTS

| | | |
|---|---|---|
| 5,101,139 A | 3/1992 | Lechter |
| 5,105,127 A | 4/1992 | Lavaud et al. |
| 5,115,346 A | 5/1992 | Lynam |
| 5,117,346 A | 5/1992 | Gard |
| 5,119,220 A | 6/1992 | Narita et al. |
| 5,121,200 A | 6/1992 | Choi |
| 5,122,619 A | 6/1992 | Dlubak |
| 5,123,077 A | 6/1992 | Endo et al. |
| 5,124,845 A | 6/1992 | Shimojo |
| 5,124,890 A | 6/1992 | Choi et al. |
| 5,128,799 A | 7/1992 | Byker |
| 5,130,898 A | 7/1992 | Akahane |
| 5,131,154 A | 7/1992 | Schierbeek et al. |
| 5,133,141 A | 7/1992 | Bane |
| 5,134,507 A | 7/1992 | Ishii |
| 5,134,549 A | 7/1992 | Yokoyama |
| 5,135,298 A | 8/1992 | Feltman |
| 5,136,483 A | 8/1992 | Schoniger et al. |
| 5,140,455 A | 8/1992 | Varaprasad et al. |
| 5,140,465 A | 8/1992 | Yasui et al. |
| 5,142,407 A | 8/1992 | Varaprasad et al. |
| 5,145,609 A | 9/1992 | Varaprasad et al. |
| 5,150,232 A | 9/1992 | Gunkima et al. |
| 5,151,816 A | 9/1992 | Varaprasad et al. |
| 5,151,824 A | 9/1992 | O'Farrell |
| 5,154,617 A | 10/1992 | Suman et al. |
| 5,158,638 A | 10/1992 | Osanami et al. |
| 5,160,200 A | 11/1992 | Cheselske |
| 5,160,201 A | 11/1992 | Wrobel |
| 5,166,815 A | 11/1992 | Elderfield |
| 5,168,378 A | 12/1992 | Black |
| 5,173,881 A | 12/1992 | Sindle |
| 5,177,031 A | 1/1993 | Buchmann et al. |
| 5,178,448 A | 1/1993 | Adams et al. |
| 5,179,471 A | 1/1993 | Caskey et al. |
| 5,183,099 A | 2/1993 | Bechu |
| 5,184,956 A | 2/1993 | Langlais et al. |
| 5,189,537 A | 2/1993 | O'Farrell |
| 5,193,029 A | 3/1993 | Schofield et al. |
| 5,197,562 A | 3/1993 | Kakinami et al. |
| 5,202,950 A | 4/1993 | Arego et al. |
| 5,207,492 A | 5/1993 | Roberts |
| 5,210,967 A | 5/1993 | Brown |
| 5,212,819 A | 5/1993 | Wada |
| 5,214,408 A | 5/1993 | Asayama |
| 5,217,794 A | 6/1993 | Schrenk |
| 5,223,814 A | 6/1993 | Suman |
| 5,223,844 A | 6/1993 | Mansell et al. |
| 5,229,975 A | 7/1993 | Truesdell et al. |
| 5,230,400 A | 7/1993 | Kakinami et al. |
| 5,233,461 A | 8/1993 | Dornan et al. |
| 5,235,316 A | 8/1993 | Qualizza |
| 5,239,405 A | 8/1993 | Varaprasad et al. |
| 5,239,406 A | 8/1993 | Lynam |
| 5,243,417 A | 9/1993 | Pollard |
| 5,245,422 A | 9/1993 | Borcherts et al. |
| 5,252,354 A | 10/1993 | Cronin et al. |
| 5,253,109 A | 10/1993 | O'Farrell et al. |
| 5,255,442 A | 10/1993 | Schierbeek et al. |
| 5,260,626 A | 11/1993 | Takase et al. |
| 5,277,986 A | 1/1994 | Cronin et al. |
| 5,280,555 A | 1/1994 | Ainsburg |
| 5,285,060 A | 2/1994 | Larson et al. |
| 5,289,321 A | 2/1994 | Secor |
| 5,296,924 A | 3/1994 | de Saint Blancard et al. |
| 5,303,075 A | 4/1994 | Wada et al. |
| 5,303,205 A | 4/1994 | Gauthier et al. |
| 5,304,980 A | 4/1994 | Maekawa |
| 5,305,012 A | 4/1994 | Faris |
| 5,307,136 A | 4/1994 | Saneyoshi |
| 5,313,335 A | 5/1994 | Gray et al. |
| 5,325,096 A | 6/1994 | Pakett |
| 5,325,386 A | 6/1994 | Jewell et al. |
| 5,327,288 A | 7/1994 | Wellington et al. |
| 5,330,149 A | 7/1994 | Haan et al. |
| 5,331,312 A | 7/1994 | Kudoh |
| 5,331,358 A | 7/1994 | Schurle et al. |
| 5,339,075 A | 8/1994 | Abst et al. |
| 5,339,529 A | 8/1994 | Lindberg |
| 5,341,437 A | 8/1994 | Nakayama |
| D351,370 S | 10/1994 | Lawlor et al. |
| 5,354,965 A | 10/1994 | Lee |
| 5,355,118 A | 10/1994 | Fukuhara |
| 5,355,245 A | 10/1994 | Lynam |
| 5,355,284 A | 10/1994 | Roberts |
| 5,361,190 A | 11/1994 | Roberts et al. |
| 5,363,294 A | 11/1994 | Yamamoto et al. |
| 5,371,659 A | 12/1994 | Pastrick et al. |
| 5,373,482 A | 12/1994 | Gauthier |
| 5,379,146 A | 1/1995 | Defendini |
| 5,386,285 A | 1/1995 | Asayama |
| 5,386,306 A | 1/1995 | Gunjima et al. |
| 5,400,158 A | 3/1995 | Ohnishi et al. |
| 5,402,103 A | 3/1995 | Tashiro |
| 5,406,395 A | 4/1995 | Wilson et al. |
| 5,406,414 A | 4/1995 | O'Farrell et al. |
| 5,408,353 A | 4/1995 | Nichols et al. |
| 5,408,357 A | 4/1995 | Beukema |
| 5,410,346 A | 4/1995 | Saneyoshi et al. |
| 5,412,511 A | 5/1995 | Beinhauer |
| 5,414,439 A | 5/1995 | Groves et al. |
| 5,414,461 A | 5/1995 | Kishi et al. |
| 5,416,313 A | 5/1995 | Larson et al. |
| 5,416,478 A | 5/1995 | Morinaga |
| 5,418,610 A | 5/1995 | Fischer |
| 5,422,756 A | 6/1995 | Weber |
| 5,424,726 A | 6/1995 | Beymer |
| 5,424,865 A | 6/1995 | Lynam |
| 5,424,952 A | 6/1995 | Asayama |
| 5,426,524 A | 6/1995 | Wada et al. |
| 5,430,431 A | 7/1995 | Nelson |
| 5,432,496 A | 7/1995 | Lin |
| 5,432,626 A | 7/1995 | Sasuga et al. |
| 5,436,741 A | 7/1995 | Crandall |
| 5,437,931 A | 8/1995 | Tsai et al. |
| 5,439,305 A | 8/1995 | Santo |
| 5,444,478 A | 8/1995 | Lelong et al. |
| 5,446,576 A | 8/1995 | Lynam et al. |
| 5,455,716 A | 10/1995 | Suman et al. |
| 5,461,361 A | 10/1995 | Moore |
| D363,920 S | 11/1995 | Roberts et al. |
| 5,469,187 A | 11/1995 | Yaniv |
| 5,469,298 A | 11/1995 | Suman et al. |
| 5,475,366 A | 12/1995 | Van Lente et al. |
| 5,475,494 A | 12/1995 | Nishida et al. |
| 5,481,409 A | 1/1996 | Roberts |
| 5,483,453 A | 1/1996 | Uemura et al. |
| 5,485,161 A | 1/1996 | Vaughn |
| 5,485,378 A | 1/1996 | Franke et al. |
| 5,487,522 A | 1/1996 | Hook |
| 5,488,496 A | 1/1996 | Pine |
| 5,497,305 A | 3/1996 | Pastrick et al. |
| 5,497,306 A | 3/1996 | Pastrick |
| 5,500,760 A | 3/1996 | Varaprasad et al. |
| 5,506,701 A | 4/1996 | Ichikawa |
| 5,509,606 A | 4/1996 | Breithaupt et al. |
| 5,510,983 A | 4/1996 | Lino |
| 5,515,448 A | 5/1996 | Nishitani |
| 5,519,621 A | 5/1996 | Wortham |
| 5,521,744 A | 5/1996 | Mazurek |
| 5,521,760 A | 5/1996 | De Young et al. |
| 5,523,811 A | 6/1996 | Wada et al. |
| 5,523,877 A | 6/1996 | Lynam |
| 5,525,264 A | 6/1996 | Cronin et al. |
| 5,525,977 A | 6/1996 | Suman |
| 5,528,422 A | 6/1996 | Roberts |
| 5,528,474 A | 6/1996 | Roney et al. |
| 5,529,138 A | 6/1996 | Shaw et al. |
| 5,530,240 A | 6/1996 | Larson et al. |
| 5,530,420 A | 6/1996 | Tsuchiya et al. |
| 5,530,421 A | 6/1996 | Marshall et al. |
| 5,535,056 A | 7/1996 | Caskey et al. |
| 5,535,144 A | 7/1996 | Kise |
| 5,539,397 A | 7/1996 | Asanuma et al. |

(56) References Cited

U.S. PATENT DOCUMENTS

| | | |
|---|---|---|
| 5,541,590 A | 7/1996 | Nishio |
| 5,550,677 A | 8/1996 | Schofield et al. |
| 5,555,172 A | 9/1996 | Potter |
| 5,561,333 A | 10/1996 | Darius |
| 5,566,224 A | 10/1996 | ul Azam et al. |
| 5,567,360 A | 10/1996 | Varaprasad et al. |
| 5,568,316 A | 10/1996 | Schrenk et al. |
| 5,570,127 A | 10/1996 | Schmidt |
| 5,572,354 A | 11/1996 | Desmond et al. |
| 5,574,426 A | 11/1996 | Shisgal et al. |
| 5,574,443 A | 11/1996 | Hsieh |
| 5,575,552 A | 11/1996 | Faloon et al. |
| 5,576,687 A | 11/1996 | Blank et al. |
| 5,576,854 A | 11/1996 | Schmidt et al. |
| 5,576,975 A | 11/1996 | Sasaki et al. |
| 5,578,404 A | 11/1996 | Kliem |
| 5,587,236 A | 12/1996 | Agrawal et al. |
| 5,587,699 A | 12/1996 | Faloon et al. |
| 5,593,221 A | 1/1997 | Evanicky et al. |
| 5,594,222 A | 1/1997 | Caldwell |
| 5,594,560 A | 1/1997 | Jelley et al. |
| 5,594,615 A | 1/1997 | Spijkerman et al. |
| 5,602,542 A | 2/1997 | Widmann |
| 5,602,670 A | 2/1997 | Keegan |
| 5,603,104 A | 2/1997 | Phelps, III et al. |
| 5,608,550 A | 3/1997 | Epstein et al. |
| 5,609,652 A | 3/1997 | Yamada et al. |
| 5,610,380 A | 3/1997 | Nicolaisen |
| 5,610,756 A | 3/1997 | Lynam et al. |
| 5,611,966 A | 3/1997 | Varaprasad et al. |
| 5,614,885 A | 3/1997 | Van Lente et al. |
| 5,615,023 A | 3/1997 | Yang |
| 5,615,857 A | 4/1997 | Hook |
| 5,617,085 A | 4/1997 | Tsutsumi et al. |
| 5,619,374 A | 4/1997 | Roberts |
| 5,619,375 A | 4/1997 | Roberts |
| 5,621,577 A | 4/1997 | Lang et al. |
| 5,626,800 A | 5/1997 | Williams et al. |
| 5,631,089 A | 5/1997 | Center, Jr. et al. |
| 5,631,638 A | 5/1997 | Kaspar et al. |
| 5,631,639 A | 5/1997 | Hibino et al. |
| 5,632,092 A | 5/1997 | Blank et al. |
| 5,632,551 A | 5/1997 | Roney et al. |
| 5,634,709 A | 6/1997 | Iwama |
| 5,640,216 A | 6/1997 | Hasegawa et al. |
| 5,642,238 A | 6/1997 | Sala |
| 5,644,851 A | 7/1997 | Blank et al. |
| 5,646,614 A | 7/1997 | Abersfelder et al. |
| 5,649,756 A | 7/1997 | Adams et al. |
| 5,649,758 A | 7/1997 | Dion |
| 5,650,765 A | 7/1997 | Park |
| 5,650,929 A | 7/1997 | Potter et al. |
| 5,661,455 A | 8/1997 | Van Lente et al. |
| 5,661,651 A | 8/1997 | Geschke et al. |
| 5,661,804 A | 8/1997 | Dykema et al. |
| 5,662,375 A | 9/1997 | Adams et al. |
| 5,666,157 A | 9/1997 | Aviv |
| 5,667,289 A | 9/1997 | Akahane et al. |
| 5,668,663 A | 9/1997 | Varaprasad et al. |
| 5,668,675 A | 9/1997 | Fredricks |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,671,996 A | 9/1997 | Bos et al. |
| 5,673,994 A | 10/1997 | Fant, Jr. et al. |
| 5,673,999 A | 10/1997 | Koenck |
| 5,677,598 A | 10/1997 | De Hair et al. |
| 5,679,283 A | 10/1997 | Tonar et al. |
| 5,680,123 A | 10/1997 | Lee |
| 5,680,245 A | 10/1997 | Lynam |
| 5,680,263 A | 10/1997 | Zimmermann et al. |
| 5,686,975 A | 11/1997 | Lipton |
| 5,686,979 A | 11/1997 | Weber et al. |
| 5,687,035 A | 11/1997 | Lang |
| 5,689,241 A | 11/1997 | Clarke, Sr. et al. |
| 5,689,370 A | 11/1997 | Tonar et al. |
| 5,691,848 A | 11/1997 | Van Lente et al. |
| 5,692,819 A | 12/1997 | Mitsutake et al. |
| 5,696,529 A | 12/1997 | Evanicky et al. |
| 5,696,567 A | 12/1997 | Wada et al. |
| 5,699,044 A | 12/1997 | Van Lente et al. |
| 5,699,188 A | 12/1997 | Gilbert et al. |
| 5,703,568 A | 12/1997 | Hegyi |
| 5,708,410 A | 1/1998 | Blank et al. |
| 5,708,415 A | 1/1998 | Van Lente et al. |
| 5,708,857 A | 1/1998 | Ishibashi |
| 5,715,093 A | 2/1998 | Schierbeek et al. |
| 5,724,187 A | 3/1998 | Varaprasad et al. |
| 5,724,316 A | 3/1998 | Brunts |
| 5,729,194 A | 3/1998 | Spears et al. |
| 5,737,226 A | 4/1998 | Olson et al. |
| 5,741,966 A | 4/1998 | Handfield et al. |
| 5,744,227 A | 4/1998 | Bright et al. |
| 5,745,050 A | 4/1998 | Nakagawa |
| 5,745,266 A | 4/1998 | Smith |
| 5,748,172 A | 5/1998 | Song et al. |
| 5,748,287 A | 5/1998 | Takahashi et al. |
| 5,751,211 A | 5/1998 | Shirai et al. |
| 5,751,246 A | 5/1998 | Hertel |
| 5,751,390 A | 5/1998 | Crawford et al. |
| 5,751,489 A | 5/1998 | Caskey et al. |
| 5,754,099 A | 5/1998 | Nishimura et al. |
| D394,833 S | 6/1998 | Muth |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,762,823 A | 6/1998 | Hikmet |
| 5,764,139 A | 6/1998 | Nojima et al. |
| 5,765,940 A | 6/1998 | Levy et al. |
| 5,767,793 A | 6/1998 | Agravante et al. |
| 5,768,020 A | 6/1998 | Nagao |
| 5,775,762 A | 7/1998 | Vitito |
| 5,777,779 A | 7/1998 | Hashimoto et al. |
| 5,780,160 A | 7/1998 | Allemand et al. |
| 5,786,772 A | 7/1998 | Schofield et al. |
| 5,788,357 A | 8/1998 | Muth et al. |
| 5,790,298 A | 8/1998 | Tonar |
| 5,790,502 A | 8/1998 | Horinouchi et al. |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,796,176 A | 8/1998 | Kramer et al. |
| 5,798,057 A | 8/1998 | Hikmet |
| 5,798,575 A | 8/1998 | O'Farrell et al. |
| 5,798,688 A | 8/1998 | Schofield |
| 5,800,918 A | 9/1998 | Chartier et al. |
| 5,802,727 A | 9/1998 | Blank et al. |
| 5,803,579 A | 9/1998 | Turnbull et al. |
| 5,805,330 A | 9/1998 | Byker et al. |
| 5,805,367 A | 9/1998 | Kanazawa |
| 5,806,879 A | 9/1998 | Hamada et al. |
| 5,806,965 A | 9/1998 | Deese |
| 5,808,197 A | 9/1998 | Dao |
| 5,808,566 A | 9/1998 | Behr et al. |
| 5,808,589 A | 9/1998 | Fergason |
| 5,808,713 A | 9/1998 | Broer et al. |
| 5,808,777 A | 9/1998 | Lynam et al. |
| 5,808,778 A | 9/1998 | Bauer et al. |
| 5,812,321 A | 9/1998 | Schierbeek et al. |
| 5,813,745 A | 9/1998 | Fant, Jr. et al. |
| 5,818,625 A | 10/1998 | Forgette et al. |
| 5,820,097 A | 10/1998 | Spooner |
| 5,820,245 A | 10/1998 | Desmond et al. |
| 5,822,023 A | 10/1998 | Suman et al. |
| 5,823,654 A | 10/1998 | Pastrick et al. |
| 5,825,527 A | 10/1998 | Forgette et al. |
| 5,835,166 A | 11/1998 | Hall et al. |
| 5,837,994 A | 11/1998 | Stam et al. |
| 5,844,505 A | 12/1998 | Van Ryzin |
| 5,848,373 A | 12/1998 | DeLorme et al. |

(56) References Cited

U.S. PATENT DOCUMENTS

| | | |
|---|---|---|
| 5,850,176 A | 12/1998 | Kinoshita et al. |
| 5,850,205 A | 12/1998 | Blouin |
| 5,863,116 A | 1/1999 | Pastrick et al. |
| 5,864,419 A | 1/1999 | Lynam |
| 5,867,801 A | 2/1999 | Denny |
| 5,871,275 A | 2/1999 | O'Farrell et al. |
| 5,871,843 A | 2/1999 | Yoneda et al. |
| 5,877,707 A | 3/1999 | Kowalick |
| 5,877,897 A | 3/1999 | Schofield et al. |
| 5,878,353 A | 3/1999 | ul Azam et al. |
| 5,878,370 A | 3/1999 | Olson |
| 5,879,074 A | 3/1999 | Pastrick |
| 5,883,605 A | 3/1999 | Knapp |
| 5,883,739 A | 3/1999 | Ashihara et al. |
| 5,888,431 A | 3/1999 | Tonar et al. |
| 5,894,196 A | 4/1999 | McDermott |
| D409,540 S | 5/1999 | Muth |
| 5,899,551 A | 5/1999 | Neijzen et al. |
| 5,899,956 A | 5/1999 | Chan |
| 5,904,729 A | 5/1999 | Ruzicka |
| 5,910,854 A | 6/1999 | Varaprasad et al. |
| 5,914,815 A | 6/1999 | Bos |
| 5,917,664 A | 6/1999 | O'Neill et al. |
| 5,918,180 A | 6/1999 | Dimino |
| 5,922,176 A | 7/1999 | Caskey |
| 5,923,027 A | 7/1999 | Stam et al. |
| 5,923,457 A | 7/1999 | Byker et al. |
| 5,924,212 A | 7/1999 | Domanski |
| 5,926,087 A | 7/1999 | Busch et al. |
| 5,927,792 A | 7/1999 | Welling et al. |
| 5,928,572 A | 7/1999 | Tonar et al. |
| 5,929,786 A | 7/1999 | Schofield et al. |
| 5,931,555 A | 8/1999 | Akahane et al. |
| 5,935,702 A | 8/1999 | Macquart et al. |
| 5,936,774 A | 8/1999 | Street |
| 5,938,320 A | 8/1999 | Crandall |
| 5,938,321 A | 8/1999 | Bos et al. |
| 5,938,721 A | 8/1999 | Dussell et al. |
| 5,940,011 A | 8/1999 | Agravante et al. |
| 5,940,120 A | 8/1999 | Frankhouse et al. |
| 5,940,201 A | 8/1999 | Ash et al. |
| 5,942,895 A | 8/1999 | Popovic et al. |
| 5,947,586 A | 9/1999 | Weber |
| 5,949,331 A | 9/1999 | Schofield et al. |
| 5,949,506 A | 9/1999 | Jones et al. |
| 5,956,079 A | 9/1999 | Ridgley |
| 5,956,181 A | 9/1999 | Lin |
| 5,959,367 A | 9/1999 | O'Farrell et al. |
| 5,959,555 A | 9/1999 | Furuta |
| 5,959,577 A | 9/1999 | Fan et al. |
| 5,963,247 A | 10/1999 | Banitt |
| 5,963,284 A | 10/1999 | Jones et al. |
| 5,965,247 A | 10/1999 | Jonza et al. |
| 5,968,538 A | 10/1999 | Snyder, Jr. |
| 5,971,552 A | 10/1999 | O'Farrell et al. |
| 5,973,760 A | 10/1999 | Dehmlow |
| 5,975,715 A | 11/1999 | Bauder |
| 5,984,482 A | 11/1999 | Rumsey et al. |
| 5,986,730 A | 11/1999 | Hansen et al. |
| 5,990,469 A | 11/1999 | Bechtel et al. |
| 5,990,625 A | 11/1999 | Meissner et al. |
| 5,995,180 A | 11/1999 | Moriwaki et al. |
| 5,998,617 A | 12/1999 | Srinivasa et al. |
| 5,998,929 A | 12/1999 | Bechtel et al. |
| 6,000,823 A | 12/1999 | Desmond et al. |
| 6,001,486 A | 12/1999 | Varaprasad et al. |
| 6,002,511 A | 12/1999 | Varaprasad et al. |
| 6,002,544 A | 12/1999 | Yatsu |
| 6,002,983 A | 12/1999 | Alland et al. |
| 6,005,724 A | 12/1999 | Todd |
| 6,007,222 A | 12/1999 | Thau |
| 6,008,486 A | 12/1999 | Stam et al. |
| 6,008,871 A | 12/1999 | Okumura |
| 6,009,359 A | 12/1999 | El-Hakim et al. |
| 6,016,035 A | 1/2000 | Eberspacher et al. |
| 6,016,215 A | 1/2000 | Byker |
| 6,019,411 A | 2/2000 | Carter et al. |
| 6,019,475 A | 2/2000 | Lynam et al. |
| 6,020,987 A | 2/2000 | Baumann et al. |
| 6,021,371 A | 2/2000 | Fultz |
| 6,023,229 A | 2/2000 | Bugno et al. |
| 6,025,872 A | 2/2000 | Ozaki et al. |
| 6,028,537 A | 2/2000 | Suman et al. |
| 6,037,689 A | 3/2000 | Bingle et al. |
| 6,040,939 A | 3/2000 | Demiryont et al. |
| 6,042,253 A | 3/2000 | Fant, Jr. et al. |
| 6,042,934 A | 3/2000 | Guiselin et al. |
| 6,045,243 A | 4/2000 | Muth et al. |
| 6,045,643 A | 4/2000 | Byker et al. |
| 6,046,766 A | 4/2000 | Sakata |
| 6,046,837 A | 4/2000 | Yamamoto |
| 6,049,171 A | 4/2000 | Stam et al. |
| D425,466 S | 5/2000 | Todd et al. |
| 6,060,989 A | 5/2000 | Gehlot |
| 6,061,002 A | 5/2000 | Weber et al. |
| 6,062,920 A | 5/2000 | Jordan et al. |
| 6,064,508 A | 5/2000 | Forgette et al. |
| 6,065,840 A | 5/2000 | Caskey et al. |
| 6,066,920 A | 5/2000 | Torihara et al. |
| 6,067,111 A | 5/2000 | Hahn et al. |
| 6,067,500 A | 5/2000 | Morimoto et al. |
| 6,068,380 A | 5/2000 | Lynn et al. |
| D426,506 S | 6/2000 | Todd et al. |
| D426,507 S | 6/2000 | Todd et al. |
| D427,128 S | 6/2000 | Mathieu |
| 6,072,391 A | 6/2000 | Suzuki et al. |
| 6,074,077 A | 6/2000 | Pastrick et al. |
| 6,074,777 A | 6/2000 | Reimers et al. |
| 6,076,948 A | 6/2000 | Bukosky et al. |
| 6,078,355 A | 6/2000 | Zengel |
| 6,078,865 A | 6/2000 | Koyanagi |
| D428,372 S | 7/2000 | Todd et al. |
| D428,373 S | 7/2000 | Todd et al. |
| 6,082,881 A | 7/2000 | Hicks |
| 6,084,700 A | 7/2000 | Knapp et al. |
| 6,086,131 A | 7/2000 | Bingle et al. |
| 6,086,229 A | 7/2000 | Pastrick |
| 6,087,012 A | 7/2000 | Varaprasad et al. |
| 6,087,953 A | 7/2000 | DeLine et al. |
| 6,091,343 A | 7/2000 | Dykema et al. |
| 6,093,976 A | 7/2000 | Kramer et al. |
| 6,094,618 A | 7/2000 | Harada |
| D428,842 S | 8/2000 | Todd et al. |
| D429,202 S | 8/2000 | Todd et al. |
| D430,088 S | 8/2000 | Todd et al. |
| 6,097,023 A | 8/2000 | Schofield et al. |
| 6,097,316 A | 8/2000 | Liaw et al. |
| 6,099,131 A | 8/2000 | Fletcher et al. |
| 6,099,155 A | 8/2000 | Pastrick et al. |
| 6,102,546 A | 8/2000 | Carter |
| 6,102,559 A | 8/2000 | Nold et al. |
| 6,104,552 A | 8/2000 | Thau et al. |
| 6,106,121 A | 8/2000 | Buckley et al. |
| 6,111,498 A | 8/2000 | Jobes, I et al. |
| 6,111,683 A | 8/2000 | Cammenga et al. |
| 6,111,684 A | 8/2000 | Forgette et al. |
| 6,111,685 A | 8/2000 | Tench et al. |
| 6,111,696 A | 8/2000 | Allen et al. |
| 6,115,086 A | 9/2000 | Rosen |
| 6,115,651 A | 9/2000 | Cruz |
| 6,116,743 A | 9/2000 | Hoek |
| 6,118,219 A | 9/2000 | Okigami et al. |
| 6,122,597 A | 9/2000 | Saneyoshi et al. |
| 6,122,921 A | 9/2000 | Brezoczky et al. |
| 6,124,647 A | 9/2000 | Marcus et al. |
| 6,124,886 A | 9/2000 | DeLine et al. |
| 6,127,919 A | 10/2000 | Wylin |
| 6,127,945 A | 10/2000 | Mura-Smith |
| 6,128,576 A | 10/2000 | Nishimoto et al. |
| 6,130,421 A | 10/2000 | Bechtel et al. |
| 6,130,448 A | 10/2000 | Bauer et al. |
| 6,132,051 A | 10/2000 | Morell et al. |
| 6,132,072 A | 10/2000 | Turnbull et al. |
| 6,137,620 A | 10/2000 | Guarr et al. |

(56) References Cited

U.S. PATENT DOCUMENTS

| | | |
|---|---|---|
| 6,139,171 A | 10/2000 | Waldmann |
| 6,139,172 A | 10/2000 | Bos et al. |
| 6,140,933 A | 10/2000 | Bugno et al. |
| 6,142,656 A | 11/2000 | Kurth |
| 6,146,003 A | 11/2000 | Thau |
| 6,147,934 A | 11/2000 | Arikawa et al. |
| 6,148,261 A | 11/2000 | Obradovich et al. |
| 6,149,287 A | 11/2000 | Pastrick et al. |
| 6,150,014 A | 11/2000 | Chu et al. |
| 6,151,065 A | 11/2000 | Steed |
| 6,151,539 A | 11/2000 | Bergholz et al. |
| 6,152,551 A | 11/2000 | Annas |
| 6,152,590 A | 11/2000 | Furst et al. |
| 6,154,149 A | 11/2000 | Tyckowski et al. |
| 6,154,306 A | 11/2000 | Varaprasad et al. |
| 6,157,294 A | 12/2000 | Urai et al. |
| 6,157,418 A | 12/2000 | Rosen |
| 6,157,424 A | 12/2000 | Eichenlaub |
| 6,157,480 A | 12/2000 | Anderson et al. |
| 6,158,655 A | 12/2000 | DeVries, Jr. et al. |
| 6,161,865 A | 12/2000 | Rose et al. |
| 6,164,564 A | 12/2000 | Franco et al. |
| 6,166,625 A | 12/2000 | Teowee et al. |
| 6,166,629 A | 12/2000 | Hamma et al. |
| 6,166,834 A | 12/2000 | Taketomi et al. |
| 6,166,847 A | 12/2000 | Tench et al. |
| 6,166,848 A | 12/2000 | Cammenga et al. |
| 6,167,255 A | 12/2000 | Kennedy, III et al. |
| 6,167,755 B1 | 1/2001 | Damson et al. |
| 6,169,955 B1 | 1/2001 | Fultz |
| 6,170,956 B1 | 1/2001 | Rumsey et al. |
| 6,172,600 B1 | 1/2001 | Kakinami et al. |
| 6,172,601 B1 | 1/2001 | Wada et al. |
| 6,172,613 B1 | 1/2001 | DeLine et al. |
| 6,173,501 B1 | 1/2001 | Blank et al. |
| 6,175,164 B1 | 1/2001 | O'Farrell et al. |
| 6,175,300 B1 | 1/2001 | Kendrick |
| 6,176,602 B1 | 1/2001 | Pastrick et al. |
| 6,178,034 B1 | 1/2001 | Allemand et al. |
| 6,178,377 B1 | 1/2001 | Ishihara et al. |
| 6,181,387 B1 | 1/2001 | Rosen |
| 6,182,006 B1 | 1/2001 | Meek |
| 6,183,119 B1 | 2/2001 | Desmond et al. |
| 6,184,679 B1 | 2/2001 | Popovic et al. |
| 6,184,781 B1 | 2/2001 | Ramakesavan |
| 6,185,492 B1 | 2/2001 | Kagawa et al. |
| 6,185,501 B1 | 2/2001 | Smith et al. |
| 6,188,505 B1 | 2/2001 | Lomprey et al. |
| 6,191,704 B1 | 2/2001 | Takenaga et al. |
| 6,193,912 B1 | 2/2001 | Thieste et al. |
| 6,195,194 B1 | 2/2001 | Roberts et al. |
| 6,196,688 B1 | 3/2001 | Caskey et al. |
| 6,198,409 B1 | 3/2001 | Schofield et al. |
| 6,199,014 B1 | 3/2001 | Walker et al. |
| 6,199,810 B1 | 3/2001 | Wu et al. |
| 6,200,010 B1 | 3/2001 | Anders |
| 6,201,642 B1 | 3/2001 | Bos |
| 6,206,553 B1 | 3/2001 | Boddy et al. |
| 6,207,083 B1 | 3/2001 | Varaprasad et al. |
| 6,210,008 B1 | 4/2001 | Hoekstra et al. |
| 6,210,012 B1 | 4/2001 | Broer |
| 6,212,470 B1 | 4/2001 | Seymour et al. |
| 6,217,181 B1 | 4/2001 | Lynam et al. |
| 6,218,934 B1 | 4/2001 | Regan |
| 6,222,447 B1 | 4/2001 | Schofield et al. |
| 6,222,460 B1 | 4/2001 | DeLine et al. |
| 6,222,689 B1 | 4/2001 | Higuchi et al. |
| 6,227,689 B1 | 5/2001 | Miller |
| 6,232,937 B1 | 5/2001 | Jacobsen et al. |
| 6,236,514 B1 | 5/2001 | Sato |
| 6,239,851 B1 | 5/2001 | Hatazawa et al. |
| 6,239,898 B1 | 5/2001 | Byker et al. |
| 6,239,899 B1 | 5/2001 | DeVries et al. |
| 6,243,003 B1 | 6/2001 | DeLine et al. |
| 6,244,716 B1 | 6/2001 | Steenwyk et al. |
| 6,245,262 B1 | 6/2001 | Varaprasad et al. |
| 6,247,820 B1 | 6/2001 | Van Order |
| 6,249,214 B1 | 6/2001 | Kashiwazaki |
| 6,249,310 B1 | 6/2001 | Lefkowitz |
| 6,249,369 B1 | 6/2001 | Theiste et al. |
| 6,250,148 B1 | 6/2001 | Lynam |
| 6,250,766 B1 | 6/2001 | Strumolo et al. |
| 6,250,783 B1 | 6/2001 | Stidham et al. |
| 6,255,639 B1 | 7/2001 | Stam et al. |
| 6,257,746 B1 | 7/2001 | Todd et al. |
| 6,259,412 B1 | 7/2001 | Duroux |
| 6,259,475 B1 | 7/2001 | Ramachandran et al. |
| 6,260,608 B1 | 7/2001 | Kim |
| 6,262,842 B1 | 7/2001 | Duderkirk et al. |
| 6,264,353 B1 | 7/2001 | Caraher et al. |
| 6,265,968 B1 | 7/2001 | Betzitza et al. |
| 6,268,803 B1 | 7/2001 | Gunderson et al. |
| 6,268,837 B1 | 7/2001 | Kobayashi et al. |
| 6,269,308 B1 | 7/2001 | Kodaka et al. |
| 6,271,901 B1 | 8/2001 | Ide et al. |
| 6,274,221 B2 | 8/2001 | Smith et al. |
| 6,276,821 B1 | 8/2001 | Pastrick et al. |
| 6,276,822 B1 | 8/2001 | Bedrosian et al. |
| 6,277,471 B1 | 8/2001 | Tang |
| 6,278,271 B1 | 8/2001 | Schott |
| 6,278,377 B1 | 8/2001 | DeLine et al. |
| 6,278,941 B1 | 8/2001 | Yokoyama |
| 6,280,068 B1 | 8/2001 | Mertens et al. |
| 6,280,069 B1 | 8/2001 | Pastrick et al. |
| 6,281,804 B1 | 8/2001 | Haller et al. |
| 6,286,965 B1 | 9/2001 | Caskey et al. |
| 6,286,984 B1 | 9/2001 | Berg |
| 6,289,332 B2 | 9/2001 | Menig et al. |
| 6,290,378 B1 | 9/2001 | Buchalla et al. |
| 6,291,905 B1 | 9/2001 | Drummond et al. |
| 6,291,906 B1 | 9/2001 | Marcus et al. |
| 6,294,989 B1 | 9/2001 | Schofield et al. |
| 6,296,379 B1 | 10/2001 | Pastrick |
| 6,297,781 B1 | 10/2001 | Turnbull et al. |
| 6,299,333 B1 | 10/2001 | Pastrick et al. |
| 6,300,879 B1 | 10/2001 | Regan et al. |
| 6,301,039 B1 | 10/2001 | Tench |
| 6,304,173 B2 | 10/2001 | Pala et al. |
| 6,305,807 B1 | 10/2001 | Schierbeek |
| 6,310,611 B1 | 10/2001 | Caldwell |
| 6,310,714 B1 | 10/2001 | Lomprey et al. |
| 6,310,738 B1 | 10/2001 | Chu |
| 6,313,454 B1 | 11/2001 | Bos et al. |
| 6,314,295 B1 | 11/2001 | Kawamoto |
| 6,315,440 B1 | 11/2001 | Satoh |
| 6,317,057 B1 | 11/2001 | Lee |
| 6,317,180 B1 | 11/2001 | Kuroiwa et al. |
| 6,317,248 B1 | 11/2001 | Agrawal et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,320,612 B1 | 11/2001 | Young |
| 6,324,295 B1 | 11/2001 | Valery et al. |
| 6,326,613 B1 | 12/2001 | Heslin et al. |
| 6,326,900 B2 | 12/2001 | DeLine et al. |
| 6,329,925 B1 | 12/2001 | Skiver et al. |
| 6,330,511 B2 | 12/2001 | Ogura et al. |
| 6,331,066 B1 | 12/2001 | Desmond et al. |
| 6,333,759 B1 | 12/2001 | Mazzilli |
| 6,335,680 B1 | 1/2002 | Matsuoka |
| 6,336,737 B1 | 1/2002 | Thau |
| 6,340,850 B2 | 1/2002 | O'Farrell et al. |
| 6,341,523 B2 | 1/2002 | Lynam |
| 6,344,805 B1 | 2/2002 | Yasui et al. |
| 6,346,698 B1 | 2/2002 | Turnbull |
| 6,347,880 B1 | 2/2002 | Furst et al. |
| 6,348,858 B2 | 2/2002 | Weis et al. |
| 6,349,450 B1 | 2/2002 | Koops et al. |
| 6,351,708 B1 | 2/2002 | Takagi et al. |
| 6,353,392 B1 | 3/2002 | Schofield et al. |
| 6,356,206 B1 | 3/2002 | Takenaga et al. |
| 6,356,376 B1 | 3/2002 | Tonar et al. |
| 6,356,389 B1 | 3/2002 | Nilsen et al. |
| 6,357,883 B1 | 3/2002 | Strumolo et al. |

(56) References Cited

U.S. PATENT DOCUMENTS

| | | |
|---|---|---|
| 6,362,121 B1 | 3/2002 | Chopin et al. |
| 6,362,548 B1 | 3/2002 | Bingle et al. |
| 6,363,326 B1 | 3/2002 | Scully |
| 6,366,013 B1 | 4/2002 | Leenders et al. |
| 6,366,213 B2 | 4/2002 | DeLine et al. |
| 6,370,329 B1 | 4/2002 | Teuchert |
| 6,371,636 B1 | 4/2002 | Wesson |
| 6,379,013 B1 | 4/2002 | Bechtel et al. |
| 6,379,788 B2 | 4/2002 | Choi et al. |
| 6,382,805 B1 | 5/2002 | Miyabukuro |
| 6,385,139 B1 | 5/2002 | Arikawa et al. |
| 6,386,742 B1 | 5/2002 | DeLine et al. |
| 6,390,529 B1 | 5/2002 | Bingle et al. |
| 6,390,626 B2 | 5/2002 | Knox |
| 6,390,635 B2 | 5/2002 | Whitehead et al. |
| 6,396,397 B1 | 5/2002 | Bos et al. |
| 6,396,408 B2 | 5/2002 | Drummond et al. |
| 6,396,637 B2 | 5/2002 | Roest et al. |
| 6,402,331 B1 | 6/2002 | Juraschek |
| 6,407,468 B1 | 6/2002 | LeVesque et al. |
| 6,407,847 B1 | 6/2002 | Poll et al. |
| 6,408,247 B1 | 6/2002 | Ichikawa et al. |
| 6,411,204 B1 | 6/2002 | Bloomfield et al. |
| 6,412,959 B1 | 7/2002 | Tseng |
| 6,412,973 B1 | 7/2002 | Bos et al. |
| 6,414,910 B1 | 7/2002 | Kaneko et al. |
| 6,415,230 B1 | 7/2002 | Maruko et al. |
| 6,416,208 B2 | 7/2002 | Pastrick et al. |
| 6,417,786 B2 | 7/2002 | Learman et al. |
| 6,418,376 B1 | 7/2002 | Olson |
| 6,419,300 B1 | 7/2002 | Pavao et al. |
| 6,420,036 B1 | 7/2002 | Varaprasad et al. |
| 6,420,800 B1 | 7/2002 | LeVesque et al. |
| 6,420,975 B1 | 7/2002 | DeLine et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,786 B1 | 7/2002 | Beeson et al. |
| 6,424,892 B1 | 7/2002 | Matsuoka |
| 6,426,492 B1 | 7/2002 | Bos et al. |
| 6,426,568 B2 | 7/2002 | Turnbull et al. |
| 6,427,349 B1 | 8/2002 | Blank et al. |
| 6,428,172 B1 | 8/2002 | Hutzel et al. |
| 6,433,676 B2 | 8/2002 | DeLine et al. |
| 6,433,680 B1 | 8/2002 | Ho |
| 6,433,914 B1 | 8/2002 | Lomprey et al. |
| 6,437,688 B1 | 8/2002 | Kobayashi |
| 6,438,491 B1 | 8/2002 | Farmer |
| 6,439,755 B1 | 8/2002 | Fant, Jr. et al. |
| 6,441,872 B1 | 8/2002 | Ho |
| 6,441,943 B1 | 8/2002 | Roberts et al. |
| 6,441,963 B2 | 8/2002 | Murakami et al. |
| 6,441,964 B1 | 8/2002 | Chu et al. |
| 6,445,287 B1 | 9/2002 | Schofield et al. |
| 6,447,128 B1 | 9/2002 | Lang et al. |
| 6,449,082 B1 | 9/2002 | Agrawal et al. |
| 6,452,533 B1 | 9/2002 | Yamabuchi et al. |
| 6,452,572 B1 | 9/2002 | Fan et al. |
| 6,462,795 B1 | 10/2002 | Clarke |
| 6,463,369 B2 | 10/2002 | Sadano et al. |
| 6,466,701 B1 | 10/2002 | Ejiri et al. |
| 6,471,362 B1 | 10/2002 | Carter et al. |
| 6,472,977 B1 | 10/2002 | Pochmuller |
| 6,472,979 B2 | 10/2002 | Schofield et al. |
| 6,473,001 B1 | 10/2002 | Blum |
| 6,474,853 B2 | 11/2002 | Pastrick et al. |
| 6,476,731 B1 | 11/2002 | Miki et al. |
| 6,477,460 B2 | 11/2002 | Kepler |
| 6,477,464 B2 | 11/2002 | McCarthy et al. |
| 6,483,429 B1 | 11/2002 | Yasui et al. |
| 6,483,438 B2 | 11/2002 | DeLine et al. |
| 6,483,613 B1 | 11/2002 | Woodgate et al. |
| 6,487,500 B2 | 11/2002 | Lemelson et al. |
| 6,494,602 B2 | 12/2002 | Pastrick et al. |
| 6,498,620 B2 | 12/2002 | Schofield et al. |
| 6,501,387 B2 | 12/2002 | Skiver et al. |
| 6,512,203 B2 | 1/2003 | Jones et al. |
| 6,512,624 B2 | 1/2003 | Tonar et al. |
| 6,513,252 B1 | 2/2003 | Schierbeek |
| 6,515,581 B1 | 2/2003 | Ho |
| 6,515,582 B1 | 2/2003 | Teowee et al. |
| 6,515,597 B1 | 2/2003 | Wada et al. |
| 6,516,664 B2 | 2/2003 | Lynam |
| 6,518,691 B1 | 2/2003 | Baba |
| 6,519,209 B1 | 2/2003 | Arikawa et al. |
| 6,520,667 B1 | 2/2003 | Mousseau |
| 6,522,451 B1 | 2/2003 | Lynam |
| 6,522,969 B2 | 2/2003 | Kannonji |
| 6,525,707 B1 | 2/2003 | Kaneko et al. |
| 6,534,884 B2 | 3/2003 | Marcus et al. |
| 6,538,709 B1 | 3/2003 | Kurihara et al. |
| 6,539,306 B2 | 3/2003 | Turnbull |
| 6,540,193 B1 | 4/2003 | DeLine |
| 6,542,085 B1 | 4/2003 | Yang |
| 6,542,182 B1 | 4/2003 | Chutorash |
| 6,543,163 B1 | 4/2003 | Ginsberg |
| 6,545,598 B1 | 4/2003 | de Villeroche |
| 6,549,253 B1 | 4/2003 | Robbie et al. |
| 6,549,335 B1 | 4/2003 | Trapani et al. |
| 6,550,949 B1 | 4/2003 | Bauer et al. |
| 6,552,326 B2 | 4/2003 | Turnbull |
| 6,553,308 B1 | 4/2003 | Uhlmann et al. |
| 6,559,902 B1 | 5/2003 | Kusuda et al. |
| 6,560,004 B2 | 5/2003 | Theiste et al. |
| 6,560,027 B2 | 5/2003 | Meine |
| 6,566,821 B2 | 5/2003 | Nakatsuka et al. |
| 6,567,060 B1 | 5/2003 | Sekiguchi |
| 6,567,708 B1 | 5/2003 | Bechtel et al. |
| 6,568,839 B1 | 5/2003 | Pastrick et al. |
| 6,572,233 B1 | 6/2003 | Northman et al. |
| 6,573,957 B1 | 6/2003 | Suzuki |
| 6,573,963 B2 | 6/2003 | Ouderkirk et al. |
| 6,575,582 B2 | 6/2003 | Tenmyo |
| 6,575,643 B2 | 6/2003 | Takahashi |
| 6,578,989 B2 | 6/2003 | Osumi et al. |
| 6,580,373 B1 | 6/2003 | Ohashi |
| 6,580,479 B1 | 6/2003 | Sekiguchi et al. |
| 6,580,562 B2 | 6/2003 | Aoki et al. |
| 6,581,007 B2 | 6/2003 | Hasegawa et al. |
| 6,583,730 B2 | 6/2003 | Lang et al. |
| 6,591,192 B2 | 7/2003 | Okamura et al. |
| 6,592,230 B2 | 7/2003 | Dupay |
| 6,593,565 B2 | 7/2003 | Heslin et al. |
| 6,593,984 B2 | 7/2003 | Arakawa et al. |
| 6,594,065 B2 | 7/2003 | Byker et al. |
| 6,594,067 B2 | 7/2003 | Poll et al. |
| 6,594,090 B2 | 7/2003 | Kruschwitz et al. |
| 6,594,583 B2 | 7/2003 | Ogura et al. |
| 6,594,614 B2 | 7/2003 | Studt et al. |
| 6,595,649 B2 | 7/2003 | Hoekstra et al. |
| 6,597,489 B1 | 7/2003 | Guarr et al. |
| 6,606,183 B2 | 8/2003 | Ikai et al. |
| 6,611,202 B2 | 8/2003 | Schofield et al. |
| 6,611,227 B1 | 8/2003 | Nebiyeloul-Kifle et al. |
| 6,611,759 B2 | 8/2003 | Brosche |
| 6,614,387 B1 | 9/2003 | Deadman |
| 6,614,419 B1 | 9/2003 | May |
| 6,614,579 B2 | 9/2003 | Roberts et al. |
| 6,615,438 B1 | 9/2003 | Franco et al. |
| 6,616,313 B2 | 9/2003 | Furst et al. |
| 6,616,764 B2 | 9/2003 | Kramer et al. |
| 6,618,672 B2 | 9/2003 | Sasaki et al. |
| 6,621,616 B1 | 9/2003 | Bauer et al. |
| 6,624,936 B2 | 9/2003 | Kotchick et al. |
| 6,627,918 B2 | 9/2003 | Getz et al. |
| 6,630,888 B2 | 10/2003 | Lang et al. |
| 6,636,190 B2 | 10/2003 | Hirakata et al. |
| 6,636,258 B2 | 10/2003 | Strumolo |
| 6,638,582 B1 | 10/2003 | Uchiyama et al. |
| 6,639,360 B2 | 10/2003 | Roberts et al. |
| 6,642,840 B2 | 11/2003 | Lang et al. |
| 6,642,851 B2 | 11/2003 | Deline et al. |
| 6,646,697 B1 | 11/2003 | Sekiguchi et al. |
| 6,648,477 B2 | 11/2003 | Hutzel et al. |

(56) References Cited

U.S. PATENT DOCUMENTS

| | | |
|---|---|---|
| 6,650,457 B2 | 11/2003 | Busscher et al. |
| 6,657,607 B1 | 12/2003 | Evanicky et al. |
| 6,661,482 B2 | 12/2003 | Hara |
| 6,661,830 B1 | 12/2003 | Reed et al. |
| 6,665,592 B2 | 12/2003 | Kodama |
| 6,669,109 B2 | 12/2003 | Ivanov et al. |
| 6,669,267 B1 | 12/2003 | Lynam et al. |
| 6,669,285 B1 | 12/2003 | Park et al. |
| 6,670,207 B1 | 12/2003 | Roberts |
| 6,670,910 B2 | 12/2003 | Delcheccolo et al. |
| 6,670,941 B2 | 12/2003 | Albu et al. |
| 6,671,080 B2 | 12/2003 | Poll et al. |
| 6,672,731 B2 | 1/2004 | Schnell et al. |
| 6,672,734 B2 | 1/2004 | Lammers |
| 6,672,744 B2 | 1/2004 | DeLine et al. |
| 6,672,745 B1 | 1/2004 | Bauer et al. |
| 6,674,370 B1 | 1/2004 | Rodewald et al. |
| 6,675,075 B1 | 1/2004 | Engelsberg et al. |
| 6,678,083 B1 | 1/2004 | Anstee |
| 6,678,614 B2 | 1/2004 | McCarthy et al. |
| 6,679,608 B2 | 1/2004 | Bechtel et al. |
| 6,683,539 B2 | 1/2004 | Trajkovic et al. |
| 6,683,969 B1 | 1/2004 | Nishigaki et al. |
| 6,685,348 B2 | 2/2004 | Pastrick et al. |
| 6,690,262 B1 | 2/2004 | Winnett |
| 6,690,268 B2 | 2/2004 | Schofield et al. |
| 6,690,413 B1 | 2/2004 | Moore |
| 6,690,438 B2 | 2/2004 | Sekiguchi |
| 6,693,517 B2 | 2/2004 | McCarthy et al. |
| 6,693,518 B2 | 2/2004 | Kumata et al. |
| 6,693,519 B2 | 2/2004 | Keirstead |
| 6,693,524 B1 | 2/2004 | Payne |
| 6,700,692 B2 | 3/2004 | Tonar et al. |
| 6,709,136 B2 | 3/2004 | Pastrick et al. |
| 6,713,783 B1 | 3/2004 | Mase et al. |
| 6,717,109 B2 | 4/2004 | Macher et al. |
| 6,717,610 B1 | 4/2004 | Bos et al. |
| 6,717,712 B2 | 4/2004 | Lynam et al. |
| 6,719,215 B2 | 4/2004 | Drouillard |
| 6,724,446 B2 | 4/2004 | Motomura et al. |
| 6,726,337 B2 | 4/2004 | Whitehead et al. |
| 6,727,807 B2 | 4/2004 | Trajkovic et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,736,526 B2 | 5/2004 | Matsuba et al. |
| 6,737,629 B2 | 5/2004 | Nixon et al. |
| 6,737,630 B2 | 5/2004 | Turnbull |
| 6,737,964 B2 | 5/2004 | Samman et al. |
| 6,738,088 B1 | 5/2004 | Uskolovsky et al. |
| 6,757,039 B2 | 6/2004 | Ma |
| 6,806,922 B2 | 10/2004 | Ishitaka |
| 6,824,281 B2 | 11/2004 | Schofield et al. |
| 6,861,789 B2 | 3/2005 | Wei |
| 6,871,968 B2 * | 3/2005 | Wachi ................ B60R 1/086 248/481 |
| 6,891,677 B2 | 5/2005 | Nilsen et al. |
| 6,899,438 B2 | 5/2005 | Su et al. |
| 6,909,486 B2 | 6/2005 | Wang et al. |
| 6,949,772 B2 | 9/2005 | Shimizu et al. |
| 7,004,593 B2 | 2/2006 | Weller et al. |
| 7,029,156 B2 | 4/2006 | Suehiro et al. |
| 7,108,409 B2 | 9/2006 | DeLine et al. |
| 7,114,554 B2 | 10/2006 | Bergman et al. |
| 7,158,881 B2 | 1/2007 | McCarthy et al. |
| 7,161,567 B2 | 1/2007 | Homma et al. |
| 7,184,190 B2 | 2/2007 | McCabe et al. |
| 7,185,995 B2 | 3/2007 | Hatanaka et al. |
| 7,215,238 B2 | 5/2007 | Buck et al. |
| 7,241,030 B2 | 7/2007 | Mok et al. |
| 7,253,723 B2 * | 8/2007 | Lindahl ................ B60R 1/12 340/438 |
| 7,255,451 B2 | 8/2007 | McCabe et al. |
| 7,289,037 B2 | 10/2007 | Uken et al. |
| 7,300,183 B2 | 11/2007 | Kiyomoto et al. |
| 7,318,664 B2 | 1/2008 | Hatanaka et al. |
| 7,324,172 B2 | 1/2008 | Yamazaki |
| 7,324,174 B2 | 1/2008 | Hafuka et al. |
| 7,338,177 B2 | 3/2008 | Lynam |
| 7,360,932 B2 * | 4/2008 | Uken ................ B60R 1/12 307/10.1 |
| 7,391,563 B2 | 6/2008 | McCabe et al. |
| 7,527,403 B2 * | 5/2009 | Uken ................ B60R 1/12 362/487 |
| 7,542,193 B2 | 6/2009 | McCabe et al. |
| 7,605,883 B2 | 10/2009 | Yamaki et al. |
| 7,657,052 B2 | 2/2010 | Larson et al. |
| 7,795,675 B2 | 9/2010 | Darwish et al. |
| 7,826,123 B2 | 11/2010 | McCabe et al. |
| 7,898,398 B2 | 3/2011 | DeLine et al. |
| 8,049,640 B2 | 11/2011 | Uken et al. |
| 8,277,059 B2 | 10/2012 | McCabe et al. |
| 8,508,384 B2 | 8/2013 | Uken et al. |
| 9,557,584 B2 | 1/2017 | Uken et al. |
| 9,783,115 B2 | 10/2017 | Uken et al. |
| 10,166,927 B2 | 1/2019 | Uken et al. |
| 10,449,903 B2 | 10/2019 | Uken et al. |
| 10,664,115 B2 * | 5/2020 | Lindahl ................ B60R 1/08 |
| 2001/0019356 A1 | 9/2001 | Takeda et al. |
| 2001/0022616 A1 | 9/2001 | Rademacher et al. |
| 2001/0026215 A1 | 10/2001 | Nakaho et al. |
| 2001/0026316 A1 | 10/2001 | Senatore |
| 2001/0030857 A1 | 10/2001 | Futhey et al. |
| 2001/0035853 A1 | 11/2001 | Hoelen et al. |
| 2001/0045981 A1 | 11/2001 | Gloger et al. |
| 2002/0036828 A1 | 3/2002 | Wong |
| 2002/0044065 A1 | 4/2002 | Quist et al. |
| 2002/0049535 A1 | 4/2002 | Rigo et al. |
| 2002/0085155 A1 | 7/2002 | Arikawa |
| 2002/0092958 A1 | 7/2002 | Lusk |
| 2002/0118321 A1 | 8/2002 | Ge |
| 2002/0133144 A1 | 9/2002 | Chan et al. |
| 2002/0149727 A1 | 10/2002 | Wang |
| 2002/0154007 A1 | 10/2002 | Yang |
| 2002/0196639 A1 | 12/2002 | Weidel |
| 2003/0002165 A1 | 1/2003 | Mathias et al. |
| 2003/0002179 A1 | 1/2003 | Roberts et al. |
| 2003/0007261 A1 | 1/2003 | Hutzel et al. |
| 2003/0016287 A1 | 1/2003 | Nakayama et al. |
| 2003/0016542 A1 | 1/2003 | Pastrick et al. |
| 2003/0025596 A1 | 2/2003 | Lang et al. |
| 2003/0030546 A1 | 2/2003 | Tseng |
| 2003/0030724 A1 | 2/2003 | Okamoto |
| 2003/0035050 A1 | 2/2003 | Mizusawa et al. |
| 2003/0043269 A1 | 3/2003 | Park |
| 2003/0043589 A1 | 3/2003 | Blank |
| 2003/0048639 A1 | 3/2003 | Boyd et al. |
| 2003/0052969 A1 | 3/2003 | Satoh et al. |
| 2003/0058338 A1 | 3/2003 | Kawauchi et al. |
| 2003/0069690 A1 | 4/2003 | Correia et al. |
| 2003/0080877 A1 | 5/2003 | Takagi et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0095331 A1 | 5/2003 | Bengoechea et al. |
| 2003/0098908 A1 | 5/2003 | Misaiji et al. |
| 2003/0101749 A1 | 6/2003 | Lingle et al. |
| 2003/0103142 A1 | 6/2003 | Hitomi et al. |
| 2003/0117522 A1 | 6/2003 | Okada |
| 2003/0122929 A1 | 7/2003 | Minaudo et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0156193 A1 | 8/2003 | Nakamura |
| 2003/0169158 A1 | 9/2003 | Paul |
| 2003/0179293 A1 | 9/2003 | Oizumi |
| 2003/0202096 A1 | 10/2003 | Kim |
| 2003/0206256 A1 | 11/2003 | Drain et al. |
| 2003/0214576 A1 | 11/2003 | Koga |
| 2003/0214584 A1 | 11/2003 | Ross |
| 2003/0214733 A1 | 11/2003 | Fujikawa et al. |

(56) References Cited

U.S. PATENT DOCUMENTS

| | | |
|---|---|---|
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 2/2004 | Lin |
| 2004/0032321 A1 | 2/2004 | McMahon et al. |
| 2004/0032655 A1 | 2/2004 | Kikuchi et al. |
| 2004/0032676 A1 | 2/2004 | Drummond et al. |
| 2004/0036768 A1 | 2/2004 | Green |
| 2004/0046870 A1 | 3/2004 | Leigh Travis |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0077359 A1 | 4/2004 | Bernas et al. |
| 2004/0080404 A1 | 4/2004 | White |
| 2004/0085196 A1 | 5/2004 | Miller et al. |
| 2004/0085499 A1 | 5/2004 | Baek |
| 2004/0090314 A1 | 5/2004 | Iwamoto |
| 2004/0090317 A1 | 5/2004 | Rothkop |
| 2004/0196577 A1 | 10/2004 | Carter et al. |
| 2004/0239243 A1 | 12/2004 | Roberts et al. |
| 2004/0239849 A1 | 12/2004 | Wang |
| 2005/0018738 A1 | 1/2005 | Duan et al. |
| 2005/0264891 A1* | 12/2005 | Uken ............... B60R 1/12 359/606 |
| 2006/0050018 A1 | 3/2006 | Hutzel et al. |
| 2006/0187378 A1 | 8/2006 | Bong et al. |
| 2006/0279522 A1 | 12/2006 | Kurihara |
| 2008/0055757 A1 | 3/2008 | Uken et al. |
| 2010/0289995 A1 | 11/2010 | Hwang et al. |
| 2011/0019260 A1 | 1/2011 | McCabe et al. |
| 2011/0109746 A1 | 5/2011 | Schofield et al. |
| 2011/0141543 A1 | 6/2011 | Uken et al. |
| 2013/0088766 A1 | 4/2013 | Uken et al. |

FOREIGN PATENT DOCUMENTS

| | | |
|---|---|---|
| DE | 3049169 A1 | 7/1982 |
| DE | 3720848 A1 | 1/1989 |
| DE | 102005000650 A1 | 7/2006 |
| EP | 0928723 A2 | 7/1999 |
| EP | 1075986 A1 | 2/2001 |
| EP | 1097848 A2 | 5/2001 |
| EP | 1193773 A2 | 4/2002 |
| EP | 2106970 A1 | 10/2009 |
| GB | 2192370 A | 1/1988 |
| JP | 57-102602 | 6/1982 |
| JP | 58-020954 | 2/1983 |
| JP | 1034903 | 12/1985 |
| JP | 61-127186 | 6/1986 |
| JP | 62-131232 | 6/1987 |
| JP | 63-085525 | 4/1988 |
| JP | 01-130578 | 5/1989 |
| JP | 03-28947 | 3/1991 |
| JP | 03-198026 | 8/1991 |
| JP | 05-080716 | 4/1993 |
| JP | 05-183194 | 7/1993 |
| JP | 06-318734 | 11/1994 |
| JP | 07-146467 | 6/1995 |
| JP | 07-191311 | 7/1995 |
| JP | 07-266928 | 10/1995 |
| JP | 07-267002 | 10/1995 |
| JP | 07-281150 | 10/1995 |
| JP | 08-227769 | 9/1996 |
| JP | 09-033886 | 2/1997 |
| JP | 10-190960 | 7/1998 |
| JP | 10-221692 | 8/1998 |
| JP | 10-239659 | 9/1998 |
| JP | 10-276298 | 10/1998 |
| JP | 11-078693 | 3/1999 |
| JP | 2001-097116 A | 4/2001 |
| JP | 2002-072901 A | 3/2002 |
| JP | 2002-162626 A | 6/2002 |
| JP | 2002316580 A | 10/2002 |
| JP | 2003-182454 A | 7/2003 |
| JP | 2005-280526 A | 10/2005 |
| JP | 2008-083657 A | 4/2008 |
| KR | 20060038856 A | 5/2006 |
| KR | 100663930 B1 | 1/2007 |
| KR | 20090031998 A | 3/2009 |
| WO | 1982/002448 | 7/1982 |
| WO | 1986/006179 | 10/1986 |
| WO | 1998/038547 | 9/1998 |
| WO | 2000/055685 A1 | 9/2000 |
| WO | 2003/078941 A2 | 9/2003 |

* cited by examiner

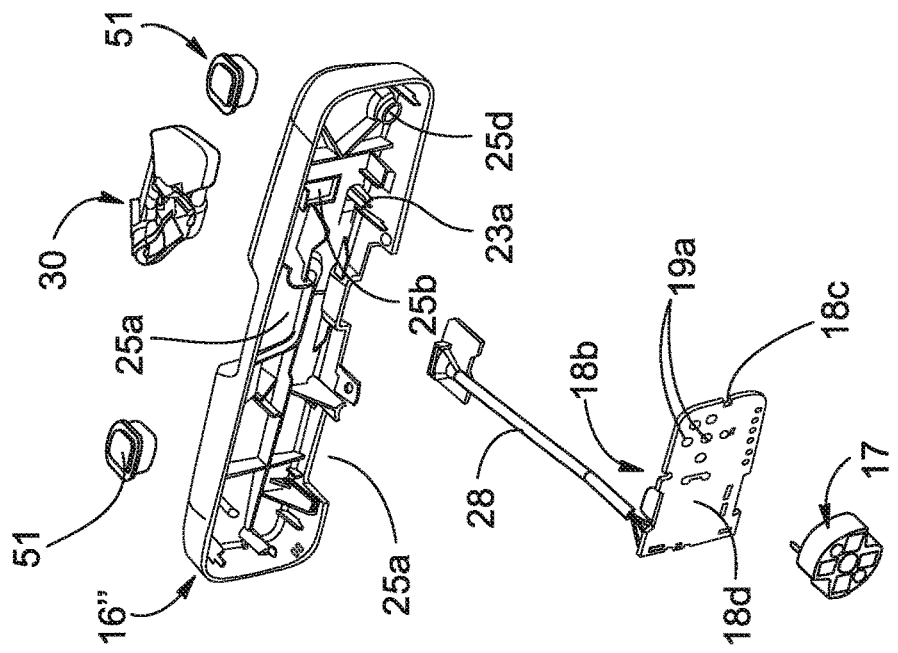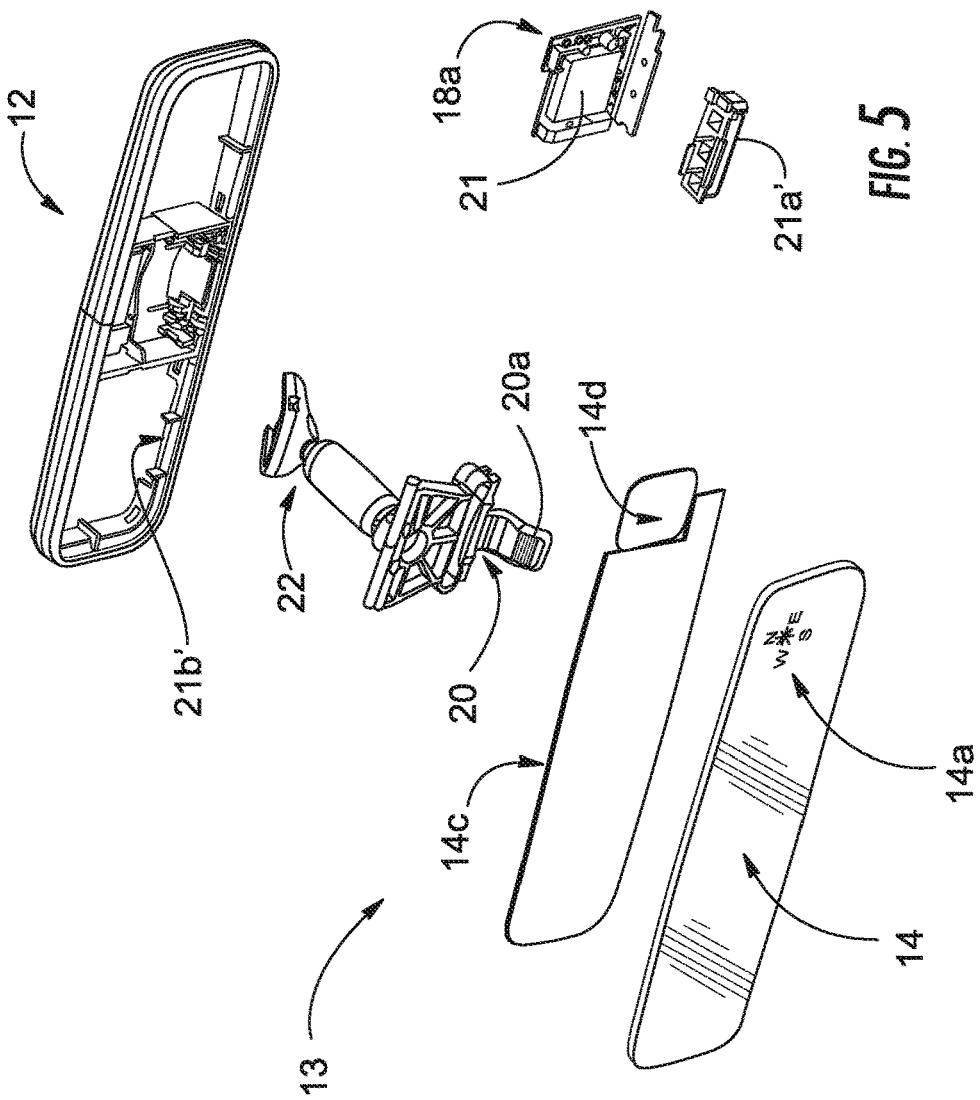
FIG. 5

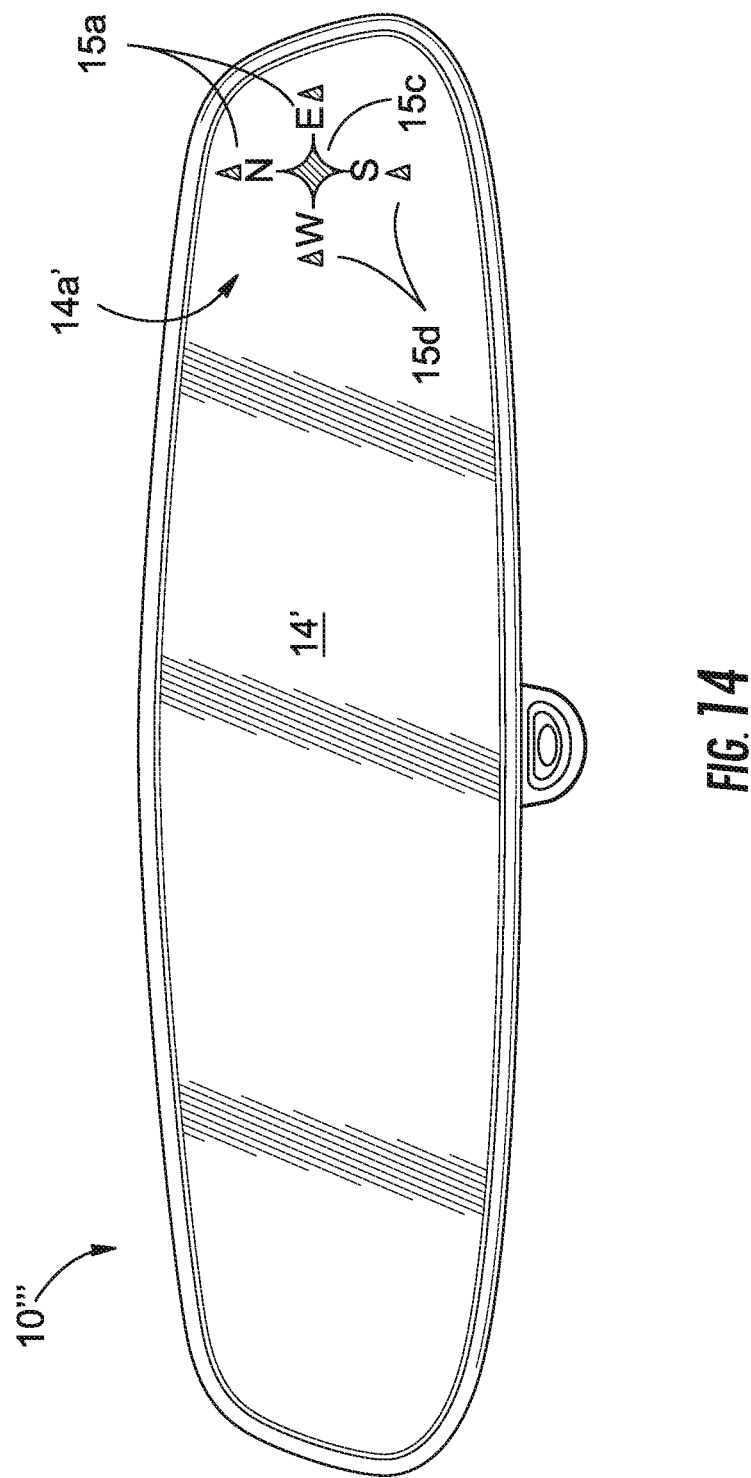

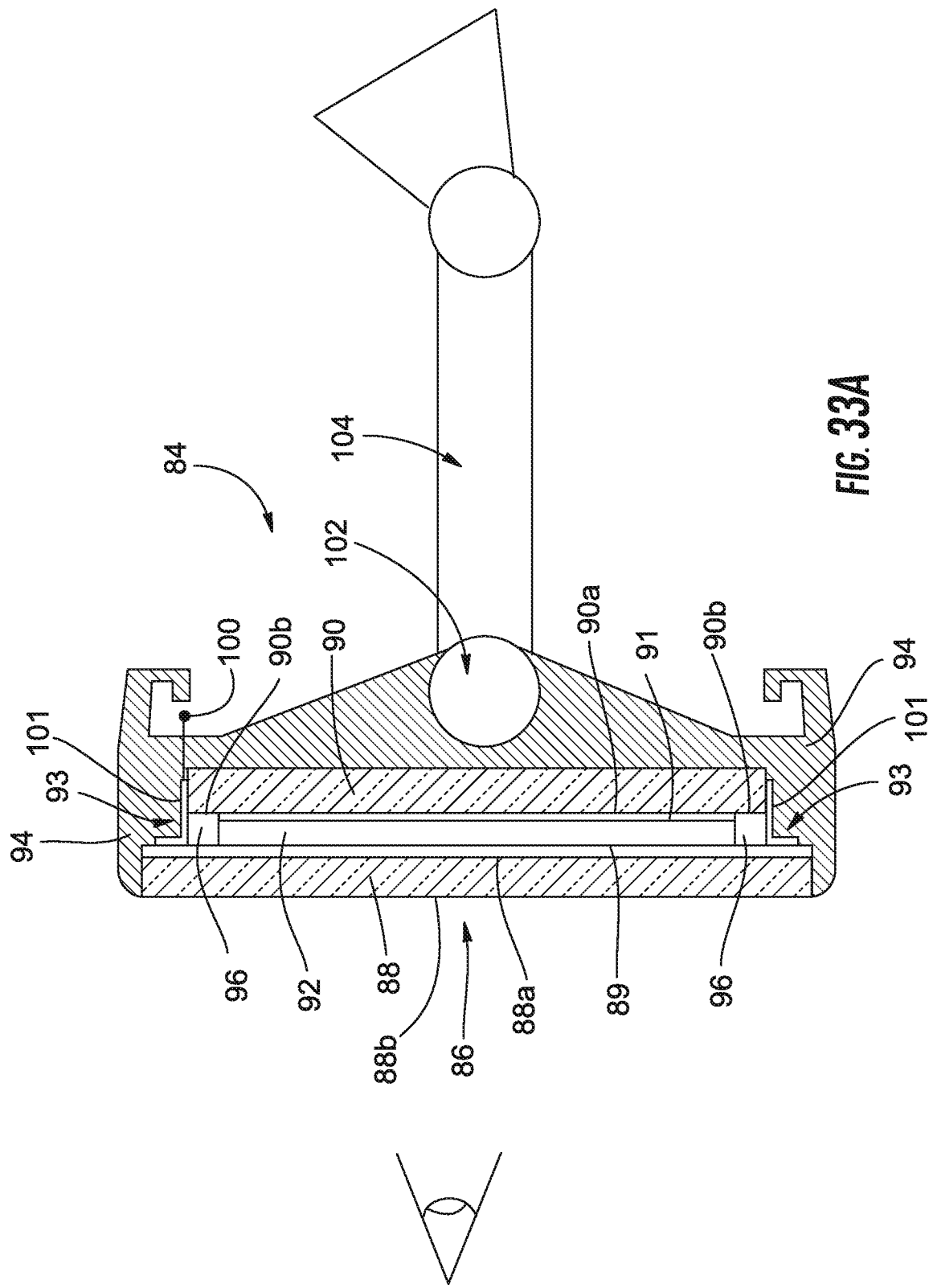

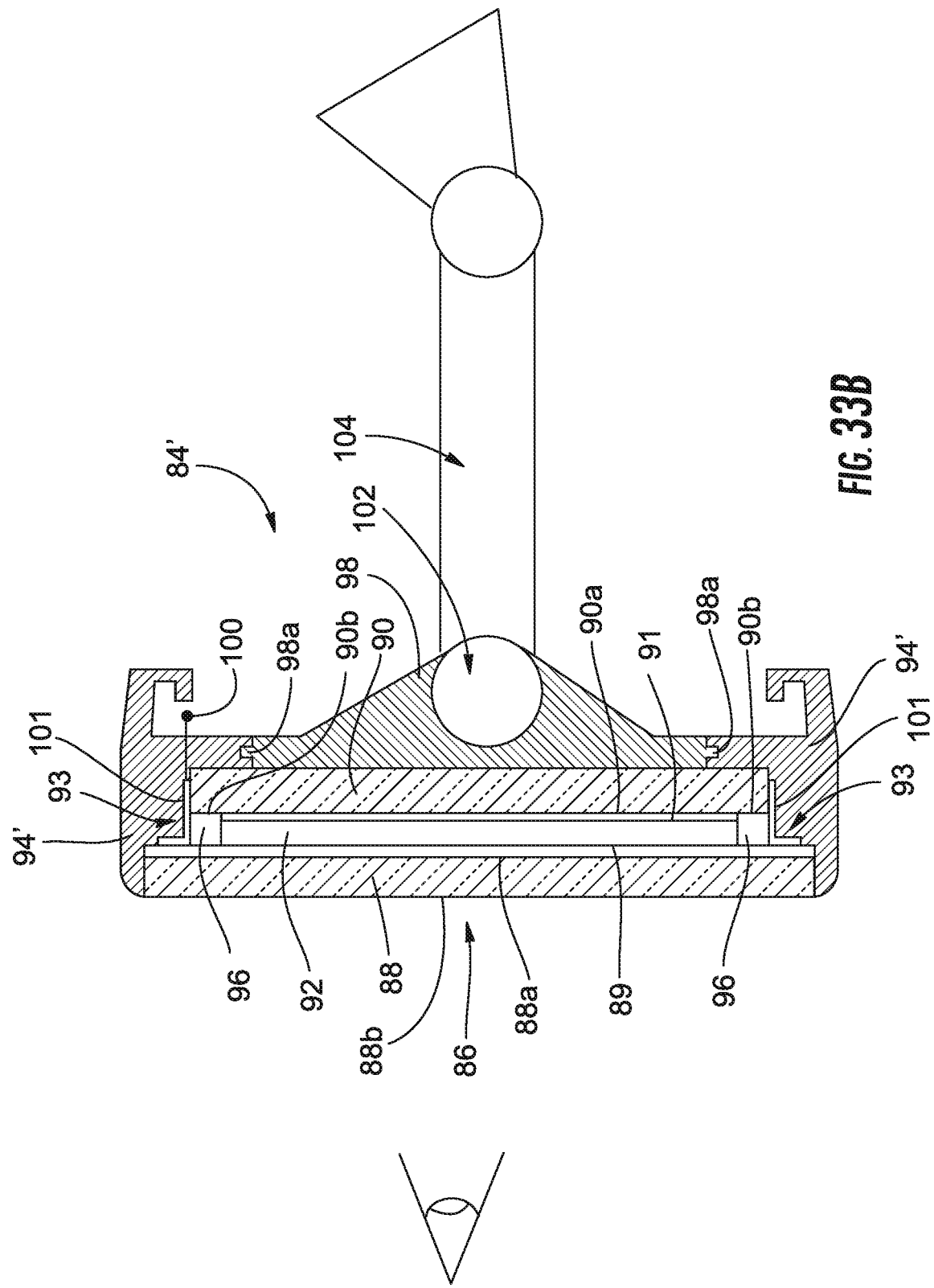

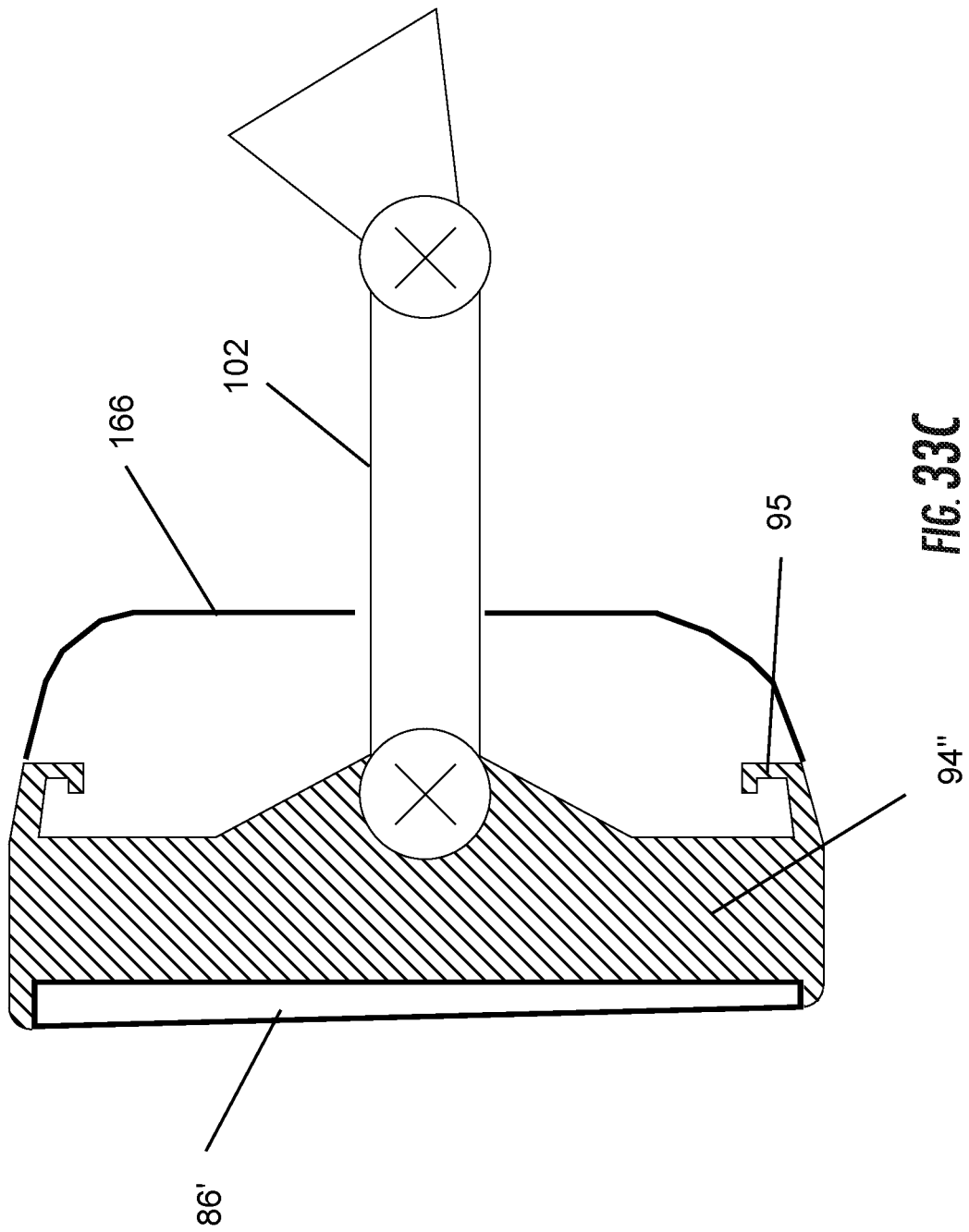

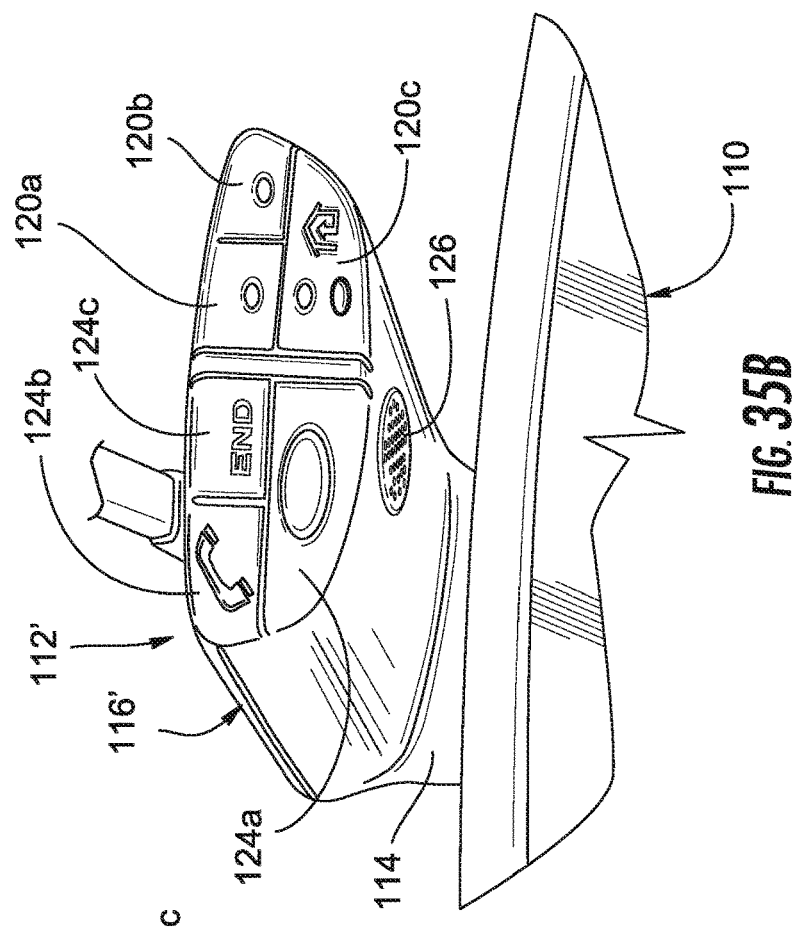
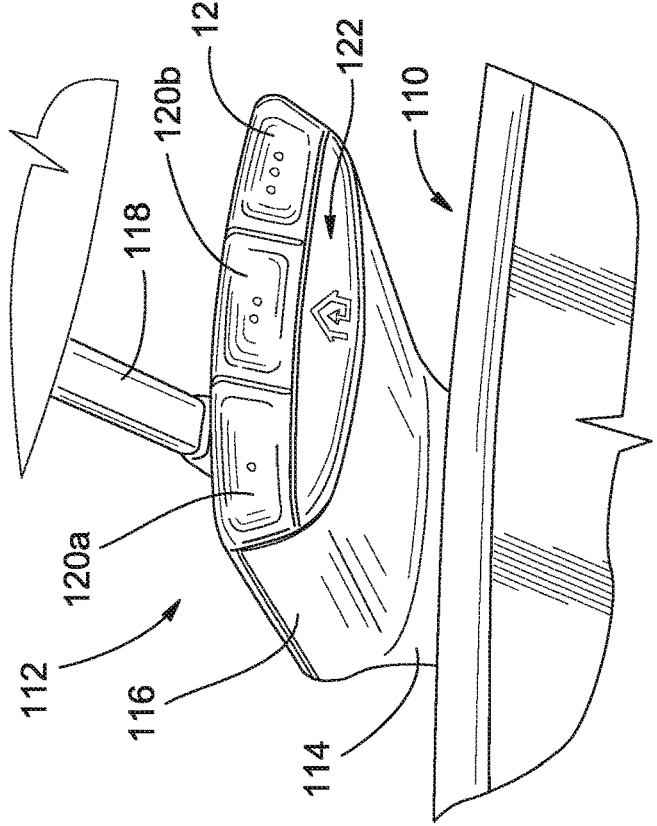
FIG. 35B
FIG. 35A

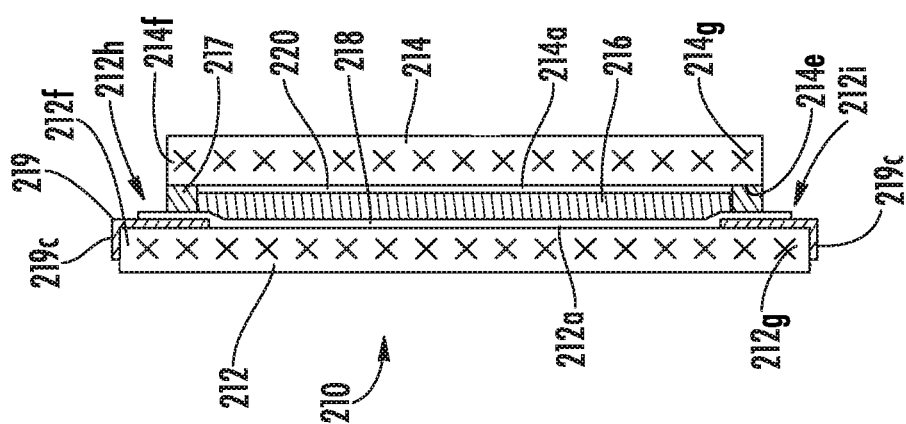
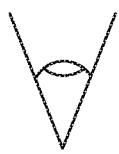
FIG. 36

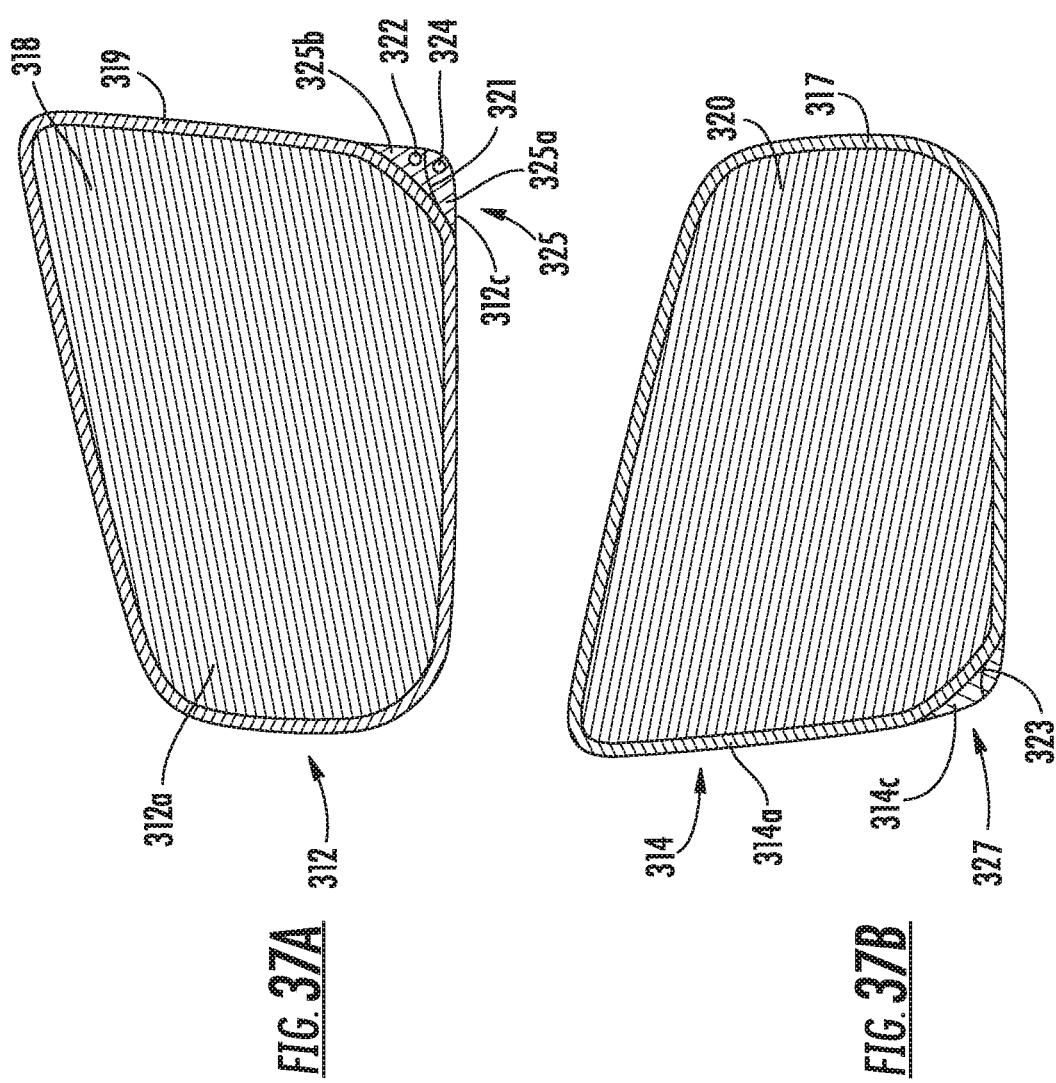

REARVIEW MIRROR ASSEMBLY FOR VEHICLE

CROSS REFERENCE TO RELATED APPLICATIONS

The present application is a continuation of U.S. patent application Ser. No. 16/227,643, filed Dec. 20, 2018, now U.S. Pat. No. 10,449,903, which is a division of U.S. patent application Ser. No. 15/727,685, filed Oct. 9, 2017, now U.S. Pat. No. 10,166,927, which is a continuation of U.S. patent application Ser. No. 15/413,465, filed Jan. 24, 2017, now U.S. Pat. No. 9,783,115, which is a continuation of U.S. patent application Ser. No. 13/964,135, filed Aug. 12, 2013, now U.S. Pat. No. 9,557,584, which is a continuation of U.S. patent application Ser. No. 13/689,800, filed Nov. 30, 2012, now U.S. Pat. No. 8,508,384, which is a continuation of U.S. patent application Ser. No. 13/284,197, filed Oct. 28, 2011, now U.S. Pat. No. 8,325,055, which is a continuation of U.S. patent application Ser. No. 13/035,297, filed Feb. 25, 2011, now U.S. Pat. No. 8,049,640, which is a continuation of U.S. patent application Ser. No. 11/926,882, filed Oct. 29, 2007, now U.S. Pat. No. 7,978,094, which is a continuation of U.S. patent application Ser. No. 10/556,754, filed Nov. 15, 2005, now U.S. Pat. No. 7,289,037, which is a 371 U.S. national phase application of PCT Application No. PCT/US2004/015424, filed May 18, 2004, which claims benefit of U.S. provisional applications, Ser. No. 60/556,259, filed Mar. 25, 2004, Ser. No. 60/525,537, filed Nov. 26, 2003, and Ser. No. 60/471,546, filed May 19, 2003, which are hereby incorporated herein by reference in their entireties.

FIELD OF THE INVENTION

The present invention relates generally to the field of interior rearview mirror assemblies for vehicles and, more particularly, to interior rearview mirror assemblies which incorporate an accessory or feature, particularly an electronic accessory or feature.

BACKGROUND OF THE INVENTION

The base level mirror for a vehicle is often a prismatic mirror assembly, which may provide a low cost mirror for the vehicle. The mirror assembly is often economically assembled by snapping or inserting the toggle assembly and prismatic reflective element into the casing at the front or bezel portion of the mirror casing substantially immediately after the casing (which may be formed of a hot molded polypropylene or the like) is formed and while the casing is still hot and pliable. As the casing cools, it shrinks to secure the reflective element in place in the casing. Because the reflective element is inserted into the casing while the casing is hot (such as after being freshly molded), the timing for the insertion process may be limited. Thus, it may be difficult to install or insert other accessories or components into the casing before the casing cools and shrinks.

It is often desirable to provide an electronic feature in the mirror assembly, such as a compass sensor and/or compass display, a tire pressure monitoring system and/or display and/or the like. In order to facilitate the addition of accessories or other components in the mirror assembly, the mirror assembly may typically have a casing and a separate bezel portion, which allows the accessory or accessories or the like to be installed into the casing (via its front opening) after it has cooled, and then allows the reflective element and bezel portion to be installed at the front portion of the casing. The bezel portion may be snapped to the casing or may be otherwise attached to the casing via sonic welding or the like to secure the bezel portion to the casing and to secure the components or accessories and the reflective element at or within the mirror casing. Although practical, this involves a less economical two-part, non-unitary casing and bezel design.

It is typically preferred to have the unitarily formed casing and bezel portion so that the reflective element is inserted into the casing while the casing is hot and pliable. However, it is also desirable to provide additional features or functions to the mirror assembly. Therefore, there is a need in the art for an improved mirror assembly which overcomes the shortcomings of the prior art.

SUMMARY OF THE INVENTION

The present invention provides an interior rearview mirror assembly which has one or more cap portions which attach or secure to a rear portion of a mirror holder. The mirror holder comprises part of a reflective element assembly portion comprising a mirror reflective element and a bezel portion or the like that preferably encompasses at least a perimeter portion of the reflective element, thereby at least partially securing the reflective element in the reflective element assembly portion. The cap portion or portions may include one or more electronic accessories or circuitry to provide additional features or functions to the mirror assembly. The additional features or functions may thus be back-loaded into the mirror holder after the mirror holder is formed and after the reflective element is attached at the bezel portion or front portion of the mirror holder.

According to an aspect of the present invention, an interior rearview mirror assembly for a vehicle comprises a mirror holder having a front portion and a rear portion, a reflective element positioned at the front portion of the mirror holder and received at least partially within the front portion of the mirror holder, and at least one cap portion. The rear portion of the mirror holder has at least one opening therethrough and the at least one cap portion is attachable to the rear portion of the mirror holder generally at the at least one opening. The at least one cap portion includes circuitry for at least one accessory. The at least one cap portion provides a rear cover for the mirror holder generally over the at least one opening.

According to another aspect of the present invention, a method of manufacturing an interior rearview mirror assembly portion includes forming a first molding by injection molding a first resinous material in a mold. The first resinous material has a tool shrinkage factor of at least approximately 1%. The first molding is at an elevated temperature when the first molding is removed from the mold. A reflective element is provided and positioned at the first molding before the first molding has cooled to approximately ambient temperature. The first molding at least partially encompasses a perimeter portion of the reflective element to form a reflective element assembly portion. The first molding is allowed to cool and shrink to retain the reflective element at the first molding. A cap portion comprises a second resinous material, which has a tool shrinkage factor of at less than or equal to approximately 1%. The cap portion includes at least one accessory. The cap portion is attached to the reflective element assembly portion after the first molding has cooled and shrunk. The cap portion is attached to the reflective element assembly portion such that the accessory is at least partially within the mirror assembly.

The accessory may comprise a compass sensor and/or display, a tire pressure monitoring system receiver/control circuitry and/or display, an antenna, a garage door opener, or any other accessory and/or accessory display and associated circuitry. For example, the circuitry may comprise compass display circuitry and the reflective element may have at least one port or icon or character etched or otherwise formed thereon, and preferably with an element of the circuitry aligned with/juxtaposed with the at least one port or icon or character etched or otherwise formed on the reflective element. The display circuitry may include at least one illumination source or lighting element for projecting illumination through a corresponding or appropriate port or icon or character on the mirror reflective element.

The cap portion or portions may be detachably attached to the mirror holder or first molding or bezel portion, such as via accessible detents or snaps or the like, and may be detachably removable from the mirror holder or first molding or bezel portion for service or replacement. However, the cap portion may alternatively be non-detachably attached, such as by adhesive attachment or by heat staking or by ultrasonic welding or the like.

Therefore, the present invention provides an interior rearview mirror assembly which may include one or more electronic accessories or features. The accessory or feature may be installed at the rear portion of the mirror holder or bezel portion opposite the reflective element, and may be installed after the reflective element is inserted into the freshly molded or hot mirror holder or bezel portion and after the mirror holder has cooled and shrunk to secure the reflective element. Preferably, the accessory or feature may be mounted or positioned at, within or on one or more cap portions (preferably also with any associated wiring, interconnects and/or connectors and the like) which may be secured to the rear portion of the mirror holder and which may form a rear wall or surface of the mirror holder. The cap portion may be snapped to or attached to the mirror holder (which has the reflective element already inserted/installed therein) after the mirror holder has cooled, such that the assembly may be completed at a facility or assembly line that is remote from the facility or line at which the reflective element and mirror holder are assembled together. The present invention thus facilitates the addition of an electronic accessory or feature into a low cost mirror assembly with minimal additional investment to add the accessory or feature. The present invention may thus easily accommodate various features which may be selected by a customer.

These and other objects, advantages, purposes and features of the present invention will become apparent upon review of the following specification in conjunction with the drawings.

BRIEF DESCRIPTION OF THE DRAWINGS

FIG. 5 is an exploded perspective view of another interior rearview mirror assembly in accordance with the present invention;

FIG. 14 is a front elevation of another interior rearview mirror assembly, showing another compass display in accordance with the present invention;

FIG. 33A is a sectional view of an electrochromic reflective element assembly portion in accordance with the present invention;

FIG. 33B is a sectional view of another electrochromic reflective element assembly portion in accordance with the present invention;

FIG. 33C is a sectional view of a prismatic reflective element assembly portion and rear mirror casing cap portion in accordance with the present invention;

FIGS. 35A-D are perspective views of different accessory modules of the present invention;

FIG. 36 is a sectional view of an electro-optic reflective element assembly;

FIG. 37A is a plan view of the third surface of a rear substrate for an exterior electro-optic reflective element assembly in accordance with the present invention; and FIG. 37B is a plan view of the second surface of a front substrate for the exterior electro-optic reflective element assembly.

DESCRIPTION OF THE PREFERRED EMBODIMENTS

Figure 1:
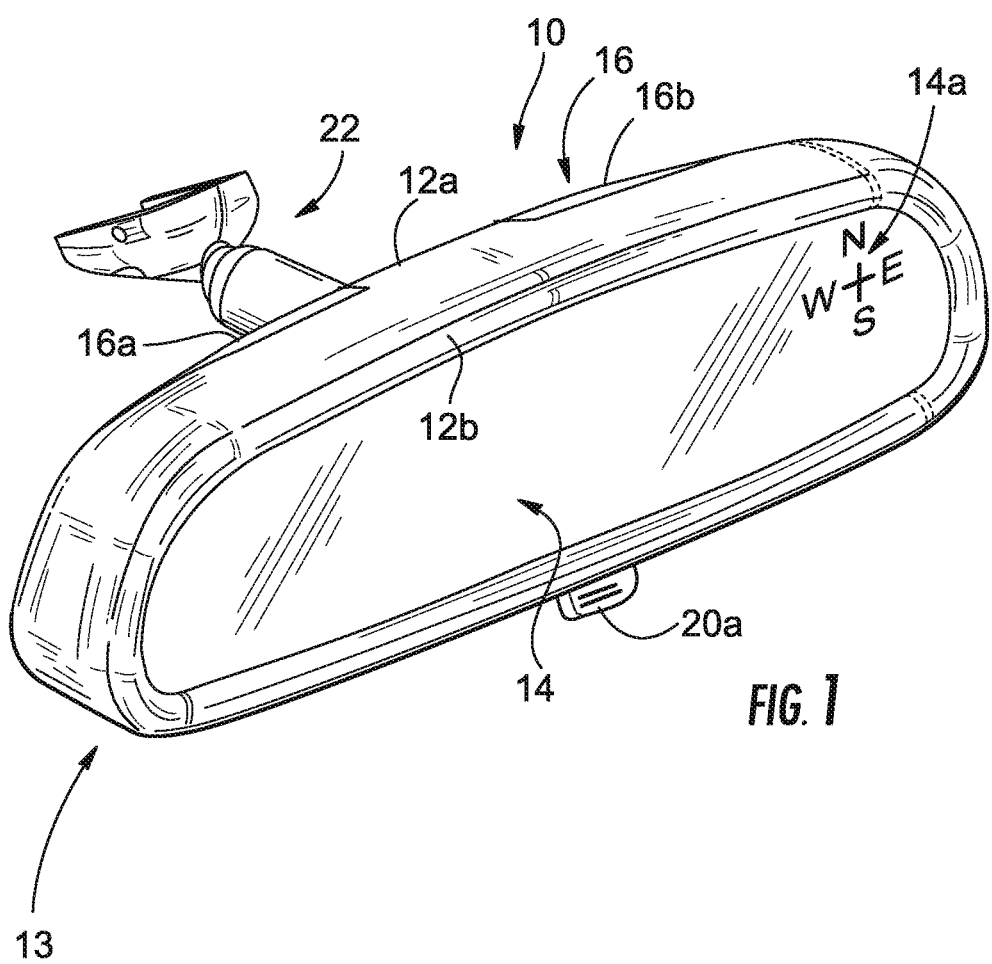
FIG. 1 is a front perspective view of an interior rearview mirror assembly in accordance with the present invention.

Referring now to the drawings and the illustrative embodiments depicted therein, an interior rearview mirror assembly or modular prismatic rearview mirror assembly 10 for a vehicle includes a reflective element assembly portion 13 including a mirror holder 12 and a reflective element 14 (FIG. 1) positioned at and at least partially within the mirror holder and/or bezel portion, that preferably is molded from a polyolefin material, such as a polypropylene material or the like. Mirror assembly 10 includes a plastic molded cap or cap portion 16, preferably molded from an ABS material, an engineering resin material, such as a filled or unfilled nylon material, or the like (and may be integrally molded with metallic or ceramic materials or inserts or the like to provide mechanical bracing and enhanced structural rigidity). Cap portion 16 is mountable or attachable to a rear portion or open portion 12a of mirror holder 12, and may include an accessory or feature or the like, such as a printed circuit board 18 having an electronic accessory or circuitry thereon or integrated therein or attached thereto. Cap portion 16 may be snapped or otherwise mounted to or attached to the open rear portion 12a of mirror holder 12 to install or back-load the printed circuit board and/or accessory within the mirror holder 12 of mirror assembly 10. Cap portion 16 may be detachably mounted or attached to the mirror holder, such as via accessible detents or snaps or the like, and may be removable or detachable from the rear portion of the mirror holder, such as for service or replacement of the cap portion or one or more accessories of the cap portion.

Figure 6:
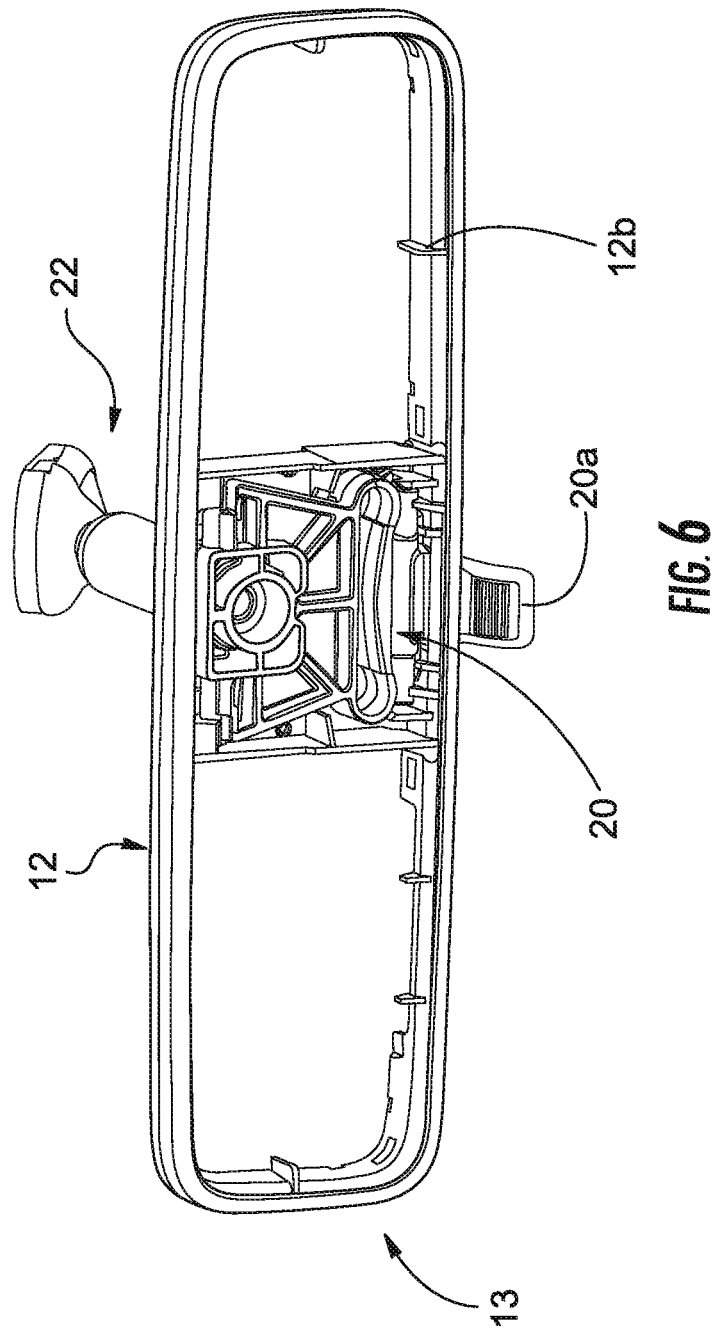
FIG. 6 is a perspective view of a reflective element assembly portion of the mirror assembly of the present invention, with the reflective element removed to show additional details.
Figure 7:
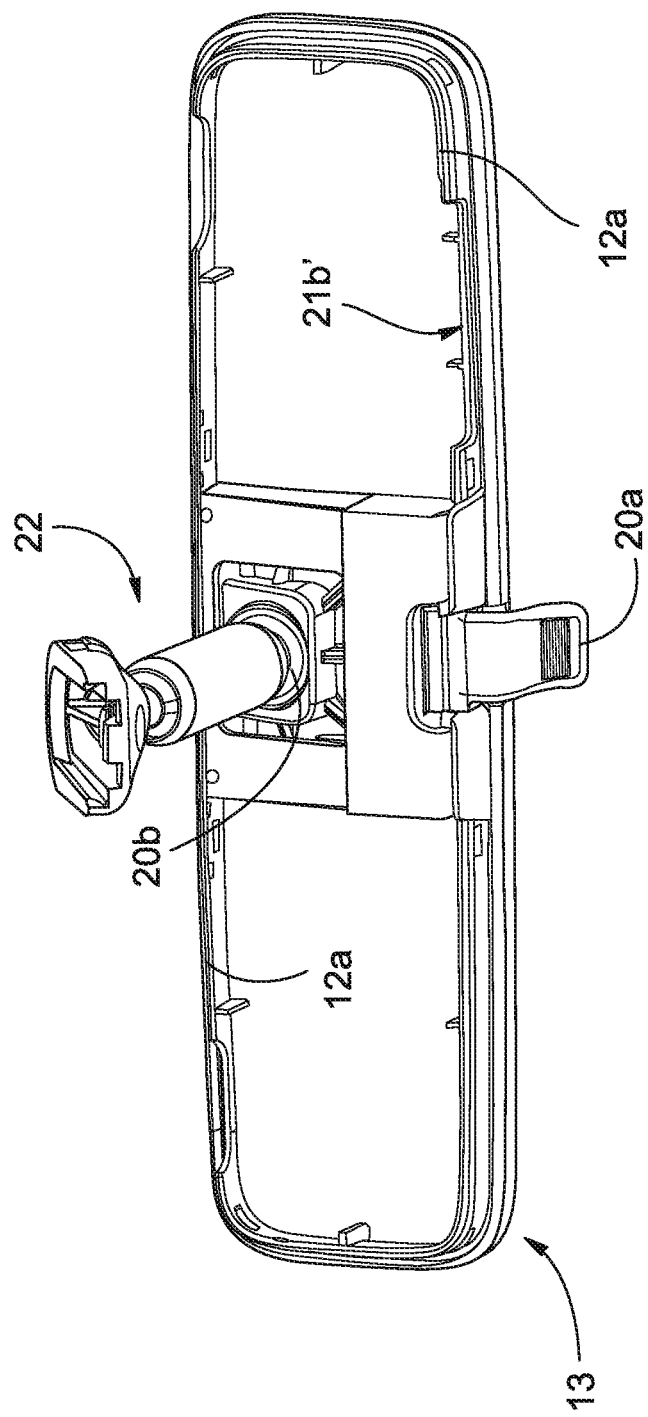
FIG. 7 is an opposite perspective view of the reflective element assembly portion of FIG. 6.
Figure 9:
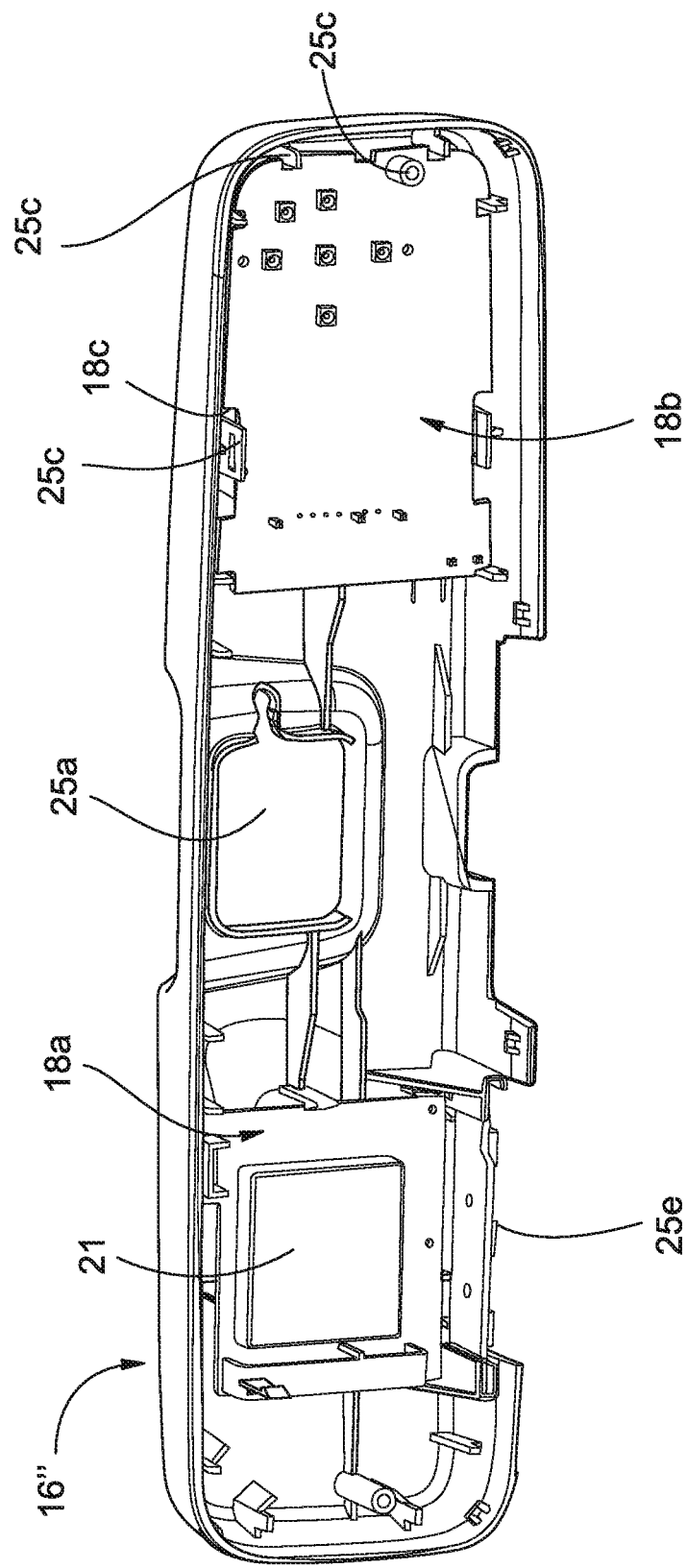
FIG. 9 is a perspective view of a cap portion and circuit boards of FIG. 5, as assembled.
Figure 10:
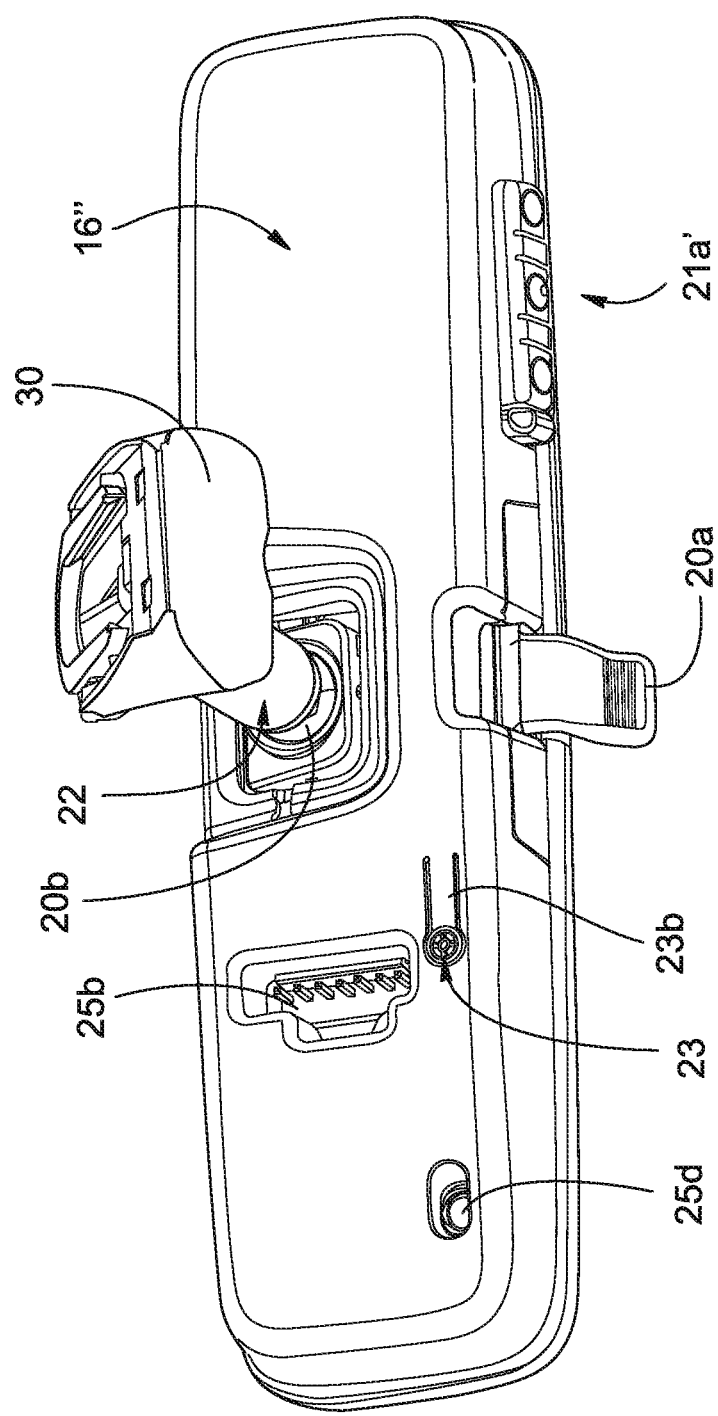
FIG. 10 is a rear perspective view of another interior rearview mirror assembly of the present invention.
Figure 11:
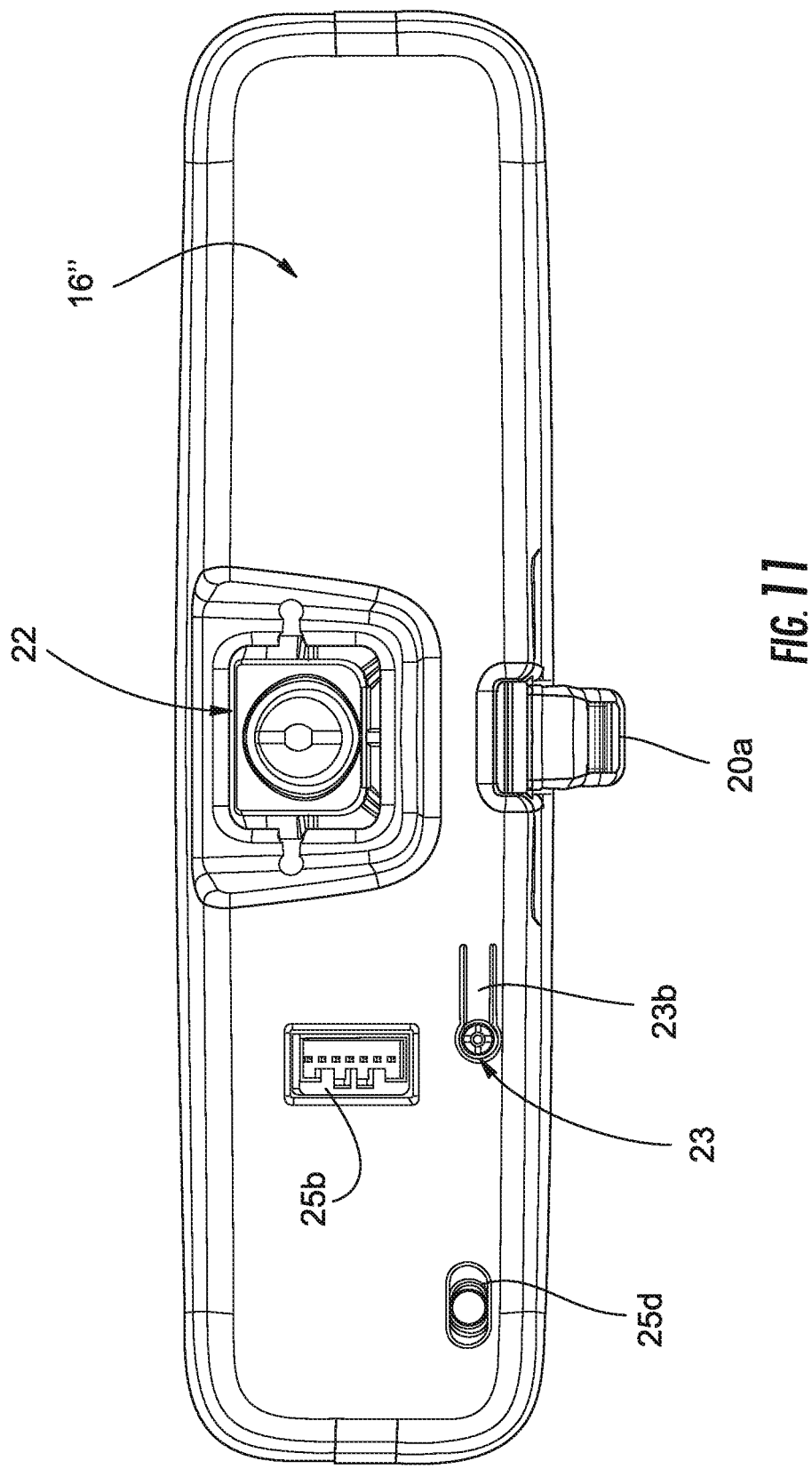
FIG. 11 is a rear elevation of another interior rearview mirror assembly of the present invention.
Figure 12:
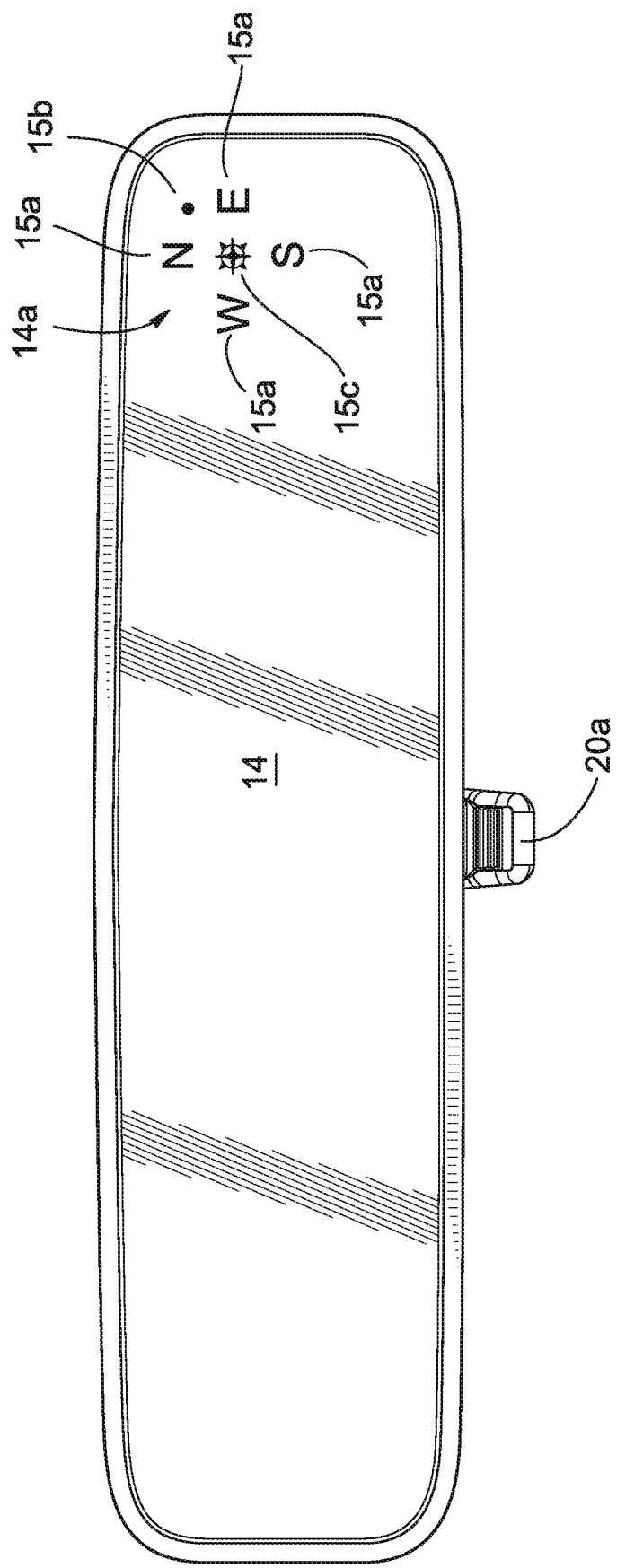
FIG. 12 is a front elevation of an interior rearview mirror assembly, having directional heading or compass display in accordance with the present invention.

Various cap portions of the present invention may be provided with different options or accessories, and may be selected to mount to or attach to a universal or common mirror holder to form different mirror assemblies having different content. The present invention thus allows an automobile manufacturer to order or purchase common or standard mirror holders or reflective element assembly portions and different or custom cap portions and to assemble the mirror assembly with the desired cap portion and content at the vehicle assembly plant. The automobile manufacturer may even choose to purchase the mirror holders (which may include the reflective element) from one source and the cap portions from another source, and may complete the mirror assembly at the vehicle assembly plant or at another facility, such as a mirror assembly plant or the like. The present invention thus allows an automobile manufacturer to order or purchase the mirror holder and reflective element (and maybe the toggle assembly and mounting assembly as well, such as shown in FIGS. 6 and 7) from a mirror specialist, and the cap portions and accessories (such as shown in FIG. 9) from an electronics specialist. The cap portion may snap or otherwise attach to the mirror holder to complete the assembly of the rearview mirror assembly.

Because the cap portion or portions may be purchased separately, the present invention lends itself to aftermarket applications or to dealership or consumer custom izations/personalizations, where a cap portion having the desired accessories or appearance or design may be purchased and installed to a mirror holder to alter or upgrade the mirror assembly of the vehicle. It is envisioned that such an upgrade could be made to a base mirror that does not originally include any electronic accessories, whereby the cap portion could provide electrical content to the mirror assembly. In such applications, the cap portion may connect to a power source or the like of the vehicle (such as via a wire or cable that extends between the mirror assembly and the headliner or an accessory module of the vehicle when the mirror assembly is installed in the vehicle) or the cap portion may include a battery or self-contained power source to provide power to the accessories and circuitry contained within the cap portion, such as discussed below with respect to FIG. 28.

In an aftermarket application, cap portions may be provided as aftermarket cap portions, and a consumer may purchase a desired cap portion, which may have desired content or features and/or may have a desired color or texture or appearance or the like, and may readily remove the existing cap portion from the mirror of their vehicle and replace it with the new cap portion. For example, the cap portion and/or the mirror holder may have snaps or clasps that may retain the cap portion and the mirror holder together, but that may release or detach such that the cap portion may be detachable from the mirror holder by a user. The cap portion may be pulled or detached from the mirror holder and a new cap portion may be pressed or snapped into place on the mirror holder to provide the vehicle owner with the new cap portion having the desired content or functions or features and/or the desired appearance or the like, as discussed in detail below.

Reflective element 14 may comprise a prismatic reflective element having a wedge shaped prism with a reflective coating on its rear surface, such as described in U.S. Pat. Nos. 6,318,870; 5,327,288; 4,948,242; 4,826,289; 4,436,371 and 4,435,042; and/or U.S. pat. application Ser. No. 10/709,434, filed May 5, 2004, now U.S. Pat. No. 7,420,756; and/or U.S. provisional application Ser. No. 60/525,952, filed Nov. 26, 2003, which are all hereby incorporated herein by reference. Reflective element 14 may include one or more displays which may be laser-etched or otherwise formed thereon, such as via an appliqué or the like on the surface of the reflective element or such as a display on demand type of display (discussed below). The display may include one or more display elements, such as illumination sources, such as vacuum fluorescent (VF) elements, liquid crystal displays (LCDs), light emitting diodes (LEDs), such as inorganic LEDs or organic light emitting diodes (OLEDs), electroluminescent (EL) elements or the like. Optionally, the prismatic reflective element may comprise a display on demand or transflective prismatic element (such as described in PCT Application No. PCT/US03/29776, filed Sep. 19, 2003 and published Apr. 1, 2004 as International Publication No. WO 2004/026633; and/or U.S. provisional application Ser. No. 60/525,952, filed Nov. 26, 2003, which are all hereby incorporated herein by reference) so that the displays are viewable through the reflective element, while the display area still functions to substantially reflect light, in order to provide a generally uniform prismatic reflective element even in the areas that have display elements positioned behind the reflective element.

For example, as shown in FIGS. 1-5 and 12, prismatic reflective element 14 may include a compass display 14a and/or other display, such as a passenger side inflatable restraint status display 14b (FIGS. 2-4) or the like, formed or etched on the reflective element. For example, the compass display 14a may include ports 15a, such as icons, characters or directional headings (N, S, E, W), etched or formed in the reflective coating of the reflective element (such as via removing the reflective coating of the reflective element to form a desired port or icon or character and/or such as by utilizing aspects described in U.S. Pat. No. 4,882,565, issued to Gallmeyer, which is hereby incorporated herein by reference) to allow light from corresponding illumination sources or elements 19a (such as light emitting diodes or the like) to pass through the reflective element to illuminate or back light the appropriate port or icon or heading character for viewing by the driver or occupant of the vehicle, such as similar to the compass systems disclosed in U.S. patent application Ser. No. 10/456,599, filed Jun. 6, 2003, now U.S. Pat. No. 7,004,593, which is hereby incorporated herein by reference in its entirety, and as discussed below.

As shown in FIG. 5, the reflective element 14 may include an anti-scatter film or sheet or tape 14c applied over its rear surface. The tape 14c may be adhered or otherwise attached to the rear surface of the reflective element so as to limit shattering or scattering of the mirror glass if the vehicle is involved in an accident. Also, the reflective element 14 may include a display appliqué 14d that may be adhered or applied to the rear surface of the reflective element in the general region of the display 14a (and/or at the region of other displays at the reflective element). The display appliqué 14d may comprise a diffusing element or material, such as a white diffusing material with a smoked front or the like, to diffuse the light emitted by the display elements so that a person viewing the display 14a will not readily discern the individual lighting elements or filaments, but will view substantially uniform illumination provided by the lighting elements or filaments.

Interior rearview mirror assembly 10 may include a toggle assembly 20 and a mounting portion 22, which may be pivotally connected to toggle assembly 20 and mounted to the vehicle to provide pivotal movement of the mirror holder and reflective element relative to the vehicle. Toggle assembly 20 may include a toggle member 20a, which may be actuated or moved by a user to adjust the mirror holder and reflective element relative to the vehicle. Optionally, toggle member 20a may comprise a soft touch surface or portion, such as disclosed in U.S. Pat. Nos. 6,318,870 and 6,349,450, which are hereby incorporated herein by reference. Such a soft touch surface or portion preferably comprises a soft touch material (such as a thermoplastic elastomer or other similar thermoplastic materials, such as Santoprene or the like), preferably having a Shore A durometer value of less than about 110 Shore A, more preferably less than about 90 Shore A, and most preferably less than about 70 Shore A, that may be molded over a rigid or harder material or structure, such as by utilizing aspects described in U.S. Pat. No. 6,349,450, which is hereby incorporated herein by reference. The toggle assembly or the mirror holder may also include a pivot joint or pivot element 20b, such as a socket and/or ball member, molded or formed thereon or attached or mounted thereto, in order to provide pivotal movement or adjustment of the mirror assembly relative to the mounting arm or portion. The mounting portion 22 may be mounted to the vehicle, such as to an interior surface of the vehicle windshield or to a header portion of the vehicle or the like, via any mounting arm and button or any other mounting arrangement or construction, such as the types disclosed in U.S. Pat. Nos. 6,499,850; 6,318,870; 6,315,421; 6,227,675; 5,671,996; 5,813,745; 5,673,994; 5,820,097; 5,708,410; 5,680,263; 5,582,383; 5,576,687; 5,555,136; 5,521,760; 5,330,149; 5,100,095; 5,058,851; 4,930,742; 4,936,533; 4,436,371; 4,524,941; 4,435,042 and/or 4,646,210; and/or PCT Publication No. WO 03/095269, published Nov. 20, 2003; and/or PCT Publication No. WO 03/099614, published Dec. 4, 2003, which are hereby incorporated by reference herein, without affecting the scope of the present invention. Optionally, the mirror assembly may be mounted to the vehicle portion (such as to the windshield or headliner of the vehicle) via a substantially plastic or all plastic double ball mounting arrangement, such as described in U.S. Pat. No. 6,318,870 and/or U.S. patent application Ser. No. 10/032,401, filed Dec. 20, 2001, now U.S. Pat. No. 6,877,709, which are hereby incorporated herein by reference. The mounting arrangement may be configured to provide for wiring to the mirror assembly through the mounting arrangement and to or into the mirror assembly, without affecting the scope of the present invention.

During assembly of the reflective element assembly portion, the mounting member or arm may be inserted into the socket portion at the reflective element assembly portion (such as at the reflective element or at a backing plate of the reflective element or at a toggle assembly of the mirror assembly or the like) via an automated device or machine or by a robot. The automatic device or machine may be used to attach or snap the front end of the mounting member to the socket portion at the reflective element.

Optionally, the mirror assembly may provide or include an automatic flip prismatic reflective element, such as described in U.S. Pat. Nos. 6,717,712; 6,568,414 and/or 6,382,806, which are hereby incorporated herein by reference. Because the circuit board and any display elements positioned thereon is/are generally fixedly secured to the cap portion, which in turn is generally fixedly secured to or relative to the mirror holder and reflective element, the circuit board and display elements move with the reflective element during adjustment of the mirror, such that there is substantially no change in the juxtapositioning/alignment of the lighting or display through the prismatic reflective element.

Mirror holder 12 of interior rearview mirror assembly 10 preferably comprises a unitary or one-piece mirror holder (preferably molded from a thermoplastic resin, such as a polyolefin, such as polypropylene or the like), which may be molded or otherwise formed with a bezel portion 12b integrally formed therewith, and which receives the prismatic reflective element therein. As shown in FIGS. 6 and 7, the toggle assembly 20 and mounting portion 22 may be attached to the mirror holder/bezel portion 12, preferably while the mirror holder is still warm and pliable. Although not shown in FIGS. 6 and 7, the reflective element 14 may be attached to or inserted into the mirror holder/bezel portion 12 at around the same time to form a mirror holder assembly that may be attached to the appropriate or desired cap portion, as discussed below. The reflective element and molded portion or bezel portion thus may define a reflective element assembly portion 13 of the mirror assembly 10. The toggle assembly 20 and the prismatic reflective element 14 thus may be secured into place (such as by snapping together) at or in the mirror holder 12 while the molded mirror holder (preferably the freshly molded mirror holder) is still warm and pliable, such as disclosed in U.S. Pat. No. 4,436,371, issued to Wood et al., which is hereby incorporated herein by reference. When the molded mirror holder (preferably the freshly molded mirror holder and thus just exiting the injection molding press, or alternately, and less desirably, a heated mirror holder having been heated, such as in an oven or the like, to make the mirror holder warm and pliable) cools and shrinks, the mirror holder grips around the toggle assembly and the prismatic reflective element to retain the toggle assembly and the reflective element in the reflective element assembly portion.

The material of the mirror holder or bezel portion, and/or of the reflective element assembly portion in totality, may be selected to have a desired linear mold shrinkage or tool shrinkage factor to provide the desired amount or degree of shrinkage as the mirror holder cools and shrinks around the reflective element to secure the reflective element at the mirror holder or bezel portion. For example, at least the bezel material, and preferably the reflective element assembly portion in totality, may have a linear mold shrinkage or tool shrinkage factor of preferably at least about 0.01 cm/cm or about 1%, and more preferably at least about 0.015 cm/cm or about 1.5%. For example, a UV stabilized, general purpose black polypropylene polymeric molding resinous material, such as is commercially available from Huntsman Corp. of Houston, Tex. under the trade name REXENE 17C9A, and having a tool shrinkage factor of 0.018 cm/cm or 1.8%, may be a suitable material for the bezel portion in that it provides a desired degree of shrinkage around the reflective element as the material cools, and after formation of the mirror holder or bezel portion by molding in an injection molding operation and/or after heating an already-molded mirror holder or bezel portion to an elevated temperature (such as greater than 70 degrees Celsius or higher), in order to sufficiently retain the reflective element at the bezel portion.

The linear mold shrinkage or tool shrinkage factors, as known in the material science arts, are determinable by test standards, such as by test standards set by the American Society for Testing and Materials (ASTM), such as the ASTM D 955 (Standard Test Method of Measuring Shrinkage from Mold Dimensions of Thermoplastics), which is hereby incorporated herein by reference, or such as by ISO 294-4, which is hereby incorporated herein by reference. The test measures the shrinkage from the mold cavity to the molded dimensions of thermoplastics when molded by compression or injection molding processes with specified process conditions or parameters.

Figure 2:
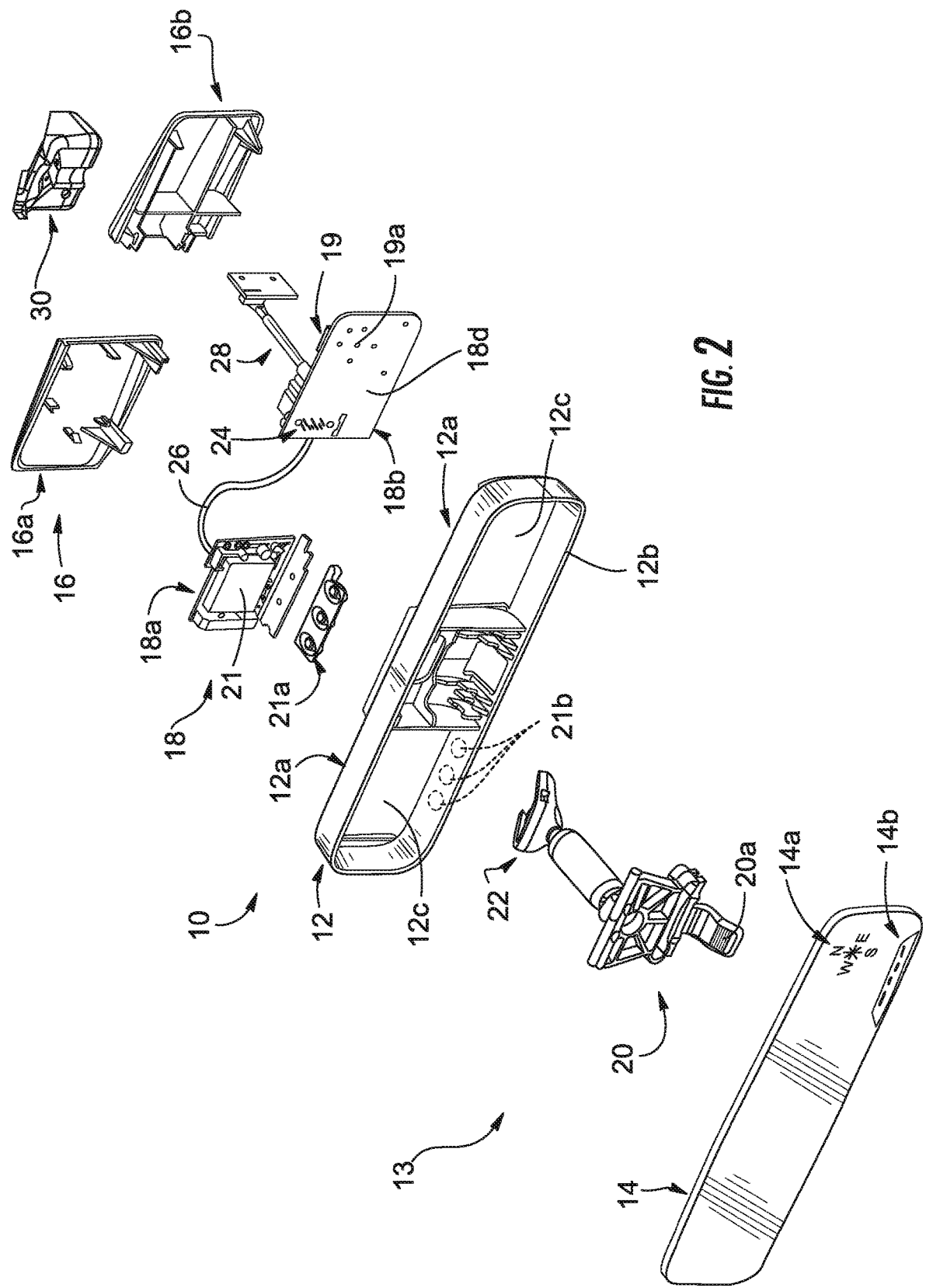
FIG. 2 is an exploded perspective view of the interior rearview mirror assembly of FIG. 1.
Figure 3:
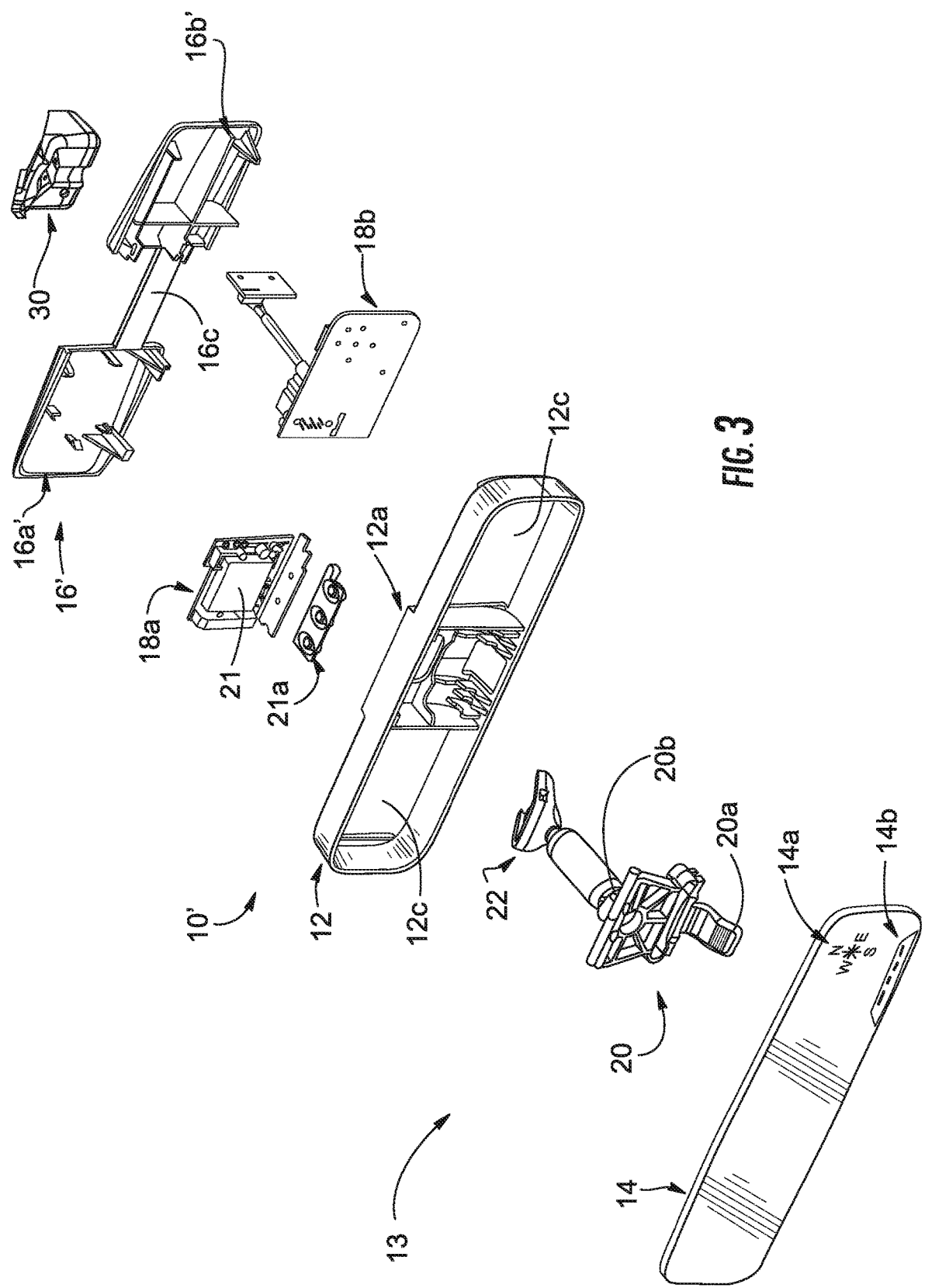
FIG. 3 is an exploded perspective view of another interior rearview mirror assembly in accordance with the present invention.

As shown in FIGS. 2 and 3, the rear portion 12a of mirror holder 12 may have openings or apertures 12c formed therethrough at either or both sides of the toggle assembly to allow for insertion of the accessory or accessories supported by the corresponding cap portions, as discussed below. Optionally, and as shown in FIGS. 4-7, the mirror holder 12' may be substantially open for a unitary cap portion 16" to attach at, as also discussed below.

After the mirror holder and reflective element are assembled together, and maybe after the mirror holder has cooled and shrunk (such as in applications where the reflective element/mirror holder assembly is provided or shipped from a different location than where the cap portion and electrical circuitry or electrical content are from), the cap portion 16 may be attached or secured to the rear portion 12a of mirror holder 12 to complete the assembly of rearview mirror assembly 10. In comparison to the bezel material, the material selected for the cap portion need not have such shrinkage properties as described above, because the cap portion may be fabricated at and supplied from separate operations, locations and/or facilities than the bezel portion. However, the cap portion may be fabricated at the same facility or location, but could be made during a different operation and/or at a different time, without affecting the scope of the present invention. For example, the cap portion preferably is formed by injection molding of a polymeric resinous material having a tool shrinkage factor of less than and preferably substantially less than about 0.01 cm/cm or about 1% (although it may also have higher tool shrinkage factors, without affecting the scope of the present invention), and preferably less than approximately 0.008 cm/cm or about 0.8%. This enables the provision in the cap portion of material properties not readily deliverable by the higher linear mold shrinkage or tool shrinkage factor materials used for the bezel portion.

For example, the cap portion material may have a higher heat stability/higher heat deflection property/higher flexural modulus compared to the reflective element assembly portion, in order to maintain any accessories or elements mechanically attached thereto or therein. Also, the cap portion material may be selected to provide a higher structural strength if desired. For example, the cap portion material may comprise a high temperature ABS material, such as available from BASF or others under the trade name TERLURAN® GRADE-HH106, which has a tool shrinkage factor of around 0.006 cm/cm or 0.6%, or other suitable materials, such as Nylon and preferably a filled Nylon material or the like. Such a material may also provide structural characteristics that are suitable for supporting accessories or the like. For example, the cap portion material may desirably have a heat deflection temperature under load of 0.45 MPa of greater than approximately 100 degrees Celsius (and more desirably, greater than approximately 110 degrees Celsius and most desirably greater than approximately 115 degrees Celsius), as determined by standard testing, such as by ASTM 648 or ISO 75-1/-2 (which are hereby incorporated herein by reference) or the like. Such testing may determine the temperature at which an arbitrary deformation occurs when a specimen of the material is subjected to an arbitrary set of testing conditions or parameters.

The tool shrinkage factor of the resinous material molded to form the cap portion thus is preferably less than the tool shrinkage factor of the resinous material molded to form the bezel portion of the reflective element assembly portion. Also, the flexural modulus of the material that forms the cap portion may preferably be greater than the flexural modulus of the material that forms the mirror holder or bezel portion. Also, the material that forms the cap portion may preferably have a higher heat deflection temperature (such as may be determined by standard testing, such as ASTM D-790, which is hereby incorporated herein by reference) than the material that forms the bezel portion or mirror holder. Such standardized testing may determine the flexural properties or flexural strength of the material via bending or breaking of specimens of the material in accordance with the appropriate test parameters. Desirably, although the polymeric resinous materials used for the bezel portion and the cap portion may be different, the portions may have similar exterior finishes and/or textures. Alternatively, however, the portions may have different finishes and/or textures or the like as discussed below, without affecting the scope of the present invention.

Optionally, and as described above, the mirror holder and reflective element assembly portion may be packaged and moved to another facility and/or the cap portion may be received from another facility to complete the mirror assembly. The appropriate or selected cap portion (with the appropriate associated electrical circuitry/accessory/content) may then be attached to the reflective element/mirror holder assembly, such as at the vehicle assembly line, to assemble the mirror assembly for installation into the appropriate vehicle having the optional content of the mirror assembly, as discussed below. The modular mirror assembly of the present invention thus facilitates assembly of the reflective element assembly portion and of the cap portion at different assembly locations, whereby the two portions may be joined or assembled together at a different location, such as at the vehicle assembly plant, to complete the mirror assembly. The cap portion may attach to the reflective element assembly portion via a snap together connection or other type of connection, and may removably or detachably attach, so that the cap portion may be removed from the reflective element assembly portion if desired. However, the cap portion may alternatively be non-detachably attached, such as by adhesive attachment or by heat staking or by ultrasonic welding or the like, without affecting the scope of the present invention. The cap portion may attach to the reflective element assembly portion via any manner, such as, for example, utilizing aspects described in U.S. Pat. No. 6,402,331, which is hereby incorporated herein by reference. Thus, the present invention encompasses customization/selection of material properties for the cap portion to be different from material properties selected for the reflective element assembly portion so that decorative finishes and/or functional properties may be customized/delivered to be the same or different for one or both of the portions.

Optionally, one or more accessory modules or blocks (such as discussed below) may be attached to or inserted or plugged into the cap portion and/or mirror assembly, such as at the vehicle assembly line, to provide a desired or selected or customized optional feature or accessory to the mirror assembly. The accessory module may insert or attach to the mirror assembly or cap portion utilizing aspects described in U.S. Pat. Nos. 6,672,744; 6,402,331; 6,386,742 and 6,124,886, and/or U.S. patent application Ser. No. 10/739,766, filed Dec. 18, 2003, now U.S. Pat. No. 6,877,888, which are hereby incorporated herein by reference. The accessory module may include circuitry and display elements and user inputs, and may plug into the cap portion or mirror assembly in a manner whereby mechanical and electrical connections are preferably simultaneously made as the module is inserted into the cap portion or mirror assembly, such as by utilizing aspects described in U.S. Pat. No. 6,669,267, and/or U.S. patent application Ser. No. 10/727,731, filed Dec. 3, 2003, now U.S. Pat. No. 6,969,101, which are hereby incorporated herein by reference. The mirror assemblies thus may be customized to particular work orders or selected options at the vehicle assembly line via insertion or attachment of the appropriate accessory module, such that the cap portion and the reflective element assembly portion may comprises common or universal components for two or more options offered for the particular mirror assembly or vehicle application.

The modular mirror assembly of the present invention thus may provide fully assembled mirror assemblies to a vehicle assembly plant and line, where the cap portion and selected content are attached to the reflective element assembly portion at a remote location, such that different mirror assemblies are provided for different options or applications. Optionally, the modular mirror assembly may provide a universal or common reflective element assembly portion to a vehicle assembly plant, and a selected cap portion (with the appropriate or desired or selected optional content) may be attached to the reflective element assembly portion at the vehicle assembly line to customize the mirror assembly for the particular selected option or application. Optionally, the modular mirror assembly of the present invention may provide a universal reflective element assembly portion and a partially or substantially universal (at least universal as to two or more selectable options) cap portion, whereby the selected accessory module may be inserted into or attached to the cap portion and/or mirror assembly at the vehicle assembly line to complete the mirror assembly and to provide the desired or selected option or feature to the mirror assembly.

As shown in FIG. 2, cap portion 16 may comprise two separate cap portions 16a, 16b, or a cap portion 16' (FIG. 3) may have two cap portions 16a', 16b' joined together by a connecting portion or wire channel 16c. One or both of the cap portions 16a, 16b may have an accessory or circuit board 18a, 18b attached thereto. The circuit board or boards may snap or otherwise affix or secure to the cap portion or portions. As shown in FIG. 2, the cap portions may have retainers or pillars extending from an interior surface for retaining and supporting the circuit board or boards thereon. Optionally, the cap portion may comprise a unitary cap portion 16" (FIGS. 4, 5, 8-11, 24 and 26) substantially covering the rear portion of the mirror holder (opposite the reflective element) and receiving or supporting one or more printed circuit boards thereon. The cap portion may receive the mounting portion 22 between the side portions of the cap portion 16' (FIG. 3) or through an opening 25a in the cap portion 16" (FIGS. 4, 8-11, 24 and 26) as the cap portion is attached to the mirror holder. For example, the mounting portion 22 may be threaded through the opening 25a in the cap portion as the cap portion is moved toward and into engagement with the bezel portion during the mirror assembly process. The mirror assemblies 10' and 10" (with cap portions 16' and 16", respectively) may be substantially similar to and may have substantially similar components and accessories as mirror assembly 10 (with cap portions 16a, 16b), such that a detailed description will not be repeated for the different mirror assemblies. The common or similar components of the mirror assemblies are referred to in FIGS. 2-11 with the same reference numbers.

The cap portion 16 or portions 16a, 16b may be positioned at openings 12c of mirror holder 12 such that the accessories or circuitry supported by the cap portions are positioned generally within mirror holder 12. The cap portions may snap onto the rear portion 12a of mirror holder 12 and generally cover the openings 12c in mirror holder 12. Optionally, the unitary cap portion 16" may snap onto or otherwise secure to the mirror holder and generally cover or define the rear portion of the mirror assembly when so assembled. The cap portion or portions thus support the circuit board or circuit boards and associated circuitry and/or accessories at or within the mirror assembly.

Optionally, the circuit boards or accessories may be provided at, within or on the cap portions at a cap portion manufacturing facility or electrical accessory manufacturing facility, such that the cap portion and circuitry assemblies are provided as a unit to the mirror assembly facility or plant. The cap portion and circuitry units may then be snapped or otherwise affixed to the mirror holder or reflective element assembly portion of an appropriate mirror assembly having features or components or displays corresponding to the cap portion and circuitry units, as discussed below. The assembly or back-loading of the cap portions to the mirror holder and reflective element assembly portion thus may be performed remote from the molding tool for molding the mirror holder, since the cap portions may be mounted to the mirror holder after the mirror holder has cooled and shrunk.

Each cap portion may support one or more desired accessories or circuit boards for providing the desired feature to the mirror assembly. The cap portions, and corresponding accessory or feature or electrical content, may be selected and attached to a universal or common mirror holder to provide different features to the mirror depending on the options selected for a particular application or vehicle. Optionally, the cap portions may be selected/configured to have accessories contained/supported therein to correspond to and be aligned with/juxtapositioned with one or more displays of a particular or respective reflective element secured in the common mirror holder and/or may correspond with a particular mirror holder for applications where the accessory includes buttons or controls which may extend through openings or recesses in the mirror holder for access thereto by the driver or occupant of the vehicle, as discussed in detail below.

The cap portion or cap portions may be snapped or otherwise secured to the rear portion 12a of mirror holder 12, such as generally at and covering corresponding openings 12c through the rear portion 12a of mirror holder 12. The opening or openings 12c may be at either or both sides of the toggle assembly and mounting portion of the mirror assembly. The cap portion may snap over or otherwise interconnect with the respective opening via a plurality of hooks or snap clasps (which may extend from the cap portion or the mirror holder) engaging a plurality of corresponding slots or the like at the other of the cap portion and the mirror holder. The cap portion may be formed to provide an exterior surface which may substantially match the exterior surface of the mirror holder to provide a finished appearance to the mirror assembly when the cap portions are attached to the mirror holder and thus form the rear or back portion of the mirror holder and/or it may provide a contrast or distinctive aesthetic or functional appearance or finish. The mirror holder and the cap portions may be formed of a polypropylene material or a talc-filled polypropylene material or the like, or preferably the mirror holder is formed of a molded polyolefin, while the cap portion is formed of a molded engineering resin, such as ABS or a Nylon or the like. Optionally, the cap portion may comprise a metallic material or may comprise a polymeric molding overcoated with a metallic layer or coating, and may have ribs or ripples to provide enhanced rigidity of the cap portion, without affecting the scope of the present invention.

Optionally, the cap portion may have a different color or texture (such as a chrome or colored or textured surface or the like) than the mirror holder or bezel portion to provide a two-tone configuration to the mirror assembly. Optionally, the cap portion and/or the mirror holder may have a decorative finish, and may be painted or plated, such as electroplated or the like, or may have a film or an in mold film or coating thereon to provide the desired surface to the cap portion and/or the mirror holder. For example, the cap portion (or the mirror holder) may provide a contrast or accent color or may be chrome plated or may be brushed aluminum or the like or may provide an angle variant color (where the perceived color may change depending on the viewing angle) or may provide various colors or patterns or textures or the like as may be desired by a consumer (for example, certain colors or patterns or textures may be provided to target different demographics, such as for targeting teenagers or other age groups or genders or the like). Optionally, the cap portion or bezel portion may have a fabric cover (such as, for example, leather or cloth or denim or other cover material or the like) at and substantially over at least a portion or the entirety of its exterior surface to provide a desired appearance or texture or the like. Optionally, the cap portion and/or the mirror holder or bezel portion may have a soft touch surface, such as a soft touch surface and material similar to that described above (preferably having a Shore A durometer value of less than about 110 Shore A, more preferably less than about 90 Shore A, and most preferably less than about 70 Shore A) with respect to the toggle tab and/or similar to the types described in U.S. Pat. Nos. 6,318,870 and/or 6,349,450, which are hereby incorporated herein by reference. For example, either the mirror holder or the cap portion may have such a soft touch surface independent of the other, or both may have such a soft touch surface or neither may have a soft touch surface. Although the cap portion may be finished with a metallized reflective finish, such as a chrome or chrome-plated finish, the bezel portion desirably may not be chrome or chrome-plated or the like, in order to reduce reflections or glare at the bezel portion around the reflective element, and thus not be specularly reflecting.

It is further envisioned that the cap portion or bezel of the interior or exterior mirror assembly may include a personalization element, such as a logo or text or pattern or other indicia, thereon as desired by the consumer to provide highly personalized and unique mirror assemblies for the particular consumers that purchase the vehicles or the mirror assemblies, such as described in U.S. provisional applications, Ser. No. 60/553,842, filed Mar. 17, 2004; and Ser. No. 60/563,342, filed Apr. 19, 2004, which are hereby incorporated herein by reference. For example, the cap portion may include a school logo and colors, such as, for example, the letters "MSU" in green and white print/background, to provide a desirable appearance to the personalized mirror assembly for a particular consumer, such as, for example, a student or graduate of Michigan State University. Optionally, the cap portion may include other text or logos or brand names or other types of identifying indicia, such as, for example, "FORD" to identify the vehicle manufacturer, or "TOMMY HILFIGER" to identify the vehicle owner's clothing preference or the like, or other text or messages or images or trademarks or colors or patterns or indicia or the like to provide a desired appearance or identification or message or statement or advertisement or logo or sponsorship identification or style or brand identification on the interior or exterior mirror assembly. The mirror assemblies may thus be assembled to have the desired or personalized cap portion with the desired or personalized logo or color or message or indicia thereon to provide the desired or personalized finish or appearance of the interior or exterior mirror assembly.

In an aftermarket application, various cap portions as described above may be provided as aftermarket interior or exterior mirror cap portions. A consumer may then purchase a desired cap portion, which may have desired content or features and/or may have a desired color or texture or appearance or the like, and may readily remove the existing cap portion from the interior or exterior mirror assembly of their vehicle and replace it with the new cap portion. For example, the cap portion and/or the mirror holder or reflective element assembly portion (such as the mirror support arm for an interior rearview mirror assembly or a mirror mount for an exterior rearview mirror assembly) may have snaps or clasps that may retain the cap portion and mirror holder/mount/bezel together, but that may release or detach such that the cap portion may be detachable from the mirror assembly by a user/consumer. The cap portion may be pulled or detached from the mirror assembly and a new cap portion (with the desired content therein and/or personalized text or indicia or colors or the like thereon) may be pressed or snapped into place on the mirror assembly to provide the vehicle owner with the new cap portion having the desired content or functions or features and/or the desired or personalized appearance or the like.

Optionally, the modular mirror assembly of the present invention may provide customizing of other visible or viewable portions of the mirror assembly as well. For example, the flip tab or toggle tab 20*a* (or a rotary knob or the like depending on the type of toggle assembly of the particular mirror assembly) may be removably attached to the toggle assembly, such that the tab may be selected or replaced as desired. The tab may threadedly attach to a threaded stud or bolt or nut or the like at the toggle assembly (or may detachably attach via other means, such as snaps, twist-on connections, a bayonet connection or the like), such that a desired tab may be readily attached to the toggle assembly to provide the desired tab for the mirror assembly. The selectable or replaceable or customized toggle tabs may provide various styles, sizes, shapes, appearances, textures, touches/feels (such as a soft touch material or the like), colors, patterns, indicia (such as logos or icons or the like as described below with respect to the center port 15*c* of the compass display 14*a* in FIGS. 13A-D). The customer/consumer thus may select the desired toggle tab for attachment to the mirror assembly (such as a tab that matches or is associated with the selected cap portion and/or bezel portion and/or reflective element ports (discussed below) or the like) to customize the mirror assembly. The customization and selection or replacement of the toggle tab may occur at the reflective element assembly portion assembly plant or at the mirror assembly plant or at the vehicle assembly plant or at the vehicle dealership or at any other aftermarket facility or the like, without affecting the scope of the present invention. The custom tab may thus be selected and attached or replaced at the mirror assembly to provide a custom appearance without having to retool or mold a different toggle assembly.

Optionally, the bezel portion 12 may be molded of a universal or standard color, finish and/or material, such as a black plastic material or black polypropylene or the like, and an outer rim portion or perimeter trim portion element may attach to a forward edge of the bezel portion (at the viewable side of the reflective element) to provide a desired appearance and/or functionality of the bezel portion of the mirror assembly to the driver and passenger of the vehicle. The bezel portion 12 may be formed to have a recess or trough or lip or the like around its perimeter portion (such as at 12*b* in FIG. 2), and the desired trim portion element may be selected and snapped to or pressed into or otherwise received in/attached to the perimeter portion of the bezel portion to provide the desired appearance/functionality to the mirror assembly. The attachable trim portion element may provide various styles, appearances, textures, touches/feels (such as a rubber or elastomeric material or soft touch material or the like), colors, patterns, indicia (such as logos, icons or the like as described below with respect to the center port 15*c* of the compass display 14*a* in FIGS. 13A-D). The customer thus may select the desired trim portion element for attachment to the bezel portion of the mirror assembly (such as a trim portion element that matches or is associated with the selected cap portion and/or toggle tab and/or reflective element ports (discussed below) or the like) to customize the mirror assembly. The trim portion element may be selected to provide a soft material or an impact absorbing material, and may have a Shore A durometer hardness that is less than that of the bezel portion or mirror holder. The customization and selection or replacement of the trim portion element may occur at the reflective element assembly portion assembly plant or at the mirror assembly plant or at the vehicle assembly plant or at the vehicle dealership or at any other aftermarket facility or the like, without affecting the scope of the present invention. The bezel portion thus may be formed as a universal or common bezel portion, and the viewable rim of the bezel portion (such as around the perimeter of the reflective element and viewable by a driver of the vehicle when the mirror is installed in the vehicle) may be selected or replaced to provide the desired or customized appearance and/or feel of the mirror assembly.

Optionally, the cap portion, or one of the cap portions, such as the cap portion 16*b* on the side of the mirror assembly, such as the side which will be toward the passenger side of the vehicle when the mirror assembly is installed in the vehicle, may include an electrical connector for connecting the accessory or circuit board or boards 18*a*, 18*b* to a vehicle wiring harness or power source of the vehicle. Optionally, the circuit board 18*b* at the cap portion may include a multi-pin connector 24 for connecting to a corresponding multi-pin connector of the vehicle wire harness. In such applications, an opening (such as opening 25*b* of cap portion 16" in FIGS. 4, 5 and 8-11) of sufficient size may be provided in the cap portion (or optionally in the mirror holder) to allow the connector on the wire harness to insert therethrough for connection to the connector on the circuit board 18*b*. The circuit board 18*b* or connector 24 may be substantially supported at the cap portion to provide sufficient support of the connector when a corresponding connector of the wire harness is pushed into engagement with connector 24.

For example, the cap portion or mirror holder may have a connector formed therein, whereby the wire harness may then connect to or plug into the connector at the rear of the mirror assembly. The connector may be formed as a selected or appropriate connector (such as a six pin or eight pin connector or the like) depending on the accessories of the cap portions. Optionally, the connector may be formed with an insert in the mold or tool for forming the cap portion, such that an appropriate insert may be placed in the mold or tool to form the desired or appropriate connector on that particular cap portion. In the illustrated embodiment of FIGS. 4, 5 and 8-11, the connector 24 of the circuit board includes a plurality of pins 24*a* for connecting to a connector or plug, and the cap portion 16" has an opening 25*b* formed therethrough so that the connector or plug may readily connect to the circuit board, and may snap or otherwise be fastened or secured thereto, such as via clasps or the like at the plug and/or at the cap portion 16".

In applications where both cap portions 16a, 16b support an accessory or circuit board, the circuit board 18a on the cap portion 16a (or the circuit board on one side of the unitary cap portion) opposite the connector 24 may be connected to the other circuit board 18b and/or connector 24 via one or more connecting wires 26, in order to provide power and/or control to the accessory on cap portion 16a. The connecting wire or wires 26 may extend between the cap portions 16a, 16b within the mirror holder 12 or may extend along the rear surface of the mirror holder 12, without affecting the scope of the present invention. As shown in FIG. 3, cap portion 16' of an interior rearview mirror assembly 10' may comprise a single cap portion having a wire channel or connector 16c extending between opposite end caps or end portions 16a', 16b'. The connecting wire (not shown in FIG. 3) may extend between the circuit boards 18a, 18b or accessories supported on the end portions 16a', 16b' and may be routed within the wire channel 16c or between the channel 16c and the rear portion 12a of the mirror holder 12. Optionally, and as shown in FIGS. 4, 5, 8-11, 24 and 26, a mirror assembly 10" may have the single or unitary cap portion 16" in accordance with the present invention, and a connecting wire between two circuit boards or accessories may extend along the cap portion to electrically connect the circuit boards or accessories together.

As shown in FIG. 2, printed circuit board 18b may include circuitry 19 for a compass display 14a and/or other accessory display, such as a passenger side inflatable restraint display 14b or the like, at reflective element 12. More particularly, circuit board 18b may include compass display circuitry 19 having a plurality of illumination sources 19a which are individually illuminated or illuminated in combination to project illumination through respective openings in circuit board 18b to illuminate one or more of the ports or direction characters 15a etched or formed in reflective element 14, such as in the manner disclosed in U.S. patent application Ser. No. 10/456,599, filed Jun. 6, 2003, now U.S. Pat. No. 7,004,593, which is hereby incorporated herein by reference in its entirety. The compass display thus may be controlled or actuated by a microcontroller or microprocessor of the cap portion of the mirror assembly. The controller may drive or energize the illumination sources (such as light emitting diodes or the like) directly, without the need for additional display drivers. The direct energization of the illumination sources of the display thus avoids the need for other controllers or drivers within the cap portion or the mirror assembly or the vehicle.

Figure 8:
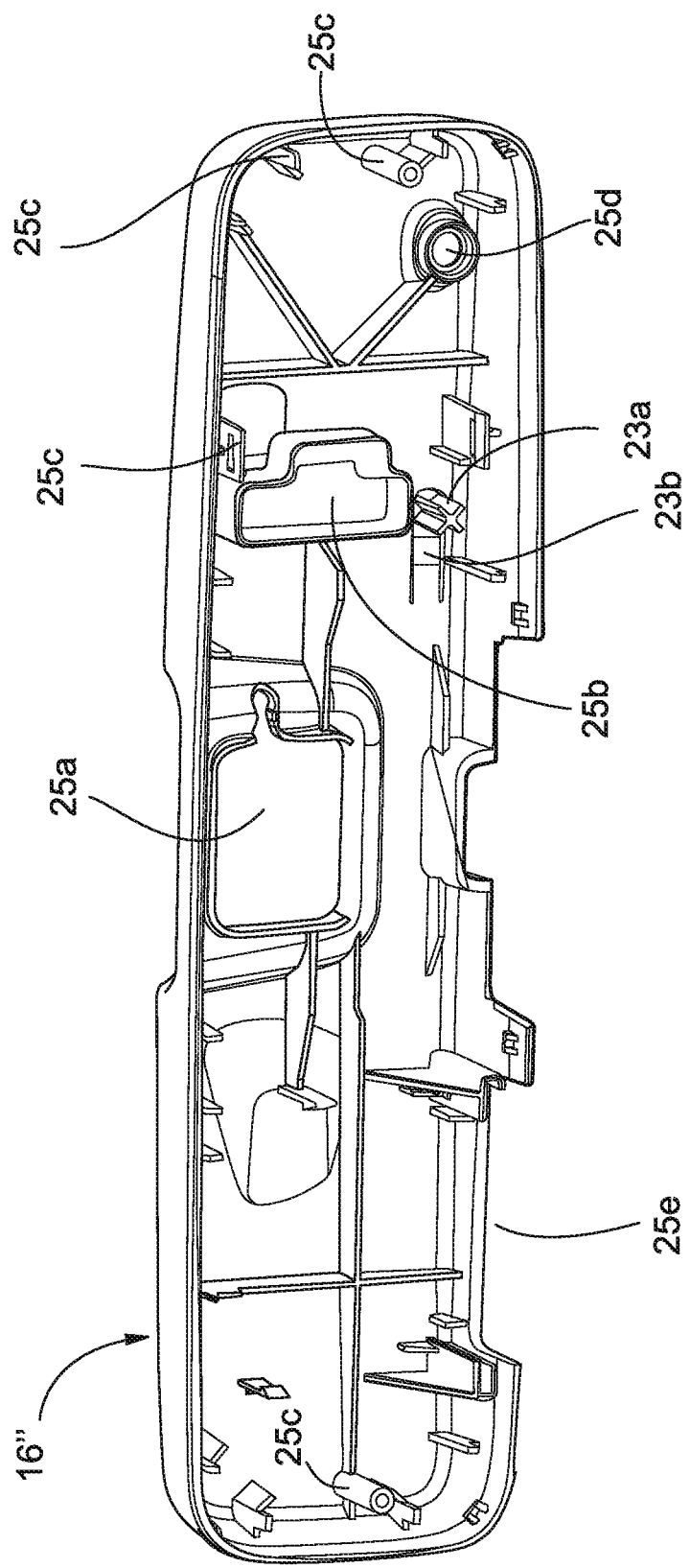
FIG. 8 is a perspective view of a cap portion of the mirror assembly of FIG. 5.

When the cap portion 16b (or cap portion 16" or the like) and circuit board 18b are attached to or juxtaposed with the mirror holder 12, circuit board 18b may be pressed or urged toward the rear surface of reflective element 14 such that the illumination sources 19a (such as light emitting diodes or the like) at the circuit board may generally align with the appropriate ports or characters or icons formed in the reflective element 14, as discussed below. For example, and as best shown in FIGS. 8 and 9, the cap portion may include guide members or posts 25c for engaging corresponding guide members or tabs or holes or notches or recesses 18c of the circuit board for guiding the circuit board into the appropriate position and orientation on the cap portion as the circuit board is attached or snapped to the cap portion. The cap portion may then attach to the mirror holder/bezel portion via engagement and guiding of corresponding tabs and holes and the like, which function to position the cap portion in the desired location relative to the bezel portion, such that the circuit board (and any illumination devices or the like positioned thereon) is/are properly aligned with any associated display ports or switches or the like at the mirror holder/bezel portion/reflective element.

Figure 4:
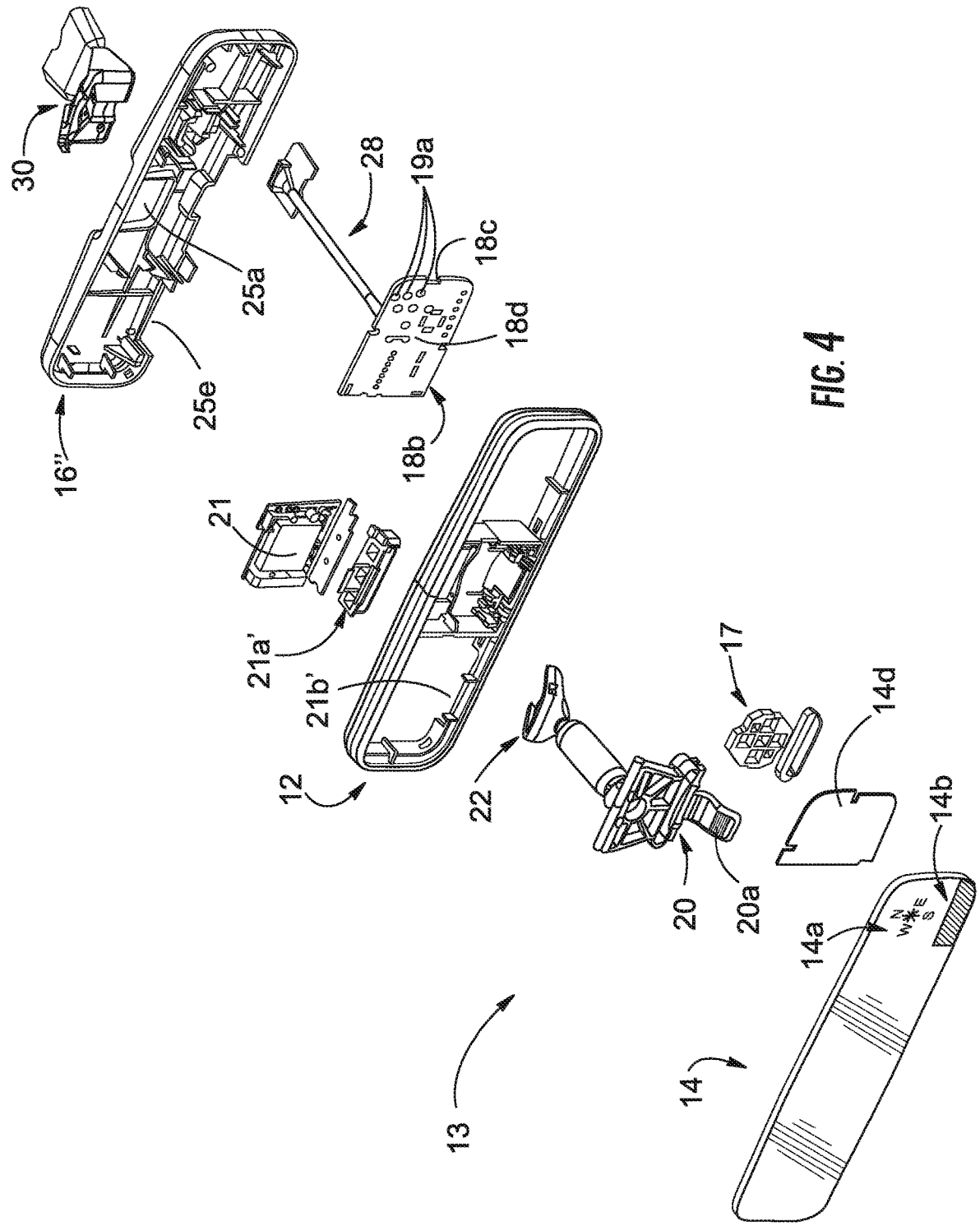
FIG. 4 is an exploded perspective view of another interior rearview mirror assembly in accordance with the present invention.

As shown in FIGS. 4 and 5, a seal or sealing member or layer 17 or the like may be applied to the rear surface of reflective element 14 or to the forward face 18d of circuit board 18b to substantially seal the interface between the circuit board 18b and the reflective element 14, in order to limit or substantially preclude light from one of the illumination sources from illuminating a port or character or icon at the reflective element other than the respective port or character or icon aligned with that illumination source and opening. The seal 17 may comprise an opaque material, and may comprise a white (or other color) silicone gasket or the like, to diffuse and/or reflect light. The seal 17 may be at least partially and preferably substantially flexible or resilient to compress and seal against the reflective element and the circuit board to limit or substantially preclude light leakage from one illumination source to one of the other ports or characters of the display.

The circuit board may also include a connecting wire 28 which may connect to a compass pod or module 30 or other accessory or accessory module or the like for communication of compass heading or control information to the compass display circuitry 19 at the circuit board or for communication of other control information between the accessory module and the circuit board of the cap portion. For example, the connecting wire 28 may extend from the cap portion and the rear of the mirror assembly to the compass module 30, which may be attached to the mounting arm or mounting button of the mirror assembly or otherwise positioned or mounted at or near the mirror assembly. Compass module 30 may include the compass circuitry (which may include calibration circuitry, a microprocessor and the like) and magnetoresponsive compass sensors (such as magnetoresistive sensors, magneto-capacitive sensors, magnetoinductive sensors or the like or a flux gate sensor or the like), such as described in U.S. Pat. Nos. 6,513,252 and 5,802,727, and/or U.S. patent application Ser. No. 10/456, 599, filed Jun. 6, 2003, now U.S. Pat. No. 7,004,593, which are hereby incorporated herein by reference in their entireties. The compass pod may also include an ambient light sensor, whereby the intensity of the compass display (and other displays of the mirror assembly) may be adjusted in response to the detected ambient light levels. Optionally, the compass system may utilize principles disclosed in U.S. Pat. Nos. 5,924,212; 4,862,594; 4,937,945; 5,131,154; 5,255,442 and/or 5,632,092, which are hereby incorporated herein by reference.

Although shown and described as having a separate compass pod that may mount to the mirror mounting portion of the mirror assembly that in turn mounts to the likes of a mirror mounting button on the windshield (such as described in U.S. Pat. Nos. 6,648,478; 5,708,410 and/or 5,576,687, which are hereby incorporated herein by reference) to remain generally stationary, it is envisioned that a compass pod or module or compass circuitry and sensors may be positioned in a post or arm of a single ball mounting arrangement such that the sensors and circuitry are generally fixedly positioned relative to the mounting button and the vehicle. A wire may be routed along the generally fixed mounting arm (via and through the single ball joint) and to the display elements or illumination sources, such as in a manner similar to that shown in FIG. 34, or a wire may be routed along the mounting arm and through the single ball and into the mirror casing or a wire or conductor may be routed or positioned along the arm and ball in any other manner to communicate electrical signals and the like to the circuitry and/or illumination sources of the cap portion, without affecting the scope of the present invention. The wire may provide slack to allow for the adjustment and movement of the mirror holder/cap portion about the single arm to avoid pulling at the wire during adjustment of the mirror.

The compass circuitry 19 on circuit board 18b may also include a button or switch or control or may be in communication with a button or control 23 (FIGS. 8, 10 and 11), such as at the rear of the cap portion 16" or at the rear of the mirror holder, for actuating a calibration or zone function of the compass circuitry. In the illustrated embodiment, the button 23 may include an inward protrusion 23a (FIGS. 8 and 24) that extends forwardly from the cap portion 16" or inwardly toward the button or switch or control on the circuit board when the cap portion 16" is attached to the circuit board. The button 23 may comprise a flexible tab 23b integrally formed with and extending partially along the cap portion 16". When a user presses at the button 23, the tab 23b flexes and the protrusion 23a is moved toward and urged against the button or switch on the circuit board 18b to actuate the switch to control or activate/deactivate the associated function of the compass circuitry (or other circuitry or accessory or the like that may be associated with the switch on the circuit board). Although shown and described as being integrally formed with the single cap portion 16" in FIGS. 8, 10, 11 and 24, the button/flexible tab or flip actuation tab member may be integrally formed on one of the side cap portions 16a, 16b or end portions 16a', 16b' of cap portion 16' or the like, or on other types of casings or housings or the like, without affecting the scope of the present invention.

Optionally, an additional illumination source or lighting element may be provided on the circuit board 18b for projecting illumination through a corresponding port or icon or character 15b formed on the reflective element 14 to indicate that the compass system is in the calibration mode or zone setting mode. Optionally, the calibration mode may be indicated by a light emitting diode (LED) at the center port 15c of the display. For example, a dual-color LED may be provided at the center port, where illumination in one color (such as, for example, red) indicates that the compass system is in the calibration mode. Once the compass system is calibrated, however, illumination may be provided in the other color (such as, for example, blue). Thus, when the compass system is not in the calibration mode, the other color (such as blue) indication color may be provided. Optionally, the calibration mode could be indicated without a dedicated illumination source or light emitting diode or the like (because such an indicator would be used very rarely in the life of the part). For example, the center illumination source or LED (which may be activated to provide an anchor point or focal point for the display, as discussed below) may be flashed or otherwise modulated or adjusted when the system is in the calibration mode, or other similar types of indication may be provided to convey to the driver that the compass is in its calibration mode.

The circuit board 18b may also have an ambient light sensor or photocell (not shown) for detecting the ambient light level at the mirror assembly, whereby the circuitry may adjust the intensity of the display in response to the detected ambient light levels. A corresponding opening in the mirror holder 12 or at the rear of the cap portion 16 (such as opening 25d in cap portion 16" of FIGS. 8, 10 and 11) may allow the ambient light sensor to detect the ambient light levels through the opening. The light sensor may alternately be positioned at the compass pod or module 30, without affecting the scope of the present invention.

The compass display 14a (FIGS. 1-5 and 12) thus may include a plurality of direction indicating ports 15a (such as four such ports formed to represent the cardinal directional points or "N", "E", "S" and "W" or the like) and may include an additional port 15b for a calibration indicator or light source, such as described in U.S. patent application Ser. No. 10/456,599, filed Jun. 6, 2003, now U.S. Pat. No. 7,004,593, which is hereby incorporated herein by reference in its entirety. Compass display 14a may further include a center port 15c etched or otherwise formed at a central region of the display 14a. Center port 15c may provide an opening or port for a rearward facing photosensor positioned at the circuit board to receive light therethrough to determine the ambient light at or in the vehicle cabin (or a glare sensor for determining glare at the mirror assembly for controlling an exterior electrochromic mirror assembly or cell or the like as discussed below) when the mirror assembly is assembled and positioned in the vehicle, such as discussed below.

Optionally, center port 15c may align with an illumination source or light emitting diode at the circuit board to provide a visible center indicator or central anchor or focal point at the central region of the display 14a such that a person may readily identify the center of the compass display. For example, when one of the directional heading indicators at ports 15a are illuminated or energized, the indicator or light source at center port 15c may also be energized to provide a visible central anchor point for a person to recognize as the central region of the display. The provision of an extra illumination source or port that is central to the rosette N-E-S-W indicia thus helps to serve as a reference point for the driver, in order to aid the driver's cognitive association of the cardinal direction point that is intended to be communicated when any one (or combination of two) of the N, E, S, W icons or ports are illuminated.

Optionally, the light emitting diodes aligned with the directional indicating ports 15a may be one color, while the light emitting diodes at the central port 15c and/or at the calibration indicating port 15b may be another color or colors. For example, the directional indicating ports 15a may be illuminated or back lit via blue indicators or light emitting diodes or the like, while the central port 15c may be illuminated or back lit via a red or amber indicator or light emitting diode or the like, so that a person viewing the compass display in darkened conditions may readily discern which indicator is indicative of the central region of the display and thus where the center of the display is, such that the person may readily recognize which directional indicating port is illuminated, without having to look to see whether it is an "N" or an "E" or the like.

Optionally, the center port may be illuminated whenever the vehicle is on or powered, in order to provide substantially continuous illumination of the center port. Preferably, the center port is illuminated at a lower light output intensity than that of the respective cardinal N, E, S, W ports, so as to serve as a subtle eye point, but not to be confused with an actual directional indication. For this reason, a color contrast as well as an intensity contrast may be desirable.

In such applications where the center port is illuminated or back lit, an ambient sensor may be positioned elsewhere in the mirror assembly, such as elsewhere in the cap portion, and may be a forwardly facing sensor (i.e. toward the windshield when the interior rearview mirror assembly is normally mounted in the interior cabin of a vehicle) and may receive light through a port or opening 25d in the cap portion. Alternatively, the ambient sensor may be facing downwardly or upwardly when installed in the vehicle, without affecting the scope of the present invention. The ambient sensor may be generally aligned with or juxtaposed at the port or opening or may receive the ambient light via a light pipe or the like, without affecting the scope of the present invention.

Figure 13A:
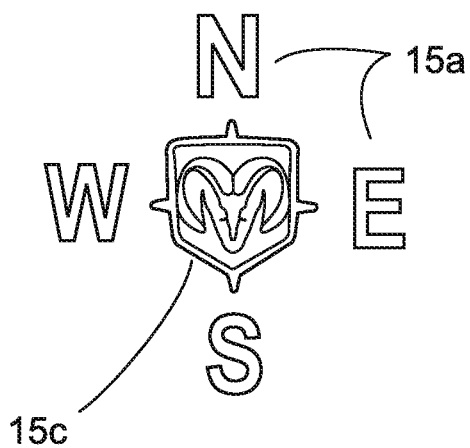
FIGS. 13A-D are enlarged elevations of customized compass displays in accordance with the present invention.
Figure 13B:
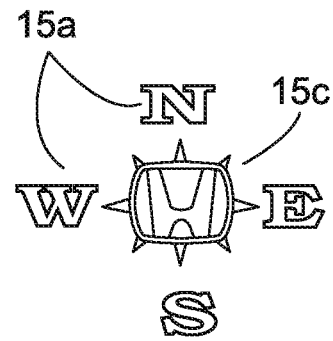
Figure 13C:
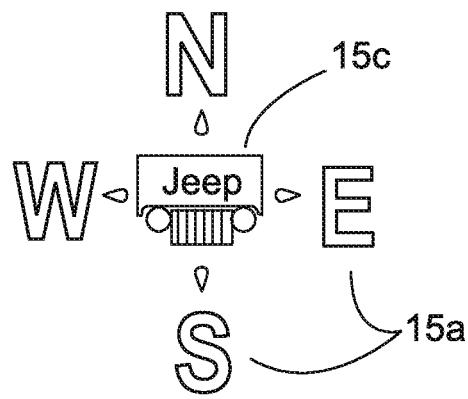
Figure 13D:
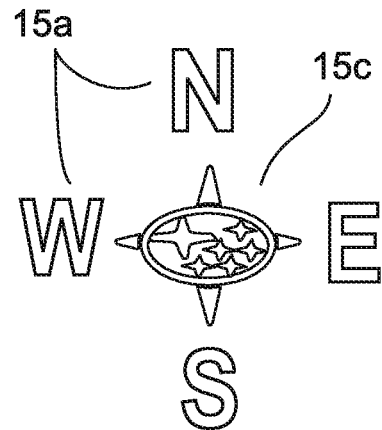

Optionally, and with reference to FIGS. 13A-D, the center port 15c of the compass display 14a (or other port or display area of the reflective element) may provide a graphic depiction of a desired image, such as a logo of the vehicle manufacturer or other desired image. For example, the center port 15c may be etched (such as by laser etching or ablation or by sandblasting or the like) or otherwise formed to provide the letters "FORD" or may be etched or otherwise formed in a pattern similar to the design or designs indicative of the manufacturer, such as the Chevrolet "bowtie" or the like. Optionally, other designs or patterns or text or logos or indicia or the like may be provided at the center port 15c (or elsewhere on the reflective element) to provide a desired image or logo. In the illustrated embodiments of FIGS. 13A-D, the central port is formed to be indicative of the vehicle manufacturer, such as for Dodge (FIG. 13A), Honda (FIG. 13B) or Jeep (FIG. 13C), or Subaru (FIG. 13D). However, the central port may be formed to be indicative of other vehicle manufacturers or entities or sponsors or indicia or trademarks or emblems or signature items, or representations of a certain political views, religious beliefs, tribal affiliations, community ties, collegiate affiliations, allegiances and/or advocacy (such as, for example, a "peace" sign or other symbol or text or the like) or other views, affiliations, beliefs, etc., or other custom ports or icons may be formed elsewhere on the reflective element to convey other information or logos or the like, without affecting the scope of the present invention.

The desired image or logo may be indicative of the vehicle manufacturer, or may be selected by the user or vehicle owner to provide a customized interior rearview mirror assembly, such as described above with respect to the different logos or colors or textures or appearances or touch/feel provided on the cap portion or bezel portion of the mirror assembly, without affecting the scope of the present invention. For example, a person may select the logo or mascot of their alma mater to be etched at the center of the compass display (or elsewhere on the reflective element) to customize the mirror assembly for that particular person or owner. The customized or selected port may be at the central port of the compass display or may at or incorporated into another display at the reflective element or may be elsewhere at the reflective element and separate from any other information display, without affecting the scope of the present invention. Optionally, the light source or indicator positioned at the circuit board behind the custom port may be selected to match the color that may be typically associated with the selected logo, such as a green or red or blue indicator or light emitting diode or the like for the school color or the like. Other forms of customized logos or indicia or the like may be etched or otherwise formed at the reflective element, without affecting the scope of the present invention.

Figure 15:
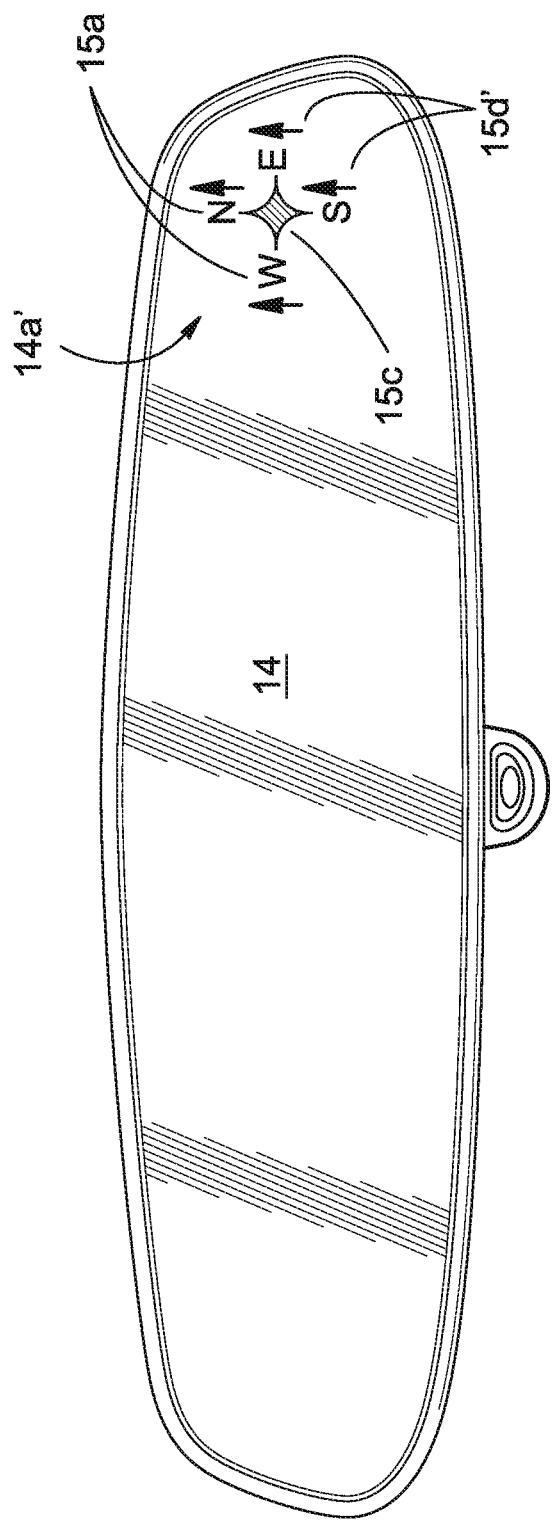
FIG. 15 is a front elevation of another interior rearview mirror assembly, showing another compass display in accordance with the present invention.
Figure 16:
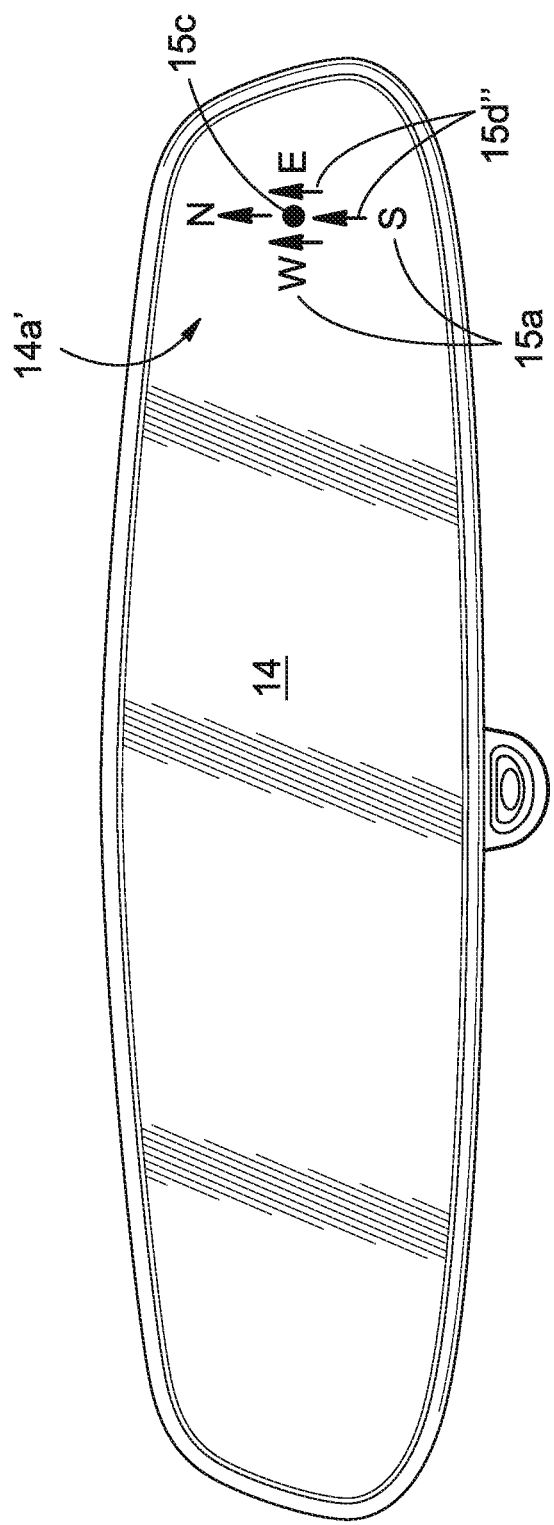
FIG. 16 is a front elevation of another interior rearview mirror assembly, showing another compass display in accordance with the present invention

Optionally, and with reference to FIGS. 14-16, an interior rearview mirror assembly 10''' may include an intuitive heading instructional icon element or display 14a' at the reflective element 14', such as the types described in U.S. provisional application Ser. No. 60/553,517, filed Mar. 16, 2004, which is hereby incorporated herein by reference. The compass display 14a' may be associated with or controlled or adjusted by a compass system and/or a navigational system, such as a compass and/or navigational system of the types described in U.S. Pat. Nos. 6,678,614; 6,477,464; 5,924,212; 4,862,594; 4,937,945; 5,131,154; 5,255,442 and/or 5,632,092, and/or U.S. patent applications, Ser. No. 10/456,599, filed Jun. 6, 2003, now U.S. Pat. No. 7,004,593; Ser. No. 10/645,762, filed Aug. 20, 2003, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003 and published Jul. 15, 2004 as International Publication No. WO 2004/058540, which are all hereby incorporated herein by reference.

Display 14a' includes a plurality of characters or icons or letters 15a (such as N, E, S, W as shown in FIGS. 14-16) formed or etched in the reflective coating or layer of the reflective element 14' and includes an arrow or direction pointer 15d at each of the characters 15a. The display 14a' may also include a central port 15c through the reflective coating or layer reflective element 14' behind which may be positioned an illumination source as described above or a glare sensor, such as a photo sensor or the like, such as a glare sensor and/or an ambient light sensor and electrochromic automatic dimming circuitry described in U.S. Pat. Nos. 4,793,690 and 5,193,029, and U.S. patent application Ser. No. 10/456,599, filed Jun. 6, 2003, now U.S. Pat. No. 7,004,593, which are all hereby incorporated herein by reference. The arrows of direction pointers may point generally upward when the mirror assembly is mounted in the vehicle with the reflective element facing generally rearward and opposite to the direction of forward travel of the vehicle. The arrows or pointers thus may be representative of the direction of forward travel of the vehicle. As shown in FIGS. 14-16, the direction pointers of display 14a' may comprise generally triangular shaped icons or pointers 15d positioned outward from the characters 15a and opposite the characters from the center or port 15c of the display (such as shown in FIG. 14), or the direction pointers of the display may comprise arrows 15d' positioned next to the characters 15a (such as shown in FIG. 15), or the direction pointers of the display may comprise arrows 15d'' positioned inward of the characters 15a and between the respective characters and the center or port 15c (such as shown in FIG. 16).

The compass/navigation system may be operable to energize one or more illumination sources positioned at and rearward of a respective one of the characters 15a and corresponding direction pointer 15d to illuminate or back light the respective character and direction pointer. For example, the compass/ navigation system may be operable to illuminate or back light a particular character and adjacent direction pointer to indicate to an occupant of the vehicle the direction that the vehicle is currently heading. For example, if the character "W" and the arrow or direction pointer next to the "W" are illuminated, then the display indicates that the vehicle is heading west. The intuitive heading instructional icon element or display thus may provide reinforcement to a viewer that when the character (such as "W" or other character) is illuminated, it is done so to indicate that the vehicle is traveling in the direction (such as west or other direction) indicated by the character. This is reinforced by the illumination of the corresponding arrow or direction pointer that points upward so as to be representative of pointing in the direction of forward travel of the vehicle. A person viewing the display thus will not misinterpret the illumination of the characters to be indicative of a driving or turning instruction (such as an instruction to turn the vehicle right or east to follow a programmed route) in connection with the navigation system.

Optionally, the display may function as a display for providing both an indication of the directional heading of the vehicle and an indication of which direction the vehicle should be turned in order to follow a programmed route or path. For example, only a particular direction pointer may be illuminated or back lit to indicate that the vehicle is heading in the direction indicated by the non-lit character next to the illuminated pointer, while a different character (separate from the illuminated pointer) may be illuminated or back lit to indicate that the vehicle is to be turned in that direction to follow a programmed route to a desired destination. The compass/navigation system and display thus may clearly display to a driver of the vehicle which direction the vehicle is heading at that time via the directional arrows, while the compass/navigation system and display may also be operable to provide driving or turning instructions to a driver of the vehicle to instruct the driver as to which direction the driver is to turn to follow a particular route to a desired destination. For example, the compass/navigation system may be associated with a global positioning system and/or telematics system of the vehicle, and may generate and display driving instructions to the driver of the vehicle as the vehicle is driven along a generated route, such as by utilizing aspects described in U.S. Pat. Nos. 6,678,614 and 6,477,464, and/or U.S. patent application Ser. No. 10/456,599, filed Jun. 6, 2003, now U.S. Pat. No. 7,004,593; Ser. No. 10/645, 762, filed Aug. 20, 2003, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003 and published Jul. 15, 2004 as International Publication No. WO 2004/058540, which are all hereby incorporated herein by reference.

During operation, the compass/navigation system thus may be operable to energize an illumination source positioned at and rearward of/behind a respective one of the characters to provide a driving instruction to the driver of the vehicle that is separate from the directional heading indication also provided by illumination or back lighting of the arrows or pointers of the display. For example, if the vehicle is heading generally west, the compass/ navigation system may illuminate or back light the arrow next to the "W" to indicate to the driver of the vehicle that the vehicle is traveling generally in that direction. If the programmed route for the vehicle involves an upcoming right turn onto a generally northbound road, the compass/navigation system may then illuminate or back light the letter "N" to indicate to the driver of the vehicle that the driver should turn the vehicle to head north.

It is further envisioned that the illuminated character may be altered or adjusted as the vehicle gets closer to the turning point or intersection, such as by flashing the illumination source or intensifying the illumination source or changing the color of the illumination as the vehicle approaches the desired or appropriate turning point or intersection. It is also further envisioned that arrows pointing sideways may be provided at one or more of the characters of the display (or elsewhere at the display), and the appropriate arrow may be illuminated or back lit to indicate that the driver is to turn right or left to stay on the desired course or route. In such an embodiment, illumination or back lighting of the character may be indicative of the directional heading of the vehicle, while illumination or back lighting of the arrows may be indicative of the driving instructions to the driver of the vehicle.

The intuitive display elements thus provide a clear indication as to which direction the vehicle is presently traveling by providing a directional heading arrow or pointer at each of the compass heading characters. The driver of the vehicle thus will not likely become confused as to the meaning of the illuminated characters or letters. The compass/navigation system and display of the present invention also may provide point-to-point driving instructions and the present directional heading of the vehicle with the same display or display icons/characters.

Figure 17:
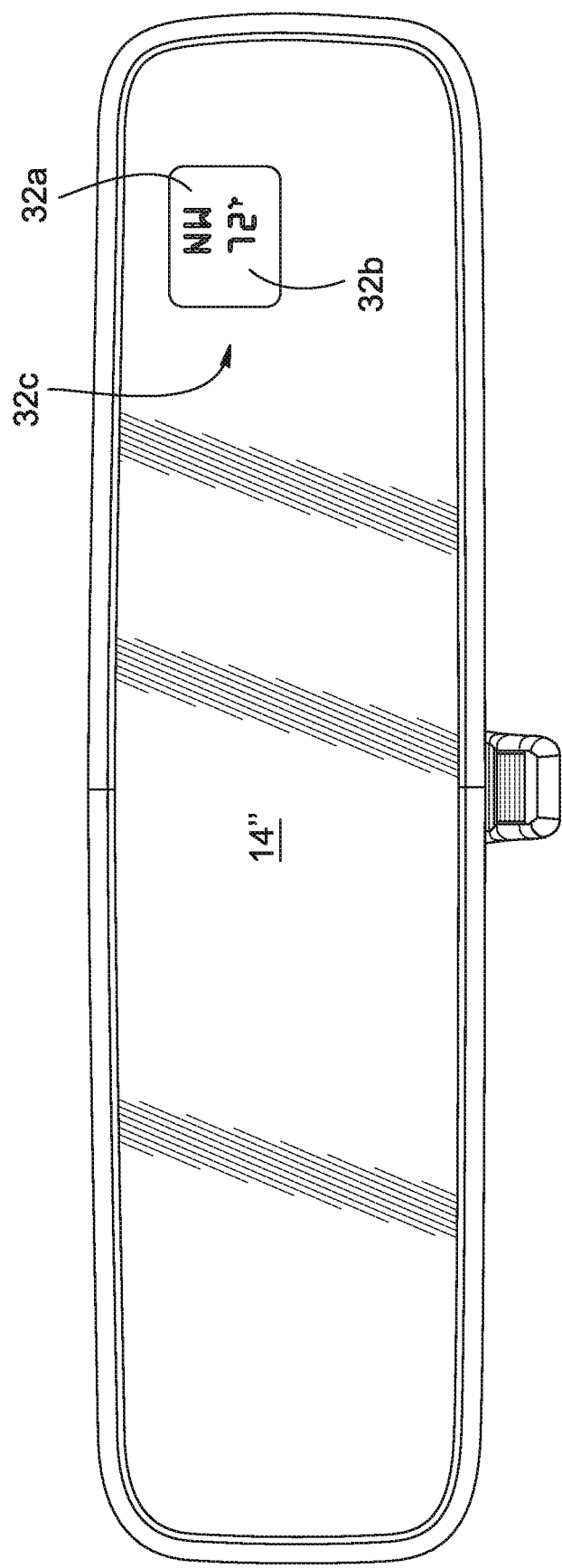
FIG. 17 is a front elevation of another interior rearview mirror assembly having a compass and temperature display.

Optionally, the compass display may include a temperature display or another type of information display with an LED array at or near the compass display ports or icons. One or more control buttons or inputs (such as at the rear side of the mirror assembly) may be provided to allow the driver or occupant of the vehicle to select or actuate the calibration or zone or temperature display functions. The circuit board may be in communication with a temperature sensor or system, such as via a connecting wire or the like, to receive an electronic signal indicative of the temperature to be displayed. Optionally, the cap portions and circuit boards may support or provide a compass and/or temperature display utilizing vacuum fluorescent displays and filters to display the compass heading and/or temperature via two or more characters or letters or numbers. For example, and as shown in FIG. 17, a compass heading display 32a and a temperature display 32b may be provided or formed at a display region 32c of a reflective element 14" of a mirror assembly. The displays may comprise alphanumeric characters or the like to convey the directional heading information and temperature information to the driver of the vehicle.

Optionally, the circuit board may also or otherwise include circuitry for another accessory and/or display at the reflective element. The other display circuitry may illuminate or project information via illuminating ports or icons or characters or the like which are etched or otherwise formed on the reflective element, such as in a similar manner as described above. The display circuitry and associated control circuitry may be positioned at the circuit board. Optionally, some of the circuitry may be positioned outside of the mirror assembly, such as at an accessory pod or module, and may be in communication with the circuitry of the circuit board via a connecting wire or the like, such as described above with respect to the compass circuitry.

Optionally, the illumination sources utilized to back light or illuminate the display icons or characters may emit a desired color of light, such as a blue colored or tinted light or other color as may be desired. In many mirror applications, a blue light is typically preferred because it provides high visibility of the display during high lighting or daytime conditions, but may not be as favorable during low light or nighttime conditions. Optionally, a control or multiplexer may be operable to change the color of the display in response to an ambient light sensor or the like. For example, the control may deactivate a blue illumination source and activate an amber or red illumination source (or other color) when the ambient light level drops to a threshold level. The nighttime color may be selected to provide enhanced viewing of the displays and may be selected to generally match the lighting color scheme or signature color of the particular vehicle in which the display is implemented. Optionally, the colors may be ramped on and off, such that in intermediate lighting conditions, both colors may be provided and mixed, in order to provide a gradual change from one color to the next as the ambient light levels increase or decrease. Optionally, the control may activate a second illumination source (a nighttime illumination source that may be directed toward and through the same port as a daytime illumination source) in parallel with the daytime illumination source (such as a blue illumination source), which may remain activated so that the colors of the illumination sources are mixed during nighttime or darkened conditions.

As also shown in FIGS. 2-5, one of the circuit boards, such as circuit board 18*a* supported by cap portion 16*a* (FIG. 2) or circuit board 18*a* supported by cap portion 16" (FIGS. 4 and 5) or the like, may include an accessory or circuitry 21 and associated manual inputs or controls or buttons 21*a* for providing manual control of the circuitry or accessory 21. For example, circuitry 21 may comprise circuitry for a garage door opening device or system, such as a universal garage door opener or the like. With reference to FIG. 2, one or more buttons 21*a* (and/or one or more lights or illuminated buttons or controls) may extend or project from circuitry 21 and may extend at least partially through or may be accessible through corresponding openings or holes 21*b* in mirror holder 12. Optionally, and as shown in FIGS. 4 and 5, one or more buttons 21*a'* may be provided at a circuit board 18*a*, and may be positioned or received in a recessed area 21*b'* along the bezel portion or mirror holder 12 and/or in a recessed area 25*e* along the cap portion 16", such that the buttons may be secured in place between the mirror holder and cap portion when the cap portion is attached to or secured to the mirror holder. The buttons 21*a*, 21*a'* may be readily accessible by the driver or occupant of the vehicle to actuate or control the circuitry 21, such as to actuate a transmitting device to open or close a garage door, such as utilizing the principles disclosed in U.S. Pat. Nos. 6,396,408; 6,362,771; 5,798,688 and 5,479,155; and/or U.S. patent application Ser. No. 10/770,736, filed Feb. 3, 2004, now U.S. Pat. No. 7,023,322, which are hereby incorporated herein by reference.

Figure 18:
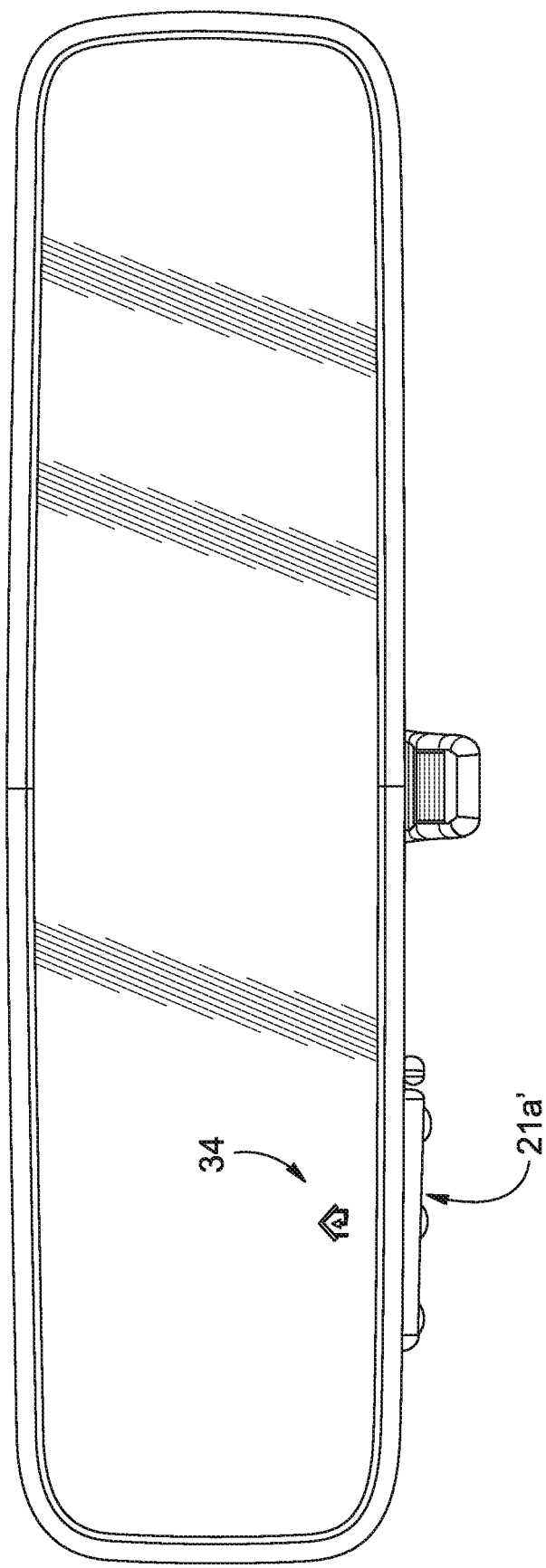
FIG. 18 is a front elevation of another interior rearview mirror assembly, having a garage door opening system display and user inputs in accordance with the present invention.

Optionally, and as shown in FIG. 18, a garage door opener display 34 may be provided at the reflective element of the mirror assembly for displaying a Homelink® icon (or other icon or indicia indicative of such a system) at the buttons or inputs 21*a*, 21*a'* for the garage door opener system, such as might be useful as an indicator to assist a user when training or operating in a learning mode of a trainable garage door opener (such as by intermittently illuminating or modulating/flashing/blinking an LED or the like behind a Homelink® icon or the like when in the learning mode) and/or as an indicator for company brand promotion/feature illustration promotion, such as by constantly illuminating the LED or the like, such as when a trainable garage door opener is not in the training or learning mode. The garage door opener display 34 may have an illumination source (such as a light emitting diode or the like) that may be activated or energized to back light or otherwise illuminate the display as desired. The display elements and circuitry and user inputs may be added to or attached to the cap portion as a module so that the desired feature or content may be readily added to a corresponding cap portion to provide the desired feature or content to the appropriate mirror assembly.

Because it is desirable that the mirror holder be a universal mirror holder for mirror assemblies having various accessories or no accessories, it is envisioned that the openings 21*b* in mirror holder 12 for the input controls 21*a* of accessory 21 (and/or other openings for other user inputs or buttons or switches or the like for other accessories or the like) may be formed in the mirror holder via inserts positioned in the mirror holder mold or tool for mirror holders which require such openings. The inserts may be removed from the tool to provide molding of a mirror holder without such openings for applications where no such accessory and associated controls or buttons is selected. Similarly, the recessed regions 21*b'* in the mirror holder and/or the cap portion may be formed via inserts placed in the molds during the forming of the mirror holder or cap portion. The different mirror holders may thus be molded or formed using the same tool, yet may receive different cap portions having or supporting different accessories or features.

In the illustrated embodiment, the buttons 21*a* are positioned at the mirror assembly so that user actuation of the buttons requires a generally vertical upward force (when the mirror assembly is installed in the vehicle) to move the button or input upwardly to actuate the electronic switch. Optionally, however, the buttons or inputs may be positioned at the mirror assembly so that actuation of the button or switch or input may be accomplished by a generally horizontal force or movement, such as a generally horizontal force toward the mirror assembly or in the direction of travel of the vehicle. For example, the user inputs may be positioned in a gondola or pod or attachment or extension of the cap portion that extends outwardly (such as downwardly or upwardly or sidewardly) from the cap portion so as to be viewable and readily accessible by the driver of the vehicle. The user inputs may be positioned within the gondola or pod so that pressing the user inputs generally horizontally actuates the switch (such as an electronic switch at the printed circuit board within the cap portion of the mirror assembly). The cap portion or attachment may include mechanical elements or structure for mechanically translating the generally horizontal movement of the input to a generally vertical actuation of an electronic switch, or the electronic switch may be oriented at the circuit board to be responsive to the generally horizontal actuation movement, without affecting the scope of the present invention. Preferably, such gondola or pod may extend upward or toward the passenger side of the mirror assembly (when the mirror assembly is installed in the vehicle) to limit or reduce any interference with the forward field of view of the driver of the vehicle.

Although shown and described as having buttons such as shown in FIGS. 2-5 and 10, it is envisioned that the mirror assembly may include buttons or inputs of the types described in U.S. provisional applications, Ser. No. 60/553,517, filed Mar. 16, 2004; and Ser. No. 60/535,559, filed Jan. 9, 2004, which are hereby incorporated herein by reference. For example, the buttons may be integrally molded in the cap portion or bezel, or the buttons may extend downward through openings in the cap portion or bezel or between the cap portion and bezel when the cap portion is attached to the bezel, without affecting the scope of the present invention.

Figure 19:
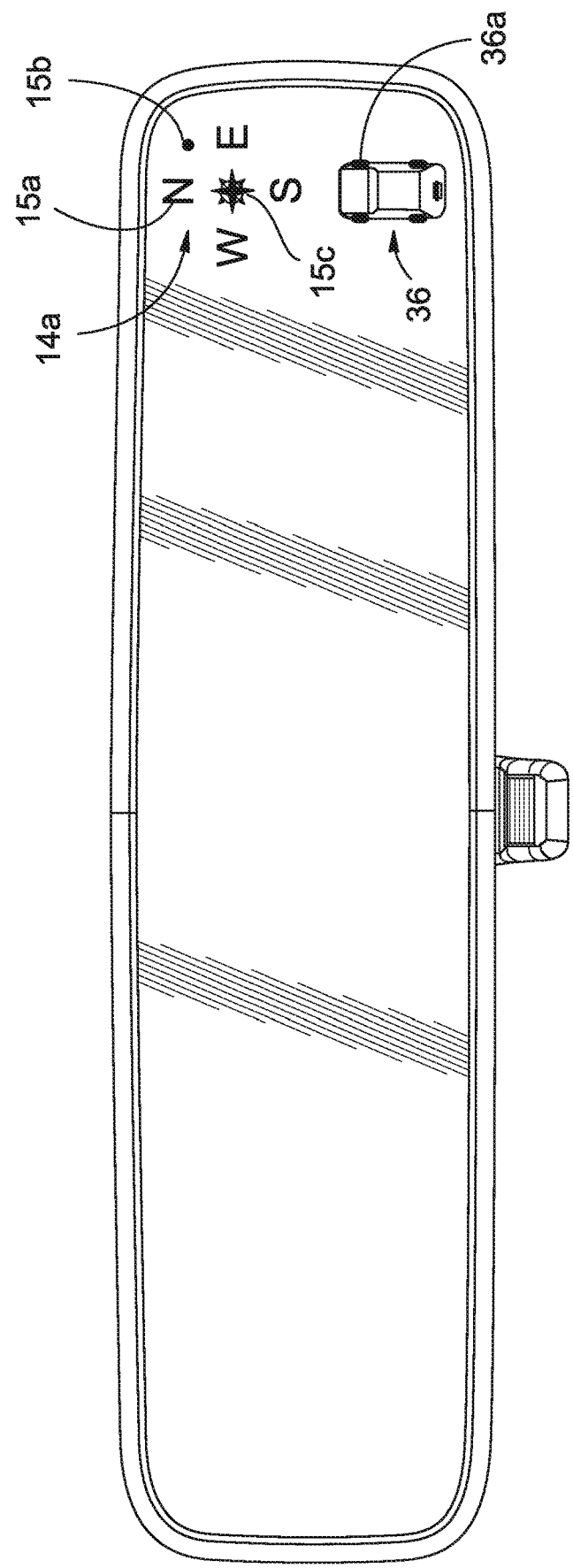
FIG. 19 is a front elevation of another interior rearview mirror assembly, having a compass display and a tire pressure monitoring system display in accordance with the present invention.
Figure 20:
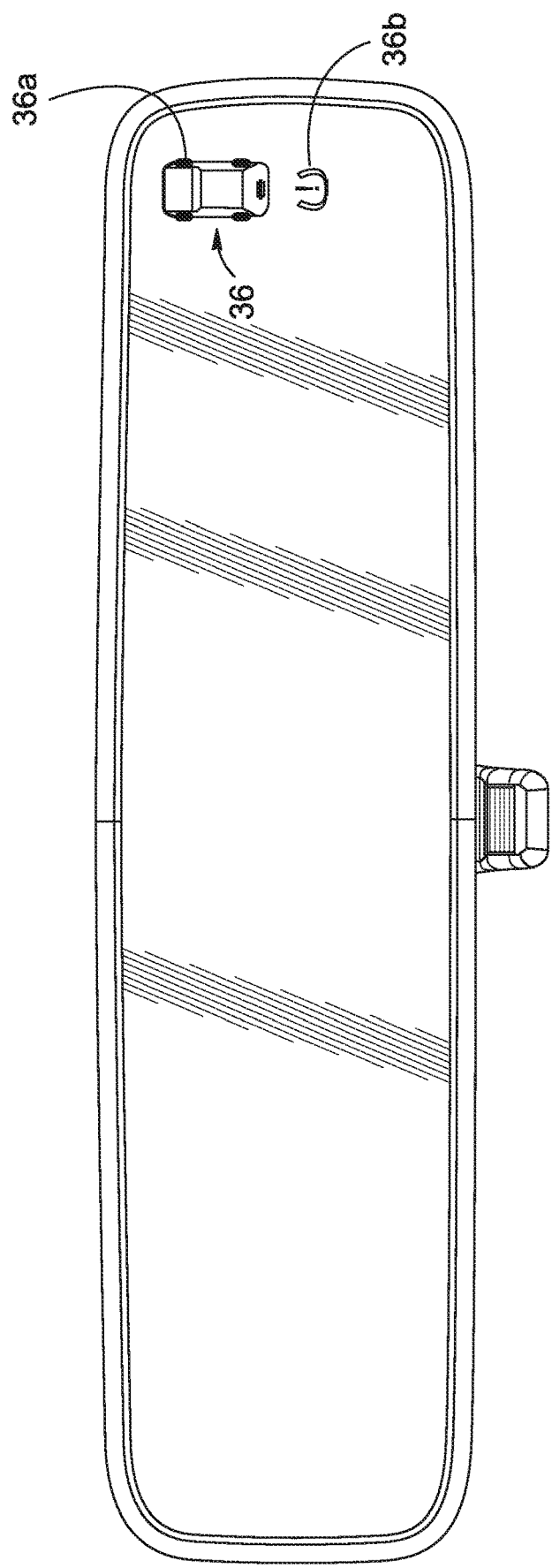
FIG. 20 is a front elevation of another interior rearview mirror assembly, having a tire pressure monitoring system display in accordance with the present invention.
Figure 21:
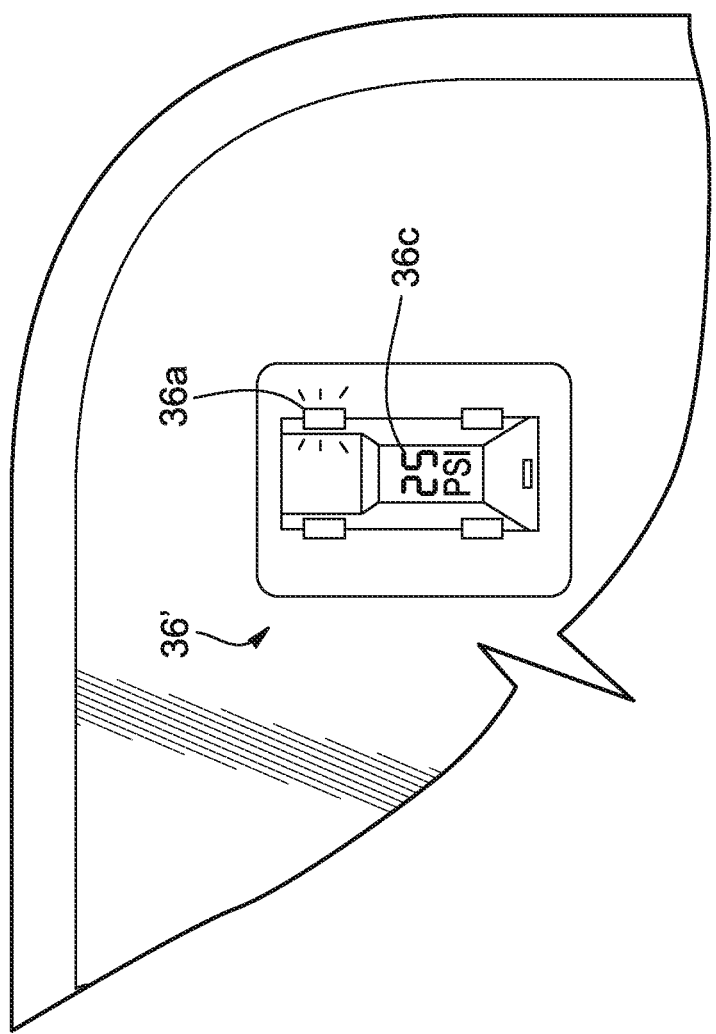
FIG. 21 is an enlarged front elevation of another tire pressure monitoring system display in accordance with the present invention.

Optionally, the cap portions and circuit boards may support one or more other accessories and/or corresponding displays at or within the mirror holder, such as a tire pressure monitoring system and display 36, 36' (FIGS. 19-21), whereby the display may indicate when a tire pressure has dropped below a set or preselected tire pressure. For example, a particular light source may be energized or activated to back light or illuminate an icon 36*a* indicative of one of the tires of the vehicle when the pressure in that tire drops below the threshold tire pressure. The individual light sources may be individually energized, such as in a similar manner as the directional heading indicators discussed above and/or described in U.S. patent application Ser. No. 10/456,599, filed Jun. 6, 2003, now U.S. Pat. No. 7,004,593, which is hereby incorporated herein by reference. The display may include an iconistic display that may be laser etched or otherwise formed on the reflective element (such as described above), and may provide for illumination (via one or more illumination sources at the circuit board of one of the cap portions) of one or more icons 36*a* representative of a particular tire of the vehicle. Optionally, and as shown in FIG. 21, the tire pressure display 36' may be printed on a screen and placed at and generally aligned with a window formed in the reflective layer of the prismatic reflective element, without affecting the scope of the present invention. The display may further provide for illumination of an additional icon or character 36b or may provide a different color illumination when a puncture is detected at one of the tires of the vehicle. Optionally, the tire pressure monitoring display 36' may include a digital display 36c (or other type of character or alphanumeric display) for indicating the tire pressure of one of the tires. The tire pressure monitoring system may utilize principles disclosed in U.S. Pat. Nos. 6,124,647; 6,294,989; 6,445,287; 6,472,979 and/or 6,731,205, which are hereby incorporated herein by reference.

The tire pressure display thus may be controlled or actuated by a microcontroller or microprocessor of the cap portion of the mirror assembly. The controller may drive or energize the illumination sources (such as light emitting diodes or the like) directly, without the need for additional display drivers. The direct energization of the illumination sources of the display thus avoids the need for other controllers or drivers within the mirror assembly or the vehicle. The tire pressure monitoring system display 36, 36' may utilize aspects of the compass display disclosed in U.S. patent application Ser. No. 10/456,599, filed Jun. 6, 2003, now U.S. Pat. No. 7,004,593, which is hereby incorporated herein by reference in its entirety.

Figure 22:
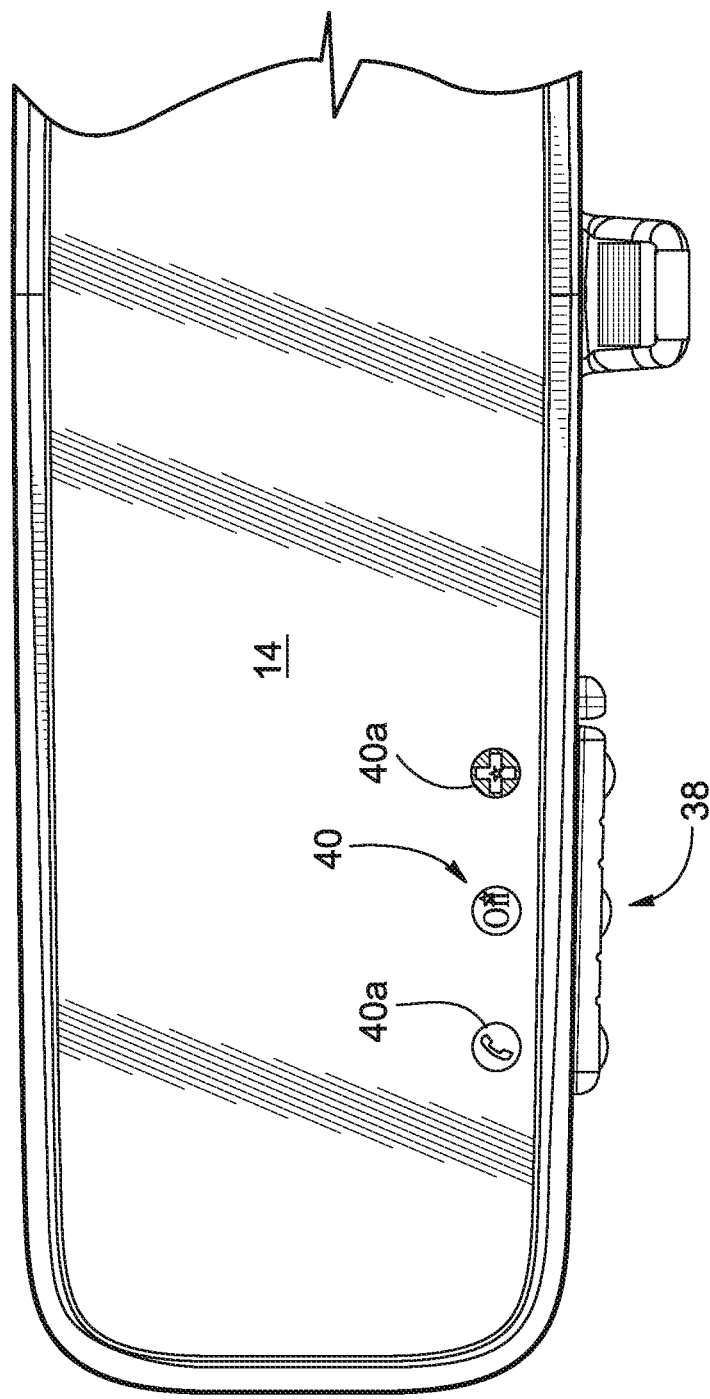
FIG. 22 is a front elevation of another interior rearview mirror assembly, having a telematics module and display in accordance with the present invention.
Figure 23:
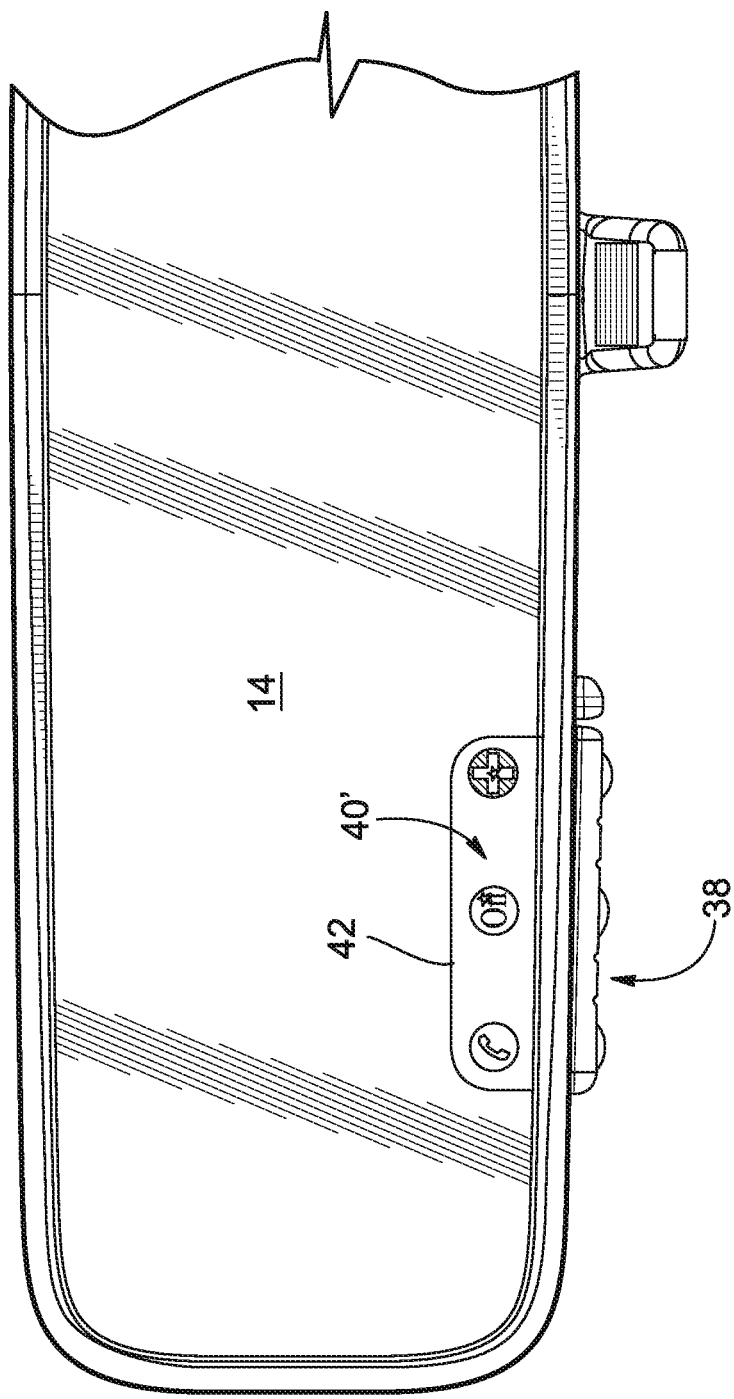
FIG. 23 is a front elevation of another interior rearview mirror assembly, having a telematics module and display in accordance with the present invention.

Optionally, the cap portion may include circuitry and user inputs associated with a telematics system, such as ONSTAR® or the like. For example, a circuit board may include circuitry for the telematics system and may be attached to or mounted to a cap portion, such as a circuit board similar to circuit board 18a described above. The cap portion and/or mirror holder may include a recess or opening for one or more user inputs to be positioned when the mirror assembly is assembled, so that the user inputs may be readily accessible by a driver of the vehicle when the mirror assembly is installed in the vehicle. As shown in FIG. 22, the user inputs or buttons 38 may extend along a lower portion of the mirror assembly and may be readily viewable and accessible at the lower portion of the mirror assembly by a driver of the vehicle. The user inputs 38 may comprise a keypad or the like that is positioned within corresponding notches or recesses along the opposed or mating edges of the mirror holder and the cap portion, such as described above with respect to user inputs 21a' of FIGS. 4 and 5. A telematics display 40 may be etched or otherwise formed in the reflective element 14 to indicate to a user the function of the user inputs 38. The display 40 may include one or more icons or images or characters 40a or the like that may be etched or formed in the reflective element and backlit by respective illumination sources. The illumination source or sources may be activated during low ambient lighting conditions (such as dusk or night, such as when ambient lighting is less than, for example, about 200 lux) to illuminate the display 40 so a user can see the function of the user inputs (which may also be illuminated or backlit or the like) during low lighting conditions, such as at nighttime. Optionally, individual illumination sources may be provided at each icon or port 40a to independently illuminate or back light the respective icon, such as in response to actuation of a respective one of the user inputs (such as in a manner as described above with respect to the individual directional icons of the compass display). Optionally, and with reference to FIG. 23, the display 40' may be positioned at a window 42 of the reflective element 14 and may be viewable through the reflective element window.

The cap portions of the present invention thus may provide a desired content, such as a garage door opening system and respective user inputs or a telematics feature and respective user inputs, to a particular mirror assembly. The desired system may be provided to the cap portion as a module, such as a garage door opening system module (which may include the transmitter and circuitry and user inputs) or a telematics module (which may include the circuitry and user inputs and display elements), and the module may be attached to or snapped to or mounted to the cap portion, such as at a cap portion assembly facility or at the vehicle assembly facility. Although shown as a garage door opening system module or a telematics module, clearly, the cap portion may include or incorporate other modules or displays or the like, such as, for example, a passenger side air bag status display (typically on the lower passenger side corner or area of the reflective element) or other displays, or a rear-facing sensor (which may align with an opening or port or window formed in the reflective element when the cap portion is attached to the mirror holder), or other types of displays or systems or modules, without affecting the scope of the present invention. Optionally, the user inputs or buttons or switches or the like may be positioned in the cap portion or in the bezel portion (or between the cap portion and bezel portion), or the cap portion may include an eyebrow portion or gondola portion or underbrow portion or chin portion or attachment (that may extend or protrude partially outward and/or partially around the bezel portion, and that may extend upwardly or downwardly or sidewardly therefrom) in which the inputs may be positioned, such that the inputs are contained at or in the cap portion and readily viewable and/or accessible at a desired location around the bezel portion.

The desired cap portion (with the desired features or content) may be readily attached to a common or universal mirror holder (which may include the reflective element and toggle and mounting assembly, which may be assembled at a mirror holder assembly facility) to assemble the mirror assembly, such as at a mirror assembly facility. The mirror holder may be adapted to partially receive the user inputs therein, and/or the reflective element contained in the mirror holder may have a particular display or displays formed thereon. The display icons or ports or windows formed in the reflective layer of the reflective element may generally align with the respective display elements or illumination sources of the circuitry within the cap portion when the cap portion is attached to the mirror assembly, such as described above with respect to the compass display. In applications where different modules may be provided that provide different display information at the reflective element, the reflective element may be selected to have the appropriate ports or icons or the like that correspond with the particular module, or the reflective element may have a window or windows formed in the desired or appropriate locations or may comprise a transflective prismatic reflective element (such as described in PCT Application No. PCT/US03/29776, filed Sep. 19, 2003 and published Apr. 1, 2004 as International Publication No. WO 2004/026633; and/or U.S. provisional application Ser. No. 60/525,952, filed Nov. 26, 2003, which are hereby incorporated herein by reference), such that the display elements (which may be illuminated alphanumeric characters or icons or indicia or the like) of the modules may be viewable through the reflective element to view the information being displayed by the display elements. The present invention thus provides for various mirror assemblies having different features or electronic content, while providing common or universal mirror holders and cap portions, where different circuitry or circuit boards or modules may be attached to the cap portion to provide the desired content to the mirror assembly.

Figure 24:
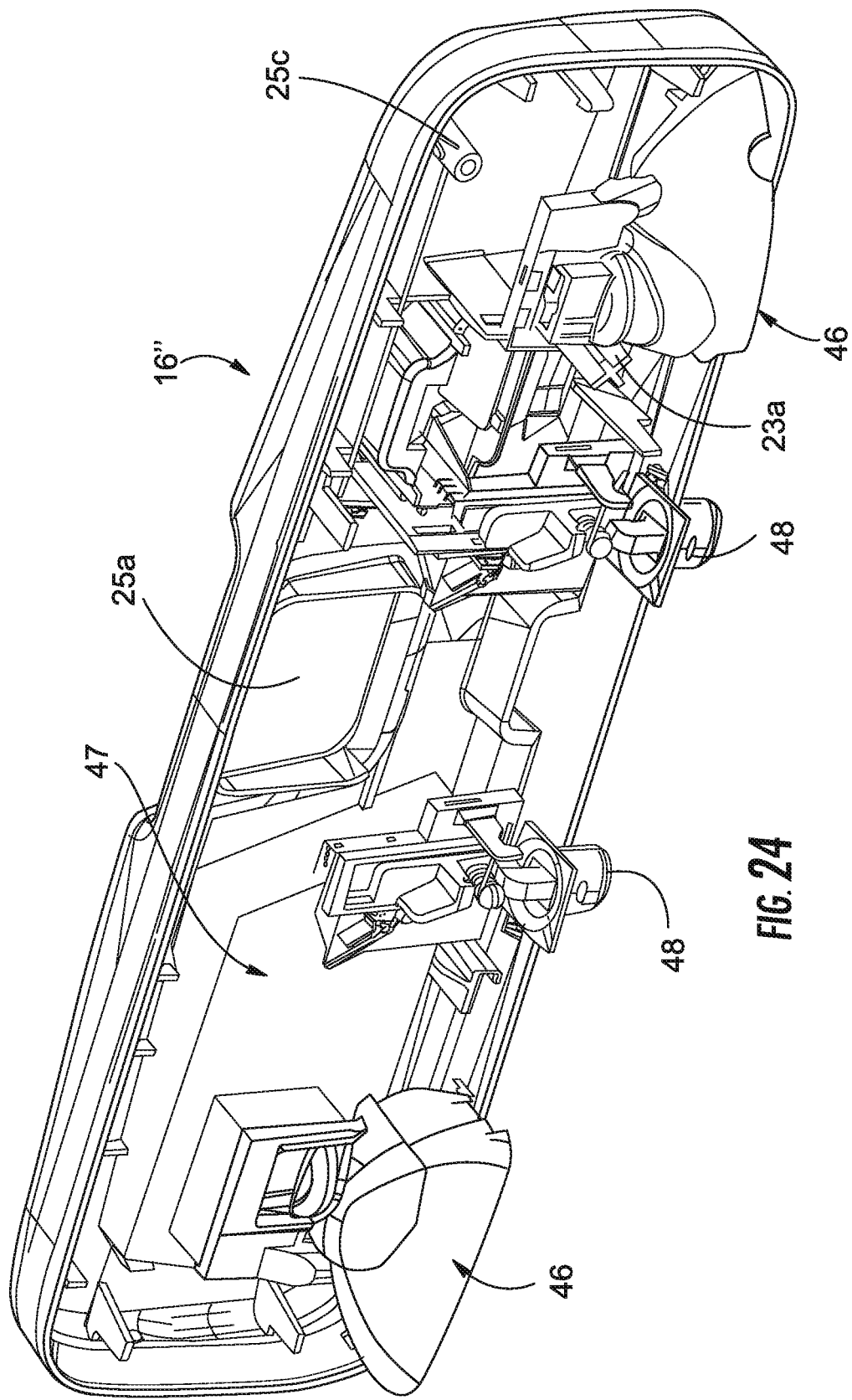
FIG. 24 is a perspective view of a cap portion for an interior rearview mirror assembly in accordance with the present invention.
Figure 25:
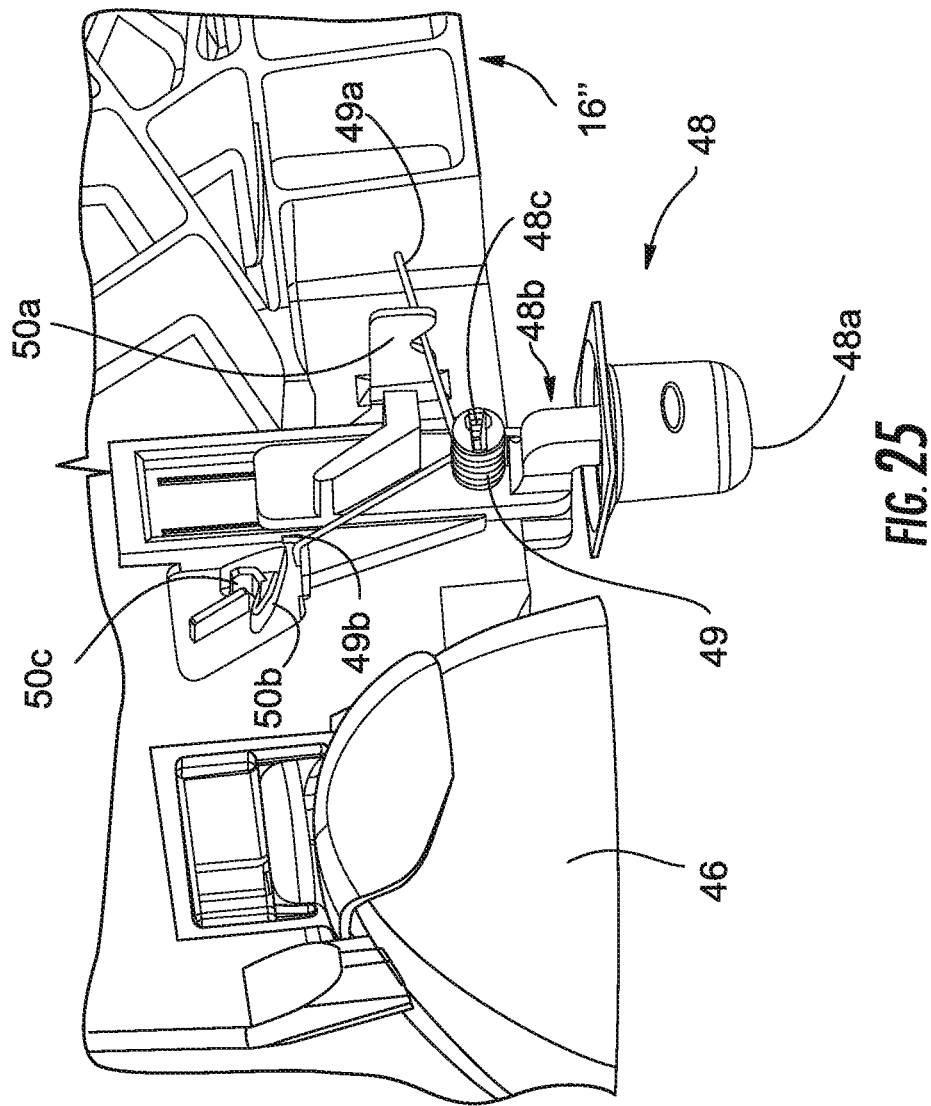
FIG. 25 is an enlarged perspective view of a light actuator of the cap portion of FIG. 24.
Figure 26:
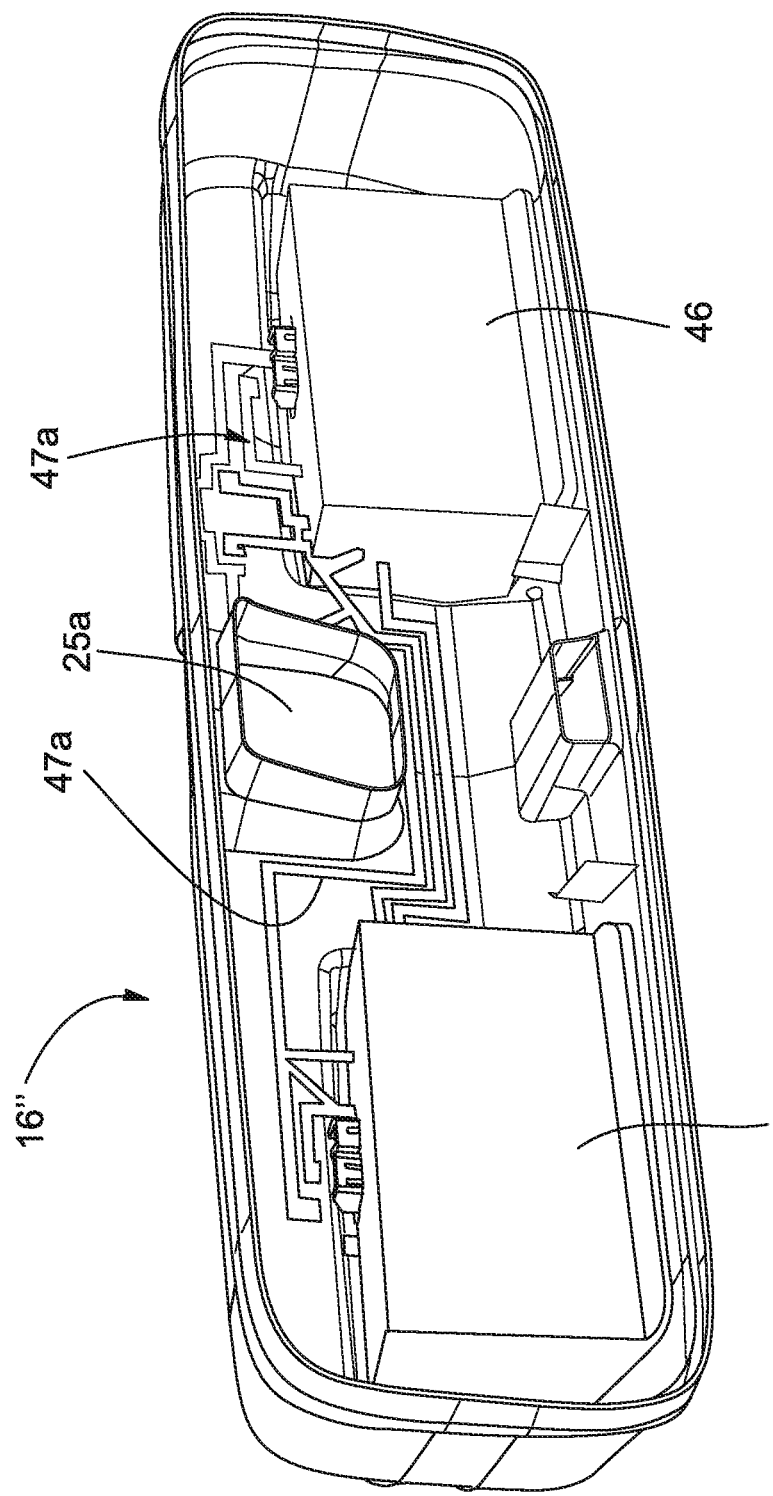
FIG. 26 is a perspective view of another cap portion of the present invention.
Figure 27:
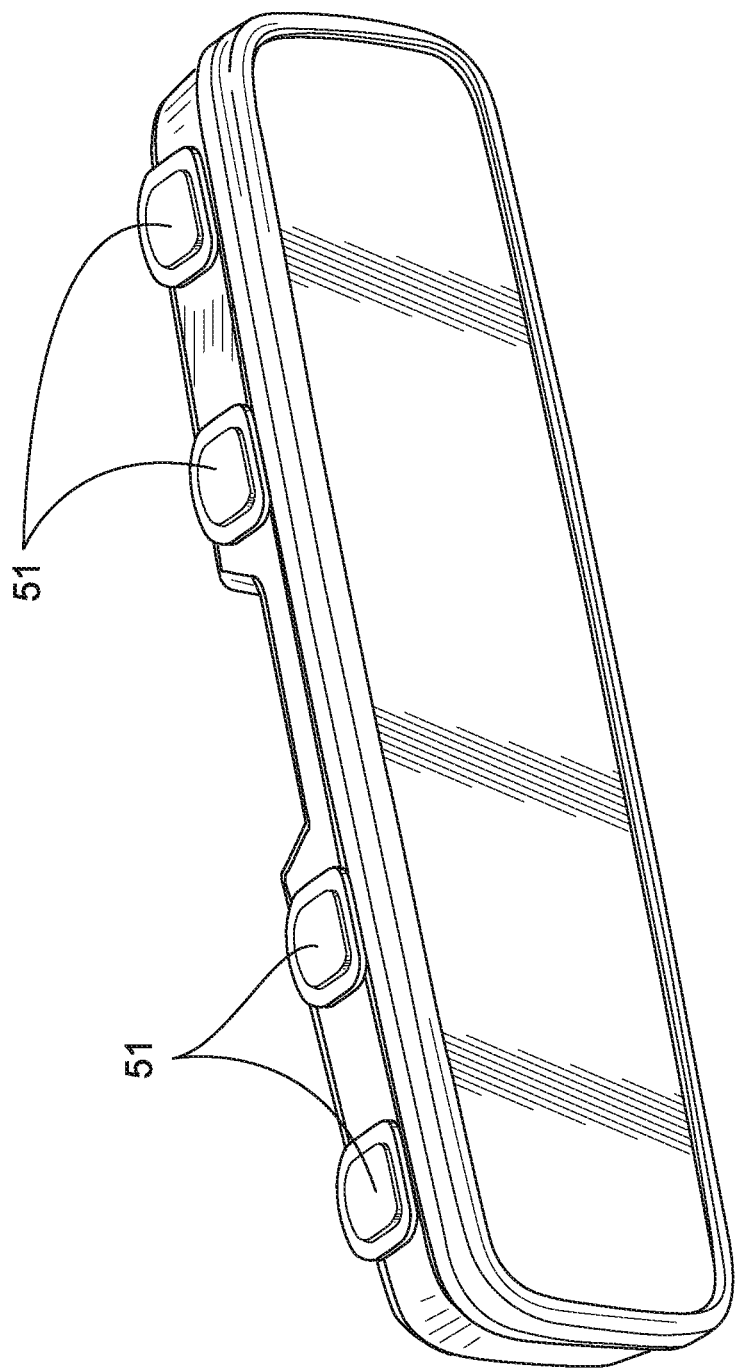
FIG. 27 is an upper perspective view of an interior rearview mirror assembly of the present invention, with microphones positioned along an upper cap portion.

Optionally, the cap portion or portions and circuit board or boards may support one or more other accessories or features at or within the mirror holder, such as one or more electrical or electronic devices or accessories. For example, and as can be seen in FIGS. 24-26, illumination sources or lights, such as map reading lights 46 or one or more other lights or illumination sources (which may be positioned at or aligned with openings formed in the bottom of the mirror holder to direct illumination generally downward to illuminate the console of the vehicle), such as illumination sources of the types disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253 and/or 5,669,698, and/or U.S. patent applications, Ser. No. 10/054,633, filed Jan. 22, 2002, now U.S. Pat. No. 7,195,381; and/or Ser. No. 10/745,056, filed Dec. 22, 2003, now U.S. Pat. No. 6,971,775; and/or U.S. provisional application Ser. No. 60/500,858, filed Sep. 5, 2003, which are hereby incorporated herein by reference, may be included with the cap portion 16". The illumination source or sources 46 may be attachable to or positionable at or molded into the cap portion and may connect to a circuit board 47 of the cap portion 16". The illumination sources and/or the circuit board may be connected to one or more buttons or inputs 48 for activating and deactivating the illumination sources.

Optionally, and with reference to FIG. 26, the circuitry 47a may comprise a stamped circuit that is molded into and/or along the cap portion, with the electrical connections between the lights and buttons and power source being made via stamped connectors or terminals molded into the cap portion (such as terminals of the type described in U.S. Pat. No. 6,227,689, which is hereby incorporated herein by reference) and extending between the lights 46 and/or inputs/buttons (not shown in FIG. 26) and/or the power source/circuit board 47. The illumination sources 46 and inputs 48 may be positioned at recesses in and along a forward edge or portion of cap portion 16" and may be partially received in corresponding recesses along the rearward edge of the corresponding mirror holder to secure the illumination sources and buttons at the mirror assembly.

As best shown in FIGS. 24 and 25, the light actuators or buttons 48 may comprise a push button actuator having a user actuating portion 48a at a lower end of a body portion 48b. The actuator 48 may comprise any known switch or button assembly, or may be of the type described in U.S. patent application Ser. No. 10/447,641, filed May 29, 2003, now U.S. Pat. No. 6,953,905, which is hereby incorporated herein by reference. Body portion 48b may be slidably mounted to or positioned in or at the cap portion 16" and may slide between an activated position, where the switch closes the circuit to activate the light source, and a deactivated position, where the switch opens the circuit to deactivate the light source. The actuator 48 includes a torsional spring 49 wrapped around a shaft 48c protruding from body portion 48b. One end 49a of the spring 49 engages a stop 50a extending from the cap portion 16", while the other end 49b is movable around a detent 50b as the switch body 48b is moved between the activated and deactivated positions. For example, when the switch is in the lowered or deactivated position, the spring may bias the switch downward (which may open the circuit) via engagement with the stop 50a. When the switch is pressed upward, the end 49b may move upward around the detent 50b and may rest within a recess 50c of the detent 50b when the switch is released to retain the switch in the raised or activated position (which may close the circuit). When the switch is again pressed upward by a user, the end 49b may move upward and out from the recess 50c and may move downward around the detent 50b as the switch is urged or moved downward in response to the biasing forces of the spring 49. The actuator 48 thus provides a low cost actuating device that only has a few components and, thus, is less costly and less complicated and more durable than many multiple component switches in use today.

Optionally, the cap portion may provide circuitry or power for a light or illumination source, such as a map reading light or the like, and a desired or appropriate lighting capsule or module (including the light source and user input or button or switch) may be plugged into the mirror assembly (such as described in U.S. patent applications, Ser. No. 10/054,633, filed Jan. 22, 2002, now U.S. Pat. No. 7,195,381; and Ser. No. 10/745,056, filed Dec. 22, 2003, now U.S. Pat. No. 6,971,775, which are hereby incorporated herein by reference). The circuit board of the cap portion may include prongs or connectors or the like at a lower portion of the circuit board, and the lighting capsule may be inserted through an opening in the cap portion and/or mirror holder and may engage and connect to the prongs or connectors to electrically connect the light to the circuit board. The lights thus may be readily inserted into or connected to the circuit board of the cap portion if desired or appropriate to provide the desired feature or content to the cap portion and the mirror assembly.

Optionally, the mirror assembly may include a white light emitting diode, or a cluster of LEDs may be provided, as a map/reading light or light module. Optionally, the cap portion or bezel portion may include illumination sources, such as light emitting diodes or the like, that may be embedded in the rim of the bezel portion or the lower portion of the cap portion to emit or project illumination toward the desired area of the vehicle cabin. The illumination sources may be switched on locally, such as via user inputs or switches or buttons as described above, or may be activated/deactivated/controlled by a control or system remote from the mirror assembly, such as via a vehicle electronic or communication system, and may be connected via a hard wire or via various protocols or nodes, such as Bluetooth, SCP, UBP, J1850, CAN J2284, Fire Wire 1394, MOST, LIN and/or the like, depending on the particular application.

Optionally, the illumination sources may comprise modular light sources, and may comprise one or more incandescent light sources or light emitting diodes or the like, such as described in U.S. patent applications, Ser. No. 10/054,633, filed Jan. 22, 2002, now U.S. Pat. No. 7,195,381; and Ser. No. 10/745,056, filed Dec. 22, 2003, now U.S. Pat. No. 6,971,775, which are hereby incorporated herein by reference. Optionally, the light emitting diodes may be operable to individually emit illumination in different colors as desired, so as to provide mood lighting or the like. The illumination sources may be controlled via a user input at the lights or a separate or remote control device, such as a vehicle electronic or communication system, and may be connected via a hard wire or via various protocols or nodes, such as Bluetooth, SCP, UBP, J1850, CAN J2284, Fire Wire 1394, MOST, LIN and/or the like (which may also control the exterior mirror or mirrors of the vehicle), and may provide ramped activation and/or deactivation to provide theater like lighting or the like if desired.

Optionally, the cap portion may include or incorporate or receive other modules as selected or desired to customize the mirror assembly. For example, the cap portion and/or reflective element assembly portion may receive a microphone array module, a garage door opening system module, a telematics user access button/input module, and/or the like. The modules may be provided at the vehicle assembly plant or at the mirror assembly plant, and may be inserted or plugged into the cap portion or mirror assembly to provide the desired content to the mirror assembly. The modules and the cap portion may include connectors that provide both electrical and mechanical connection so that the modules are electrically connected to the appropriate circuitry as they are inserted or received into or snapped to or attached to the cap portion. An operator at the vehicle assembly plant thus may readily connect the appropriate module to the cap portion or to the mirror assembly to provide the desired content for that particular mirror assembly. For a base mirror that may not include such content, a blank module or plug may be inserted into or attached to the cap portion or mirror assembly, so as to fill or conceal any opening in the mirror assembly that otherwise may receive an electronic module or accessory. The modules may also be readily removed and replaced to ease repair and replacement of the accessory or circuitry, and to ease replacement or changeover to a different accessory or module, if a different option is desired, such as an aftermarket module or the like.

Optionally, the cap portion or portions and the circuit board or boards of the present invention may also or otherwise include other accessories, such as microphones 51 (such as shown in FIGS. 5 and/or 27). The microphones may comprise analog microphones or digital microphones or the like, and may be positioned at or aligned with one or more openings formed in the top and/or bottom of the cap portion or the mirror holder. The microphones, such as microphones of the types disclosed in U.S. Pat. Nos. 6,243,003; 6,278,377 and/or 6,420,975, and/or in PCT Application No. PCT/US03/308877, filed Oct. 1, 2003 and published Apr. 15, 2004 as International Publication No. WO 2004/032568, may be provided for interfacing with a vehicle telematics system or the like. Optionally, the cap portion or portions and the circuit board or boards may also or otherwise include other accessories, such as a telematics system, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 5,929,786 and/or 5,786,772, and/or U.S. patent applications, Ser. No. 10/427,051, filed Apr. 30, 2003, now U.S. Pat. No. 7,038,577; and Ser. No. 10/209,173, filed Jul. 31, 2002, now U.S. Pat. No. 6,882,287, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979 and/or 6,731,205), an ONSTAR® system and/or the like (with all of the above-referenced patents and PCT and U.S. patent applications being commonly assigned, and with the disclosures of the referenced patents and patent applications being hereby incorporated herein by reference in their entireties). The accessory or accessories may be positioned at or on the cap portions and thus positioned at or within the mirror holder and may be included on or integrated in a printed circuit board positioned within the mirror holder.

Optionally, the cap portion or portions of the present invention may include one or more attachments, such as attachments of the types described in U.S. Pat. Nos. 6,690,268 and/or 6,428,172, which are hereby incorporated herein by reference. The attachment or attachments, such as a pen holder or display screen or the like, may be incorporated into the cap portion or may be removably attached to the cap portion and, thus, may be removable if not desired for the particular mirror application, without affecting the scope of the present invention. The desired attachment may be selected for the particular application of the cap portion and mirror assembly, and may provide additional features to the cap portion and mirror assembly as may be desired or selected for the particular mirror application.

Optionally, the cap portion or portions may include a conversation mirror that may flip up or out from the cap portion to allow the driver of the vehicle to view a person in the rear seat (such as a child in the rear seat) to see and talk to the person in the rear seat without having to adjust the reflective element of the mirror assembly. The conversation mirror may be pulled out when desired or may be spring loaded to pop up or out when actuated or depressed, or may be electronically controlled to extend out from the cap portion when an input is actuated, without affecting the scope of the present invention.

Optionally, a blind spot detection or side object detection system or circuitry and corresponding display or indicator may be provided on one of the cap portions and on the reflective element for indicating to the driver or occupant of the vehicle that another vehicle may be in a lane adjacent to the subject vehicle. The indicator may comprise any iconistic type of display which may indicate that another vehicle has been detected and/or that the subject vehicle is changing lanes toward the detected object or vehicle. The side object detection and warning system may utilize the principles disclosed in U.S. patent applications, Ser. No. 10/427,051, filed Apr. 30, 2003, now U.S. Pat. No. 7,038,577; and Ser. No. 10/209,173, filed Jul. 31, 2002, now U.S. Pat. No. 6,882,287, which are hereby incorporated herein by reference.

Optionally, the side object detection system may be operable to detect objects or other vehicles at one or both sides of the subject vehicle and to detect and identify a lane marker or lane markers at one or both sides of the vehicle, such as disclosed in U.S. patent application Ser. No. 10/427,051, filed Apr. 30, 2003, incorporated above. The side object detection system may be further operable to provide a visible and/or audible warning to the driver of the subject vehicle in response to the detection of another object or vehicle at a side of the subject vehicle and in response to the position or movement of the subject vehicle relative to the lane markers. The use of lane marker detection integrated with such side object detection systems can be used to reduce false positives (where the system detects a vehicle in the adjacent lane when there is no vehicle in the adjacent lane) significantly and enable longer distances of detection, which in turn improves response time for system warnings from high speed target vehicles. In known or conventional side object detection systems, the systems do not track lane markings. Known radar systems are incapable of lane tracking due to the nature of the technology, and conventional vision systems do not currently include this functionality. This forces the detection zone of such known side object detection systems to be static or non-changing regardless of any curvature in the road, and does not allow for higher warning functionality based on the lane position of the subject vehicle.

It is envisioned that the side object detection system (which may have components and/or circuitry on a cap portion or portions of the interior rearview mirror assembly, or on or at or in the mirror assembly or on or at or in an accessory module or pod mounted to or positioned at or near the mirror assembly or positioned elsewhere in the vehicle) may utilize lane marking detection and recognition to allow the side object detection system to determine or adjust a detection zone or target zone or area based on the lane markings of the adjacent lane. Such lane marking detection may accommodate a non-linear detection zone when the subject vehicle is turning or on a curve. This may provide a longer detection distance because non-linear lanes may cause false positives in a static detection zone, whereas a dynamic zone may facilitate a better area of interest at greater distances, since it may avoid tracking trailing vehicles (such as in the same lane as the subject vehicle) on sharp curves. Such a side object detection system may also allow higher human/machine interface (HMI) processing.

Known side object detection systems may be specified to warn when a vehicle is in the blind spot or will be in a short amount of time. This may force the system to warn the driver of a detected object even when a driver is not intending to make a lane change toward the detected object. This can be a source of annoyance to the driver, and it emphasizes the effect of false positives from detection of infrastructure, shadows, miscellaneous road clutter and the like. However, if the side object detection system requires the above condition or detection and also requires a close proximity to or movement toward the lane markers or adjacent lane (i.e. the subject vehicle is moving toward the lane markers and thus toward the adjacent lane) prior to providing a warning, then the system may only provide such a warning when actual danger is present (i.e. the subject vehicle is changing lanes toward an adjacent lane which is occupied by a detected vehicle or object).

Such a side object detection system may provide a large reduction of false positives over current side object detection systems, and the warning may thus represent a heightened level of risk for the current maneuver, instead of a heightened level of risk for a potential maneuver. The side object detection system thus may reduce annoyance, improve perceived reliability, and improve overall detection distances, which in turn may improve the predictive nature of the system to reduce latencies based on human response. The side object detection system, or circuitry and/or display of the side object detection system, may be incorporated into one or more cap portions mounted at the interior rearview mirror assembly, or may be incorporated into the rearview mirror assembly or an accessory module or pod positioned at or near the rearview mirror assembly. The display may be at the reflective element of the mirror assembly and may be an iconistic display of the subject vehicle and a detected object adjacent to the subject vehicle, or any other type of display, and may provide an audible signal to the driver of the vehicle, without affecting the scope of the present invention.

Optionally, the cap portion or portions may include a display element, such as a video display element or the like, that may slide out or flip up or down from the cap portion to provide a video screen that is viewable by the driver of the vehicle, such as a video display screen of the type described in PCT Application No. PCT/US03/40611, filed Dec. 19, 2003 and published Jul. 15, 2004 as International Publication No. WO 2004/058540, which is hereby incorporated herein by reference. The video display screen may be operable to display information to the driver of the vehicle, and may be incorporated into or may be in communication with a vision system or imaging system of the vehicle, such as a rearwardly directed vehicle vision system utilizing principles disclosed in U.S. Pat. Nos. 5,550,677; 5,760,962; 5,670,935; 6,201,642 and/or 6,717,610, and/or in U.S. patent application Ser. No. 10/010,862, filed Dec. 6, 2001, now U.S. Pat. No. 6,757,109, which are hereby incorporated herein by reference, a trailer hitching aid or tow check system, such as the type disclosed in U.S. patent application Ser. No. 10/418,486, filed Apr. 18, 2003, now U.S. Pat. No. 7,005,974, which is hereby incorporated herein by reference, a cabin viewing device or system, such as a baby viewing or rear seat viewing camera or device or system or the like, such as disclosed in U.S. Pat. Nos. 5,877,897 and 6,690,268, which are hereby incorporated herein by reference, a video communication device or system, such as disclosed in U.S. Pat. No. 6,690,268, which is hereby incorporated herein by reference, and/or the like. Optionally, the video display screen may also or otherwise serve as a screen for a navigation system of the vehicle or the like, such as a GPS-based navigation system, such as is known in the automotive art.

Optionally, the mirror assembly may include a heating device or element for heating the display element or the area around the display element. At low temperatures, it may be desirable to heat the display element, such as a liquid crystal display (LCD) element or the like (or such as a video screen display or illuminated display or the like), in order to enhance the performance and response of the display element in such low temperatures or cold conditions or environments. The display element may comprise any type of display element or light emitting element, such as a vacuum fluorescent (VF) display element, a light emitting diode (LED) display element (such as an inorganic LED display element or an organic light emitting diode (OLED) display element or a high intensity, high efficiency LED display element, such as disclosed in U.S. Pat. Nos. 6,690,268 and 6,428,172 and in U.S. patent application Ser. No. 10/054,633, filed Jan. 22, 2002, now U.S. Pat. No. 7,195,381, which are hereby incorporated herein by reference), a multi-pixel, dot-matrix liquid crystal display element, an electroluminescent display element, a backlit display element, such as a back lit iconistic display (such as disclosed in U.S. Pat. Nos. 6,642,851; 6,501,387 and 6,329,925, which are hereby incorporated herein by reference), a display element backlit by an incandescent light source, or a backlit liquid crystal display (LCD), a video display screen (such as the type described in PCT Application No. PCT/US03/40611, filed Dec. 19, 2003 and published Jul. 15, 2004 as International Publication No. WO 2004/058540, which is hereby incorporated herein by reference) or the like, without affecting the scope of the present invention.

The heating device may be operable to heat the reflective element at the area of the display element or may heat the display element itself. For example, the rear surface of the reflective element may have a transparent conductive coating or layer, such as an indium tin oxide (ITO), a tin oxide (TO) or the like (such as transparent conductive layers of the types suitable for use in electrochromic cells and such as described in U.S. Pat. Nos. 6,690,268; 5,668,663; 5,724,187; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,910,854; 5,142,407 and 4,712,879, and/or in U.S. patent application Ser. No. 10/054,633, filed Jan. 22, 2002, now U.S. Pat. No. 7,195,381, and/or in PCT Application No. PCT/US03/29776, filed Sep. 19, 2003 and published Apr. 1, 2004 as International Publication No. WO 2004/026633; PCT Application No. PCT/US03/35381, filed Nov. 5, 2003 and published May 21, 2004 as International Publication No. WO 2004/042457; and/or in PCT Application No. PCT/US03/036177, filed Nov. 14, 2003 and published Jun. 3, 2004 as International Publication No. WO 2004/047421; and/or U.S. provisional applications, Ser. No. 60/531,838, filed Dec. 23, 2003; Ser. No. 60/553,842, filed Mar. 17, 2004; and Ser. No. 60/563,342, filed Apr. 19, 2004, which are hereby incorporated herein by reference), applied thereto or deposited thereon in at least the area at which the display element may be positioned. An electrical current may then be applied to the transparent conductive layer (such as via a pair of terminals contacting opposite portions of the transparent conductive layer or the like) to energize the conductive layer and to heat the conductive layer. For example, the transparent conductive coating or layer may generate heat as electrons or electricity flow from a contact of a power terminal across the surface or coating or layer to a contact of a ground terminal. The contacts may be spaced apart at generally opposite sides of the transparent conductive layer and may provide for generally uniform and thorough heating of the transparent conductive layer when electricity is applied to the heating or power terminal.

The display element may be positioned behind the reflective element and transparent conductive coating and may be next to or urged against or optically coupled to the transparent conductive coating on the rear surface of the reflective element. When the electrical current is applied across the transparent conductive layer, the resistivity in the conductive layer causes the conductive layer to be heated, which functions to heat the display element to enhance the performance of the display element during low temperature conditions. Optionally, other types of heating devices may be implemented at or against the display element and/or the reflective element, or may be positioned at the printed circuit board upon which the display element may be mounted, without affecting the scope of the present invention.

Optionally, for example, a heating device may be implemented at or near a display (such as a video display screen displaying, for example, driver information such as navigational information or a view of an interior or exterior scene, such as a curb side view such as is now being required for certain vehicles in Japan, or a parking/reversing view or the like) to heat the display or display area at least initially upon startup of the vehicle in extremely cold conditions. When the vehicle is in a cold climate (such as, for example, in northern Minn. in the winter time where the temperature may drop to around thirty degrees below zero), the heater may be activated on the first ignition cycle of the vehicle or when the vehicle is first turned on or the like and when the temperature is below a threshold temperature. The heating device may include a thermometer or thermistor or the like to determine the ambient temperature at the vehicle or at or near the display, and the heater may be activatable in response to an output of the thermometer. Optionally, if the temperature is below a threshold temperature, the heater may be operable in a "quick heat mode" to rapidly heat the display so that it works properly very quickly after startup of the vehicle. The heater may be operable at a higher than normal power dissipation during the quick heat mode to provide rapid heating or thawing or defrosting of the display when the vehicle ignition is first turned on during winter or cold conditions, but after the initial rapid heating phase is completed, the heater may operate at a lower power dissipation level more suited for ongoing heating during the driving event. This is particularly useful when the display is associated with a backup aid or reverse vision system or the like (such as those described in U.S. Pat. Nos. 5,550,677; 5,760,962; 5,670,935; 6,201,642; 6,717,610; 5,877,897 and 6,690,268, and/or in U.S. patent applications, Ser. No. 10/010,862, filed Dec. 6, 2001, now U.S. Pat. No. 6,757,109, and Ser. No. 10/418,486, filed Apr. 18, 2003, now U.S. Pat. No. 7,005,974, and/or in PCT Application No. PCT/US03/40611, filed Dec. 19, 2003 and published Jul. 15, 2004 as International Publication No. WO 2004/058540, which are hereby incorporated herein by reference), where it is important for the display to be fully operational at the startup of the vehicle so it provides a proper or desired display of the rearward field of view of the camera as the vehicle is initially backed out of its parking space or driveway or the like.

The heating device and the construction of the mirror assembly thus may provide heating of a display or display element (such as, for example, heating of a slide out display screen such as the type described in PCT Application No. PCT/US03/40611, filed Dec. 19, 2003 and published Jul. 15, 2004 as International Publication No. WO 2004/058540, which is hereby incorporated herein by reference), such as for a backup aid or rear vision system or the like, during cold temperatures to enhance the performance of the display during such cold temperatures. The heating device may provide intimate heating of the display medium, such as for a liquid crystal display element or the like, to enhance the performance of the display element. The heating device may provide such intimate heating of the display medium while not interfering with or heating other components or circuitry of the mirror assembly. The heating device may be included in the construction of the mirror assembly itself, such as a transparent conductive layer across the display screen or element or reflective element or such as a wire grid or other heating element or the like at or near the display area, to intimately heat the display element or display medium without substantially heating other components and circuitry in the vicinity of the display element. Optionally, the heating device may be activated/deactivated/controlled in conjunction with the heating elements for the exterior rearview mirrors of the vehicle (in such applications where the exterior rearview mirrors may be heated or defrosted, such as when a rear window defroster/defogger is actuated or the like). The heating device may utilize or incorporate aspects of heating devices used to heat and defrost exterior rearview mirror reflective elements, such as the heating means described in U.S. Pat. No. 5,446,576, issued to Lynam et al., which is hereby incorporated herein by reference, such as a positive thermal coefficient (PTC) heater element that is continuously connected to voltage ignition, but that principally only operates at low temperatures, such as less than about 10 degrees Celsius or lower. Optionally, a separate temperature controller, such as a thermistor, may be provided at or near the display in the interior rearview mirror assembly that powers the heater element at low temperatures.

Optionally, it is envisioned that the cap portion or portions may include a shielding element or sleeve or the like to provide shielding from external fields and unwanted radiation fields. The shielding may comprise a thin metal or foil member or sleeve or sheet or the like that is placed over and along an interior surface or portion of the cap portion (such that the shielding is within the mirror assembly and thus not readily visible when the mirror assembly is assembled). The shielding may be attached to the cap portion or portions so as to be retained thereto during the mirror assembly process. The shielding material/sheet preferably has a magnetic and/or electromagnetic permeability appropriate for shielding the accessories and the like within the cap portion and mirror assembly from external fields and unwanted radiation fields and the like.

Optionally, the cap portion or portions may include a hands free phone attachment to allow a driver of the vehicle to use a cellular or mobile telephone via circuitry and microphones and speakers of the mirror assembly and/or vehicle. The cap portion or portions may include a connector, such as a plug or socket type of connector or telephone docking device or the like, for a user to plug their mobile telephone into, which would connect the mobile telephone to a communication system or the like of the mirror assembly or vehicle.

Figure 28:
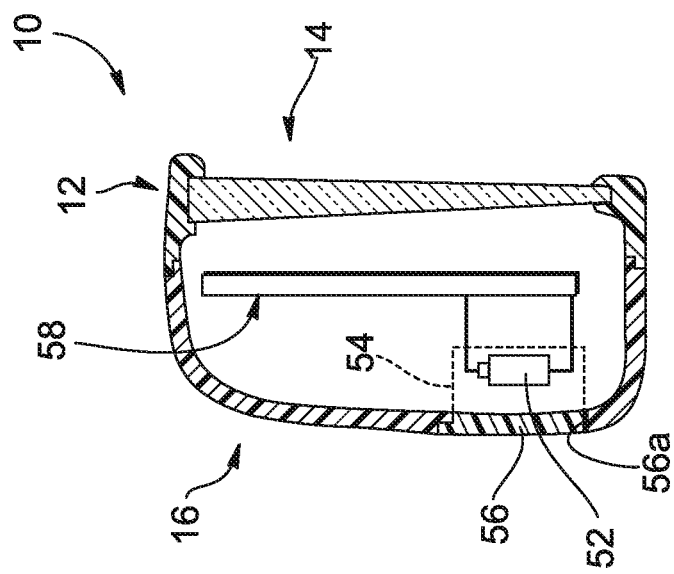
FIG. 28 is a sectional view of an interior rearview mirror assembly having a battery in accordance with the present invention.

Optionally, and as shown in FIG. 28, the cap portion or portions 16 may house or include a battery 52 for providing power to one or more electronic accessories or to a circuit board 58 of the cap portion or mirror assembly (such as, for example, described in U.S. Pat. No. 6,690,298, which is hereby incorporated herein by reference). The accessory or accessories of the mirror assembly thus may be powered by the battery such that the mirror assembly or circuitry of the cap portion may not have to connect to the power source of the vehicle. The battery may be contained within the cap portion and at or near an exterior or outer portion of the cap portion and may be readily accessible by a user to facilitate changing of the battery when desired or necessary. For example, the battery 52 may be within a recess 54 of cap portion 16 and may be contained therein via a trap door or panel or door 56 that may cover battery 52 and recess 54 when closed. Panel 56 may be opened and may be removable or may be hingedly attached or otherwise movably attached to cap portion 16 to facilitate access to recess 54 and battery 52. For example, panel 56 may be molded with cap portion 16 and may be hingedly attached to cap portion 16 via a living hinge 56a along an edge of panel 56. Other means for storing a battery and selectively accessing the battery may be implemented, without affecting the scope of the present invention. The various accessories and electronic content and directly driven or energized displays may function via power from the battery or internal power source of the cap portion.

Optionally, and with reference to FIGS. 29-32, an interior rearview mirror assembly 60 may include a bezel portion 62 of a mirror casing, a reflective element 64 and a cap portion or rear portion 66 of the mirror casing. The mirror assembly 60 may include a mounting arrangement or mounting assembly 68 for pivotally or adjustably mounting or attaching the mirror assembly to the vehicle, such as to a windshield of the vehicle or the like. The mounting assembly 68 may include a mounting arm 70 having a ball member 70a at one end and an attachment end or mounting end 70b opposite to the ball member 70a. Ball member 70a may be pivotally received within a socket 72 that may be positioned at or formed with or established at or attached to an attachment plate 74 at the reflective element 64. When so positioned, attachment end 70b may extend from attachment plate 74 and may insert through an opening 66a in rear casing portion 66. The attachment end 70b may then attach or mount to a mounting portion or base portion or mounting base 76, which in turn may be attached or mounted to the vehicle or to a mounting button or the like (not shown) at the windshield or headliner or overhead console of the vehicle.

Figure 29:
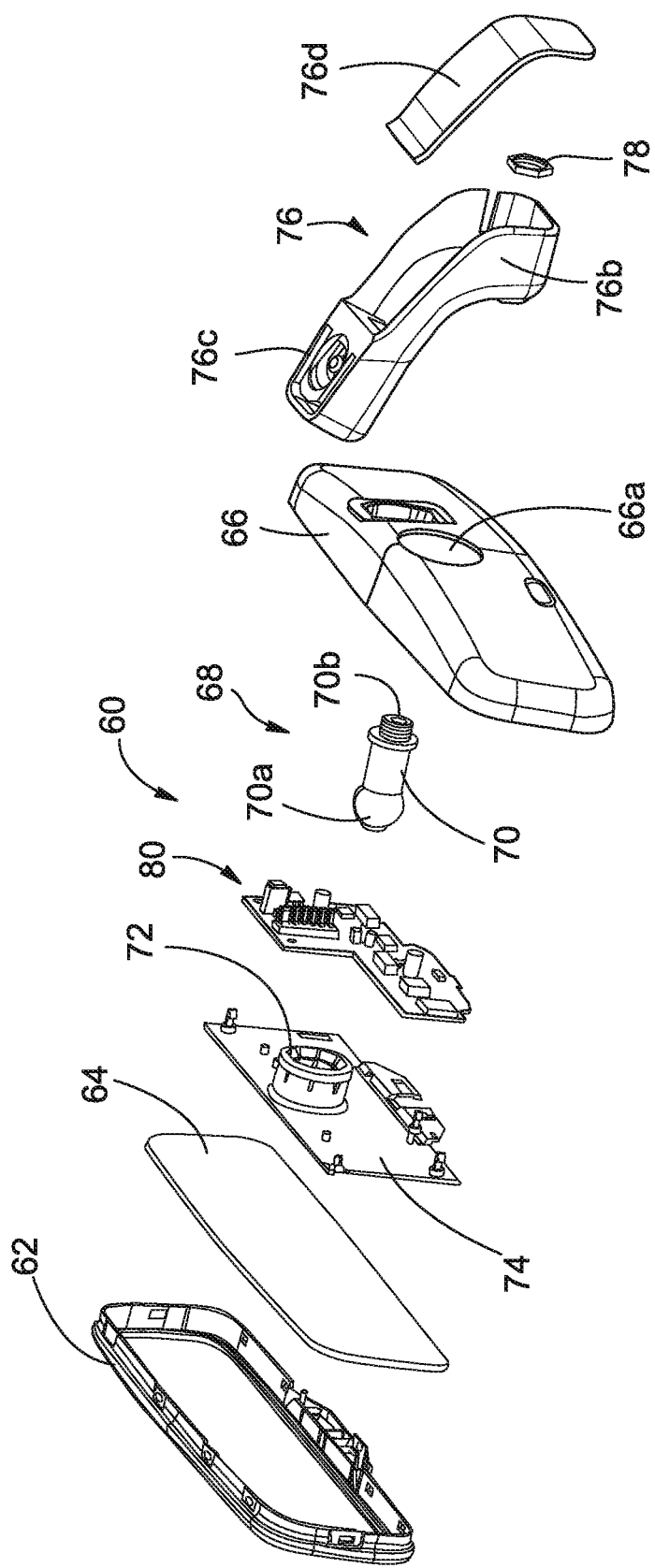
FIG. 29 is an exploded perspective view of another interior rearview mirror assembly in accordance with the present invention.

In the illustrated embodiment, attachment end 70b is a threaded stud or end, and is secured to or mounted to the mounting or base portion 76 via insertion of the threaded end 70b through an opening 76a (FIG. 31) in mounting portion 76 and tightening a female fastener or nut 78 onto threaded end 70b. The mounting arm 70 thus may have a narrow end for insertion through the opening 66a in rear casing portion 66, such that the opening in the rear casing portion may be smaller than is typically required (because typically the ball end of the mounting arm is inserted through the opening in the rear casing and snapped into the socket at the attachment plate). The mounting arm may be inserted into the socket of the attachment plate, which may be attached to the reflective element at the bezel portion, and then may be inserted through the opening in the rear casing portion or cap portion as the rear casing portion or cap portion is moved toward and into engagement with the bezel portion, such that the attachment end of the mounting arm extends or protrudes from the rear casing portion or cap portion after the mirror is assembled. The attachment end may then be attached or secured to the mounting portion or base portion via the nut or other type of fastener. As shown in FIG. 29, the mirror assembly may also include a circuit board 80 (with circuitry and/or accessories such as those described above), which may be attached to the attachment plate 74 or which may be attached to the cap portion for mirror assemblies of the types described above.

Although shown as having a threaded attachment end for securing the mounting arm to a mounting base via a nut or the like, it is envisioned that the mounting arm may have other forms of attachment ends for fixedly or pivotally or adjustably mounting the mounting arm to a mounting base or the like, without affecting the scope of the present invention. For example, the attachment end may provide a female fastener which may threadedly receive a male fastener or screw or bolt or stud, or the attachment end may provide a bayonet type fastener, or the attachment end and mounting base may cooperate to provide a snap together attachment or the like, or the attachment end and mounting base may otherwise attach or secure together, such as via adhesive or welding, such as ultrasonic welding or the like. Optionally, the attachment end may attach to or receive another ball member, which may be received within a socket at the mounting base, in order to provide a double ball mounting arrangement. The mounting arm, socket and/or mounting base may comprise plastic or polymeric materials, or may be die cast or otherwise formed, without affecting the scope of the present invention.

Figure 32:
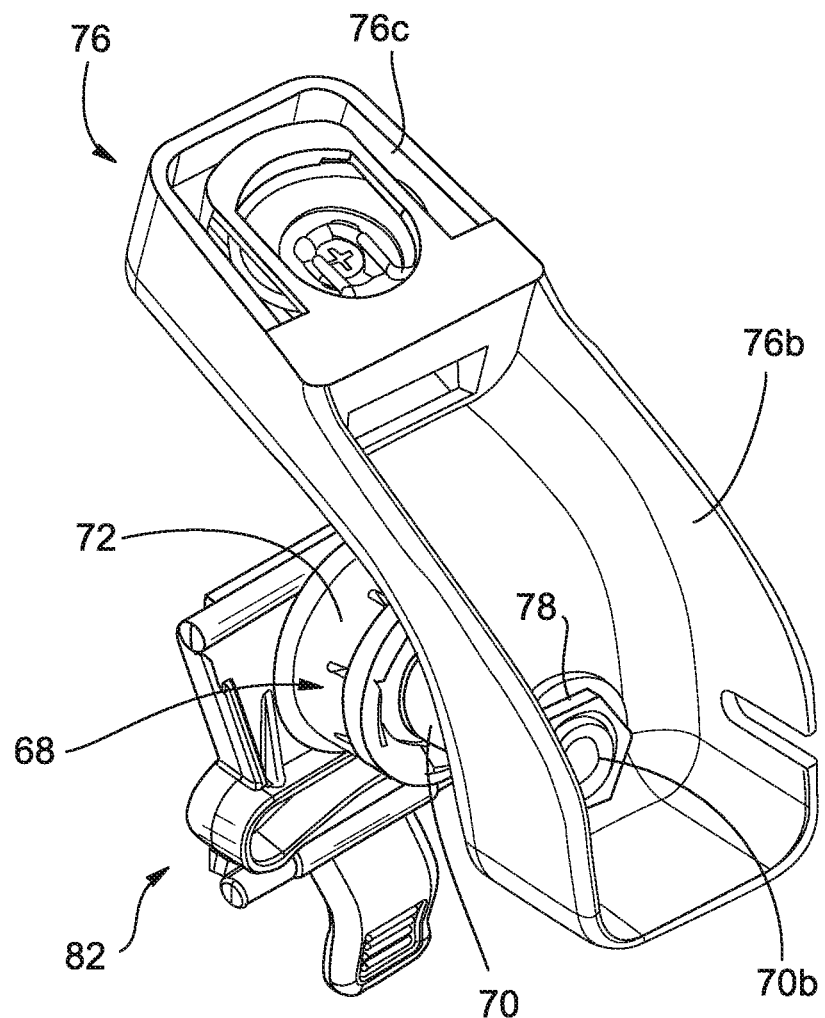
FIG. 32 is a rear perspective view of another mounting assembly of the present invention.

Optionally, and as shown in FIG. 32, the ball member 70a of mounting arm 70 may be received in a socket 72' attached to or positioned at or formed with or established at a toggle assembly 82, such as for a prismatic reflective element. The toggle assembly may be any type of toggle assembly, such as described above, and may be attached to or mounted to the mirror holder or the mirror casing, whereby the attachment end of the mounting arm may extend or protrude from the mirror casing when the toggle assembly and mounting arm are mounted therein or attached thereto. The attachment end may then connect or attach to the appropriate connector or attachment (such as to the mounting base 76 via a fastener or nut 78 as shown in FIG. 32) as described above to adapt the mirror assembly for the particular application.

The mounting arrangement of the present invention thus may provide a pre-established pivot element or member, such as a ball joint, at the attachment plate of the reflective element or at the toggle assembly or the like, whereby other attachments or mounting elements may be attached to the other end of the mounting arm to provide the desired attachment or mounting arrangement for the particular application of the mirror assembly. The mounting arm and ball member may be inserted within the socket and then the backing plate or toggle assembly (at which the socket may be formed) may be attached or secured to the reflective element with the pre-established pivot joint or element. The ball member of the mounting arm may already be inserted or snapped into the socket when the backing plate or toggle assembly is attached to or juxtaposed with the reflective element, such that the ball member need not be rammed into the socket when the socket is positioned at or juxtaposed with the reflective element, which avoids the impact or shock to the reflective element that typically occurs when a ball member is rammed into a socket that is at or attached to or juxtaposed with a reflective element.

The other end of the mounting arm may then be attached, such as via a snap together arrangement or a threaded fastener or the like, to another mounting portion or base portion or the like at the vehicle. Optionally, the other portion may have a second pivot element or member, such as a ball member, already received within a socket at a mounting base, and the end of the mounting arm may readily attach to the end of the other ball member to mount the mirror assembly in the vehicle. For example, the attachment end of the mounting arm extending from the reflective element assembly may threadedly attach to a corresponding attachment end of another ball member extending from a socket at a base portion at the vehicle. The mounting arrangement thus may provide a single or double ball mounting arrangement without the need to press or ram the ball member or ball members into the respective socket after the socket is attached to or positioned at the reflective element. The mounting arrangement also avoids the impact or shock of ramming the opposite ball member into the respective socket at the mounting base or button.

Because the pivot element or member, such as a ball member or ball members, is/are already inserted into their respective sockets so that the pivot joints are pre-established at the reflective element and mounting base, the ball member(s) do not have to be rammed or snapped into place in their respective sockets during installation of the mirror assembly, which substantially reduces the stresses at the reflective element to substantially limit or reduce cracking of the reflective element during installation of the mirror assembly. The mounting arrangement thus may substantially reduce the stresses at the reflective element during the installation processes.

Also, because the mounting arm may have an attachment end opposite a ball member, the ball member may be received or pre-established in any suitable or corresponding socket of a substantially universal bezel portion or reflective element assembly portion, whereby the attachment end of the mounting arm may be attached to any corresponding connector or attachment at the vehicle to complete the installation process for the respective mirror assembly. The present invention thus may provide a substantially universal and pre-established ball joint or pivot joint at the reflective element (and thus lends itself to provision of a universal reflective element assembly portion) that does not require attachment or insertion of the ball member at a later time (after the socket portion is positioned at or established at or juxtaposed with the reflective element), and may provide the capability of adapting or configuring the mounting arm to fixedly or pivotally or adjustably attach to a particular mounting base or vehicle portion or console or the like for the particular mirror application. The mounting arrangement may be suitable for applications with the cap portion and mirror holder assemblies as described above, or may be suitable for applications with other types of mirror assemblies, such as a mirror assembly of the type shown in FIG. 29, without affecting the scope of the present invention.

Figure 30:
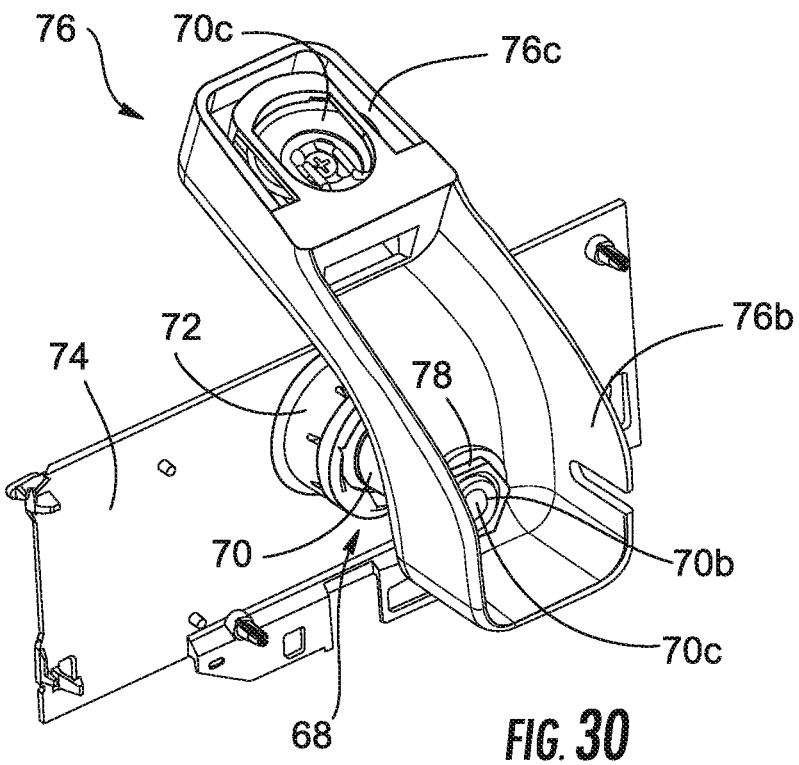
FIG. 30 is a rear perspective view of the mounting assembly of the mirror assembly of FIG. 29.
Figure 31:
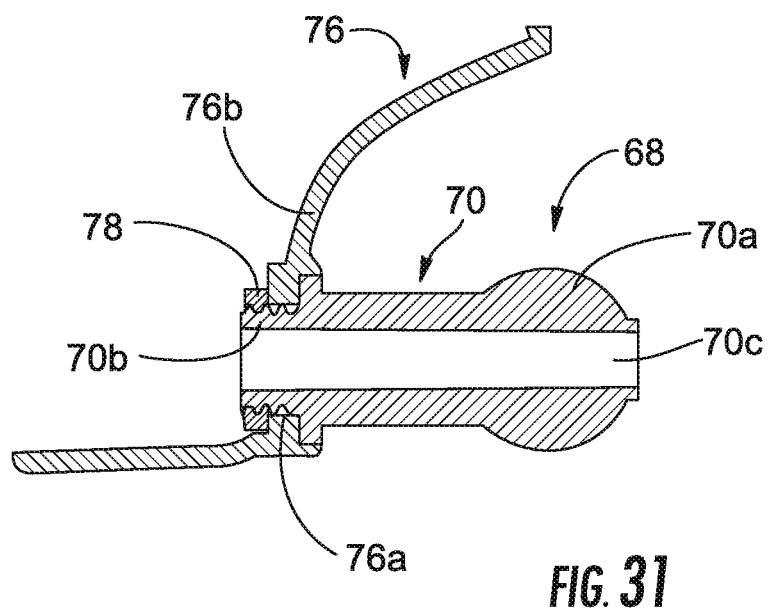
FIG. 31 is a sectional view of the mounting arm and mount of FIG. 30.

Optionally, and as shown in FIG. 31, the mounting arm 70 may comprise a hollow mounting arm that provides a wiring channel or passageway 70c therethrough. One or more wires or cables or the like thus may be routed through the mounting arm to provide power and/or control to the circuitry and accessories within the mirror assembly. As can be seen in FIGS. 30 and 31, the wires may route along and within the mounting base 76 and through the mounting arm and into the mirror casing or housing. Optionally, the attachment end of the mounting arm may include a connector and may plug into or connect to a corresponding connector at the mounting base or the like to establish mechanical and electrical connections (such as via utilizing aspects described in U.S. Pat. Nos. 6,672,744; 6,669,267; 6,402,331; 6,386,742 and 6,124,886, and/or U.S. patent applications, Ser. No. 10/739,766, filed Dec. 18, 2003, now U.S. Pat. No. 6,877,888, and Ser. No. 10/355,454, filed Jan. 31, 2003, now U.S. Pat. No. 6,824,281, which are hereby incorporated herein by reference) as the mirror assembly is mounted within the vehicle. The mounting arm may include wiring therethrough to electrically connect the connector or attachment end to the circuitry within the mirror assembly.

As shown in FIGS. 29 and 30, the mounting base 76 may have a hollow body portion 76b that may extend along the interior surface of the windshield and that may extend generally downwardly from an attaching portion 76c of mounting base 76. The attaching portion 76c may attach to the mounting button or other attachment element (not shown) positioned at or attached to the interior surface of the windshield or the headliner or an overhead console of the vehicle to position the mounting base at the desired or appropriate location at the vehicle. As shown in FIG. 29, the mounting base 76 may include a cover plate 76d that may encase or enclose the body portion 76b to provide a finished appearance to the mounting base 76 along the windshield. Optionally, the body portion 76b may include or receive one or more electronic elements or accessories, such as a rain sensor or the like (such as a rain sensor of the types described in commonly assigned U.S. Pat. Nos. 6,516,664; 6,320,176; 6,353,392; 6,313,454; 6,341,523 and 6,250,148; and/or in U.S. patent applications, Ser. No. 10/355,454, filed Jan. 31, 2003, now U.S. Pat. No. 6,824,281; and Ser. No. 10/348,514, filed Jan. 21, 2003, now U.S. Pat. No. 6,968,736, which are all hereby incorporated herein by reference), that may be positioned at the windshield and that may be optically coupled to the windshield, depending on the particular application. In such embodiments, the cover plate 76d may include one or more openings or apertures at which the rain sensor camera or sensing device may be positioned.

Although the mirror assembly may include a prismatic reflective element, it is envisioned that the cap portion or portions may include controls or circuitry for controlling electro-optic or electrochromic reflective elements, such as electrochromic reflective elements of one or more exterior rearview mirror assemblies of the vehicle. The circuitry or controls may control the dimming of the exterior mirrors, such as in a known manner, such as described in commonly assigned U.S. Pat. Nos. 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference. Optionally, the cap portion or portions may include one or more photo-sensors, such as an ambient light photo-sensor and a glare sensor, and the controls or circuitry may control the exterior electro-optic or electrochromic reflective elements in response to such photo-sensors.

Optionally, the exterior rearview mirror assemblies of the vehicle may comprise electrochromic mirror reflective element assemblies, while the sensors and electronic circuitry for glare detection and ambient light detection may be positioned inside the vehicle, such as at an interior electrochromic rearview mirror assembly. In applications where the exterior mirror assemblies comprise passenger and/or driver side electrochromic exterior rearview mirror assemblies, such as may be implemented in large vehicles, such as SUVs and the like, the electrochromic controls and circuitry may be contained within the exterior rearview mirror assemblies or the exterior electrochromic reflective element assemblies may be slaved off of the controls and circuitry of an associated electrochromic interior rearview mirror assembly of the vehicle. Optionally, it is envisioned that such sensors and electronic circuitry may be positioned at or near or incorporated into an interior prismatic rearview mirror assembly having a prismatic reflective element. The circuitry and the glare sensor and/or ambient light sensor (such as a photo sensor or the like, such as a glare sensor and/or an ambient light sensor and electrochromic automatic dimming circuitry of the types described in U.S. Pat. Nos. 4,793,690 and 5,193,029, and U.S. patent application Ser. No. 10/456,599, filed Jun. 6, 2003, now U.S. Pat. No. 7,004,593, which are all hereby incorporated herein by reference) thus may be positioned at or in or near or incorporated into the added feature prismatic interior rearview mirror assembly. The sensors may be positioned at or within the prismatic interior rearview mirror assembly such that the glare sensor is directed generally rearwardly (in the direction opposite to the forward direction of travel of the vehicle), such as through a bezel portion of the prismatic interior rearview mirror assembly, while the ambient sensor may be directed generally forwardly (in the direction of travel of the vehicle) or downwardly toward the floor of the vehicle when the mirror assembly is installed in the vehicle.

It is further envisioned that the sensors and/or control circuitry may be provided at, on or within a cap portion of the interior rearview mirror assembly and, thus, may be provided as an option for vehicles that offer the electrochromic exterior rearview mirror assemblies with a base or prismatic interior rearview mirror assembly. The appropriate cap portion (with electrochromic control circuitry and sensors and the like incorporated therein) may be selected and attached to the interior rearview mirror reflective element assembly portion to provide glare and light sensing capability and electrochromic reflective element assembly control capability to the interior rearview mirror assembly. Optionally, the cap portion may include the glare sensor in a location therein that may extend downward or outward from the cap portion so that the glare sensor may be directed generally rearward toward the rear of the vehicle when the mirror assembly is installed in the vehicle. For example, the cap portion may include a gondola or pod extending therefrom for housing the sensor or sensors and/or control circuitry. Alternately, the cap portion may include the glare sensor at a location therein that may align with a view port or the like through the reflective element, such as for applications where, for example, the mirror assembly includes a compass/display system or other display system, such as the types described herein and/or the types disclosed in U.S. patent application Ser. No. 10/456,599, filed Jun. 6, 2003, now U.S. Pat. No. 7,004,593, which is hereby incorporated herein by reference. In such applications, the ambient sensor may provide a dual function of providing an input to the control circuitry for controlling the exterior electrochromic reflective element assemblies and providing an input to the control circuitry for the display element of the interior rearview mirror assembly. The cap portion may include the ambient light sensor in a location and orientation whereby the ambient light sensor is directed generally forwardly in the direction of travel of the vehicle when the mirror assembly is installed in the vehicle.

Optionally, the electrochromic controls and glare/ambient light sensors thus may be provided in a cap portion (such as in a protrusion therefrom, such as a gondola or the like) and, thus, may be provided as an option for use with a common bezel and prismatic reflective element assembly. The present invention thus provides for optional controls and circuitry and sensors for optional accessories, such as electrochromic exterior rearview mirror assemblies, while providing a common bezel and prismatic reflective element and mounting attachment. The desired or appropriate cap portion (with the desired or appropriate controls/sensors/circuitry) may be selected for a particular application and may be snapped onto or otherwise attached to the common bezel and prismatic reflective element assembly. The assembled mirror assembly may then be installed in the appropriate vehicle with the exterior electrochromic mirror assemblies. The present invention thus may provide added feature prismatic interior rearview mirror assemblies, where the desired content of the mirror assemblies may be selected and provided on a respective optional cap portion while the rest of the mirror assemblies comprise common components.

Although shown and described as having a prismatic reflective element, the interior rearview mirror assembly of the present invention may optionally have an electro-optic or electrochromic mirror assembly. The electrochromic mirror element of the electrochromic mirror assembly may utilize the principles disclosed in commonly assigned U.S. Pat. Nos. 6,690,298; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein; and/or as described in U.S. patent application Ser. No. 10/054,633, filed Jan. 22, 2002, now U.S. Pat. No. 7,195,381, which is hereby incorporated herein by reference. Optionally, the electrochromic circuitry and/or a glare sensor and circuitry and/or an ambient light sensor and circuitry may be provided on one or more circuit boards at the cap portion or portions of the mirror assembly.

Optionally, the electrochromic reflective element may include one or more displays, such as for the accessories or circuitry described above. The displays may be similar to those described above, or may be of types disclosed in U.S. Pat. Nos. 5,530,240 and/or 6,329,925, which are hereby incorporated herein by reference, and/or may be display-on-demand or transflective type displays, such as the types disclosed in U.S. Pat. Nos. 6,690,298; 5,668,663 and/or 5,724,187, and/or in U.S. patent application Ser. No. 10/054,633, filed Jan. 22, 2002, now U.S. Pat. No. 7,195,381; and/or in U.S. provisional application Ser. No. 60/525,952, filed Nov. 26, 2003, and/or in PCT Application No. PCT/US03/29776, filed Sep. 19, 2003 and published Apr. 1, 2004 as International Publication No. WO 2004/026633, which are all hereby incorporated herein by reference.

Optionally, and with reference to FIG. 33A, a reflective element assembly portion 84 may hold or receive or comprise an electrochromic reflective element assembly or cell 86, which includes a front substrate 88 and a rear substrate 90 and an electrochromic medium 92 sandwiched therebetween. In the illustrated embodiment, the reflective element assembly or cell 86 comprises a front substrate 88 that is larger than the rear substrate 90 so as to create a relief region or overhang region or ledge 93 around the perimeter of the reflective element assembly, such as described in PCT Application No. PCT/US03/35381, filed Nov. 5, 2003 and published May 21, 2004 as International Publication No. WO 2004/042457; and/or in U.S. provisional applications, Ser. No. 60/553,842, filed Mar. 17, 2004; and Ser. No. 60/563,342, filed Apr. 19, 2004, which are hereby incorporated herein by reference.

The larger front substrate 88 allows the bezel portion or molding 94 to be molded around the electrochromic reflective element assembly and allows the bezel portion to shrink and directly stress the front substrate 88 without placing the interpane seal 96 under the hoop stresses and shear stresses that typically occur with conventional electrochromic cells or reflective element assemblies (where the front and rear substrates are offset one to another such that any bezel shrinkage typically places the front substrate in shear stress relative to the rear substrate, potentially leading to failure of the seal therebetween that protects the electrochromic medium from the outside environment) when the bezel portion cools and contracts around the cell. The bezel portion or molding 94 thus may be formed around the reflective element assembly or cell, and the cap portion (not shown in FIG. 33A) may be provided at a later step after the bezel portion has cooled around the reflective element assembly (such as described above) to provide a modular electrochromic mirror assembly in accordance with the present invention. Optionally, the bezel portion may be formed of a soft polymer or impact absorbing material (such as a soft touch material as described above, and/or preferably having a Shore A durometer value of less than about 110 Shore A, more preferably less than about 90 Shore A, and most preferably less than about 70 Shore A) at or around the perimeter of the front substrate 88 or of the front or first surface 88b of the front substrate 88, or a soft or impact absorbing trim portion or element may be provided at or around the perimeter of the front substrate 88, without affecting the scope of the present invention.

The front substrate 88 includes a transparent conductive coating or layer 89 (such as an indium tin oxide (ITO), a tin oxide (TO) or the like) on its rear surface 88a (the second surface of the cell), while the rear substrate 90 includes a metallic conductive coating or layer or layers or stack of coatings or layers 91 on its front surface 90a (the third surface of the cell), such as is generally done with electrochromic reflective element assemblies, and such as by utilizing aspects described in U.S. Pat. Nos. 6,690,268; 5,668,663; 5,724,187; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,910,854; 5,142,407 and 4,712,879, and/or in U.S. patent application Ser. No. 10/054,633, filed Jan. 22, 2002, now U.S. Pat. No. 7,195,381, and/or in PCT Application No. PCT/US03/29776, filed Sep. 19, 2003 and published Apr. 1, 2004 as International Publication No. WO 2004/026633; PCT Application No. PCT/US03/35381, filed Nov. 5, 2003 and published May 21, 2004 as International Publication No. WO 2004/042457; and/or in PCT Application No. PCT/US03/036177, filed Nov. 14, 2003 and published Jun. 3, 2004 as International Publication No. WO 2004/047421; and/or U.S. provisional applications, Ser. No. 60/531,838, filed Dec. 23, 2003; Ser. No. 60/553,842, filed Mar. 17, 2004; and Ser. No. 60/563,342, filed Apr. 19, 2004, which are hereby incorporated herein by reference.

As shown in FIG. 33A, the metallic conductive coating or layer or layers 91 may be removed from (or not disposed at) a perimeter region 90b of the front surface 90a of rear substrate 90, and the interpane seal 96 may be disposed around the masked or uncoated perimeter region, in order to electrically isolate the conductive coatings 91 from the perimeter edge of the rear substrate 90, such as described in U.S. provisional applications, Ser. No. 60/553,842, filed Mar. 17, 2004; and Ser. No. 60/563,342, filed Apr. 19, 2004, which are hereby incorporated herein by reference. The conductive coatings or layers 91 may provide a tab out region (not shown in FIG. 33A) along the front surface of the rear substrate to provide for electrical connection between the third surface coating 91 and the perimeter edge of the substrate (such as described in U.S. provisional applications, Ser. No. 60/553,842, filed Mar. 17, 2004; and Ser. No. 60/563,342, filed Apr. 19, 2004, which are hereby incorporated herein by reference. A conductor or electrical connector 100 may connect to the conductive coating 89 via a solder or conductive strip 101 around the overhang region, while a second conductor or electrical connector (not shown in FIG. 33A) may connect to the conductive coating 91 via connection to the tab out region. The reflective element assembly may include a reflective perimeter region around the perimeter of the reflective element assembly or may have an opaque or blackened or darkened perimeter region, such as by utilizing the principles described in U.S. Pat. No. 5,066,112, which is hereby incorporated herein by reference, in order to at least partially conceal the seal 96 from being readily viewable by the driver of the vehicle.

Optionally, and with reference to FIG. 33B, a reflective element assembly portion 84' may hold an electro-optic reflective element assembly 86, such as an electrochromic reflective element assembly or cell, and may include a mounting or attachment plate 98 positioned at the rear surface of the reflective element assembly 86 (the fourth surface of the cell). The bezel portion or molding 94' may be molded or formed around the reflective element assembly 86 and around or at the attachment plate 98 to retain the attachment plate 98 and the reflective element assembly 86 within the bezel portion or molding 94'. As can be seen in FIG. 33B, the mounting plate 98 may include protrusions or recesses or the like 98a at least partially around its perimeter edge to facilitate mechanical connection and securement of the bezel portion 94' (such as by snap on or snap in) to the mounting plate 98 when the bezel portion 94' is molded around the mounting plate 98. The attachment plate 98 may include a pivot joint or element 102 established or formed thereon. The reflective element assembly portion 84' may be otherwise substantially similar to reflective element assembly portion 84, discussed above, such that a detailed description of the reflective element assembly will not be repeated herein. The components that are common with the reflective element assemblies 84 and 84' are shown with the same reference numbers in FIGS. 33A and 33B.

Therefore, the reflective element assembly portion may be formed or molded with the molding or bezel portion molded or formed around the larger front substrate to contain the reflective element assembly or cell within or at the bezel portion. The pivot element or joint 102 may be formed or established at the rear of the reflective element assembly, such as in the manners described above, and the mounting arm 104 may extend generally rearwardly from the pivot joint. The cap portion (such as cap portion 166 shown in FIG. 33C) may then receive the mounting arm 102 through an opening or the like in the cap portion such that the mounting arm extends from the cap portion after the cap portion is attached to or snapped to the reflective element assembly portion (such as at structure 95 shown in FIG. 33C). The electrical connectors of the reflective element assembly portion may connect to the appropriate electrical connectors or terminals or circuitry of the cap portion as the cap portion is assembled to or attached to the reflective element assembly portion, such as in the manners described above, in order to provide electrical power and/or control to the electrochromic cell.

The electrochromic reflective element assembly portion of the present invention thus may comprise a standard or universal or common reflective element assembly or cell and mirror holder or bezel portion, which may then be attached to a customized or selected or desired cap portion, as described above. Optionally, the reflective element assembly portion may be customized as well. For example, a selected bezel material may be molded around a common reflective element assembly or cell. The reflective element assembly portion may be formed by placing an electrochromic cell into a mold cavity (such as face down into the mold cavity with the rear surface of the rear substrate facing upward), and the plastic piece or mounting plate (preferably with a pivot element or member already established therein or thereon) may be inserted into the mold or placed generally at or on the rear surface of the rear substrate of the reflective element assembly or cell (i.e. the fourth surface of the cell). The mounting plate may be generally smaller than the profile of the rear substrate and may include the pivot element or socket formed thereon (or such pivot components may be added or attached or molded later). Optionally, the mounting plate may include electronic circuitry and the like, such as for making the electrical connection to the electrical connectors of the cell and/or for providing other electronic content or features or functions as may be desired (such as display elements for displaying information through the cell to a driver of the vehicle or the like, or such as ports or aperture for aligning with display elements of the cap portion so that information may be displayed or projected through the apertures in the mounting plate and through the cell to a driver of the vehicle). The bezel portion or molding may then be molded (such as via injection molding or reaction injection molding of a desired or selected or appropriate material into the mold cavity) to form the bezel portion around the perimeter of the front substrate (such as described above).

Optionally, the electrochromic reflective element assembly portion may be readily customized by injection molding a selected material into the mold to form the bezel portion of a selected or customized material. For example, the material may be selected to be a desired color, or may be selected to have desired properties, such as, for example, a soft touch or desired feel or appearance or finish or the like. The present invention thus may provide a common cell and attachment or mounting plate (and pivot element or joint), but may readily customize the appearance and/or feel of the bezel portion or molding to provide a particular, selected and customized reflective element assembly portion, while utilizing the same molding tool or mold to form the customized molding or bezel portion. Optionally, the reflective element assembly or cell and attachment or backing plate may comprise standard or common components for multiple mirror assemblies, and may be placed in desired or appropriate molds for molding the appropriate bezel portion for a particular mirror application. The customized reflective element assembly portion may then be attached to the desired or selected or customized cap portion as described above, and the electrical connections of the electronic circuitry and the like at the plate of the reflective element assembly portion may be made to the corresponding or appropriate connectors or circuitry of the cap portion as the cap portion is attached to the reflective element assembly portion. Although shown and described as molding a bezel portion around the perimeter region of a larger front substrate (which is larger than the rear substrate) of an electrochromic reflective element assembly or cell, it is envisioned that the bezel portion or molding may be molded or formed around other types of electrochromic reflective element assemblies or cells (such as flush cells or offset or staggered cells or the like), and/or may be molded or formed around prismatic reflective elements and the like (such as the bezel portion or molding 94" at the prismatic reflective element 86' shown in FIG. 33C), without affecting the scope of the present invention.

Optionally, and such as described in PCT Publication No. WO 03/095269, published Nov. 20, 2003, which is hereby incorporated by reference herein, an electro-optic rearview mirror assembly portion may comprise an electro-optic reflective element assembly or unit or cell, such as an electrochromic reflective unit or cell (whose reflectivity is variable in response to an electrical voltage applied thereto), and an electrical circuit for controlling operation of the mirror cell in response to one or more one light sensors. The interior mirror assembly portion may also comprise at least one pivot element or member, such as a ball and socket member, which allows angular adjustment of the mirror reflective element when the mirror assembly is mounted in the vehicle. Optionally, the ball member may include a plurality of electrical contacts on an exposed surface thereof for sliding engagement by respective counter-contacts over a range of angular movement of the mirror unit for supplying power to the electrical circuit from a vehicle electrical system external to the mirror assembly. Optionally, other means for providing electrical power and/or control to the circuitry/accessories of the mirror assembly may be provided (such as a wire or cable along an exterior surface or portion of the mounting arm or member or the like), without affecting the scope of the present invention.

Optionally, a prismatic mirror assembly portion and cap portion of the present invention may include electrochromic drive circuitry for controlling the exterior electrochromic reflective elements of the exterior rearview mirror assemblies of the vehicle, such as described above. The cap portion may include a glare sensor and an ambient sensor to determine the glare levels and ambient light levels and the control circuitry may adjust the dimming of the exterior mirrors accordingly. The glare sensor may receive the light through an aligned port in the reflective element or may receive light via a light pipe or the like, without affecting the scope of the present invention. The cap portion thus may provide electrochromic control circuitry for applications where the vehicle may have exterior electrochromic mirror assemblies, while the interior rearview mirror assembly may comprise a base or prismatic mirror that may otherwise not include such control circuitry. The cap portion of the present invention thus may provide a low cost conversion of an interior rearview mirror to provide electrochromic mirror control for the exterior rearview mirrors of the vehicle.

Figure 34:
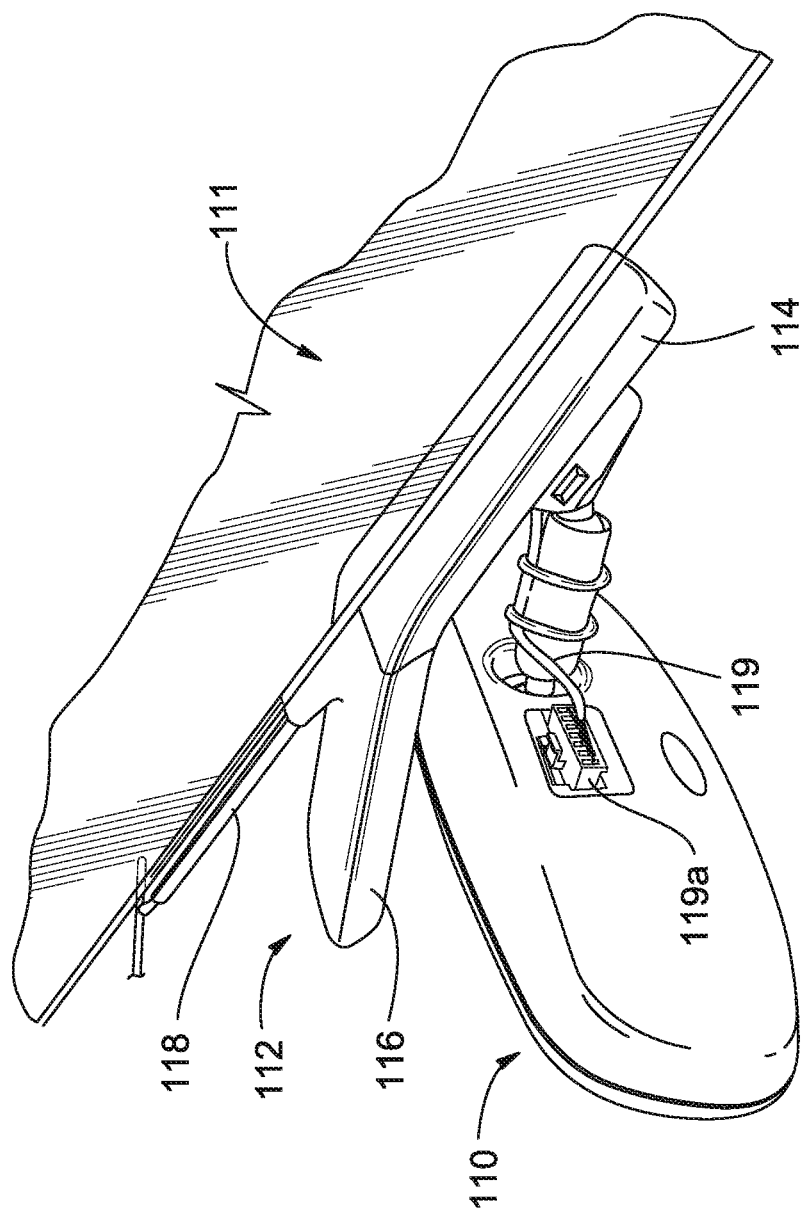
FIG. 34 is a perspective view of another interior rearview mirror assembly and a windshield accessory module in accordance with the present invention.
Figures 35C, 35D:
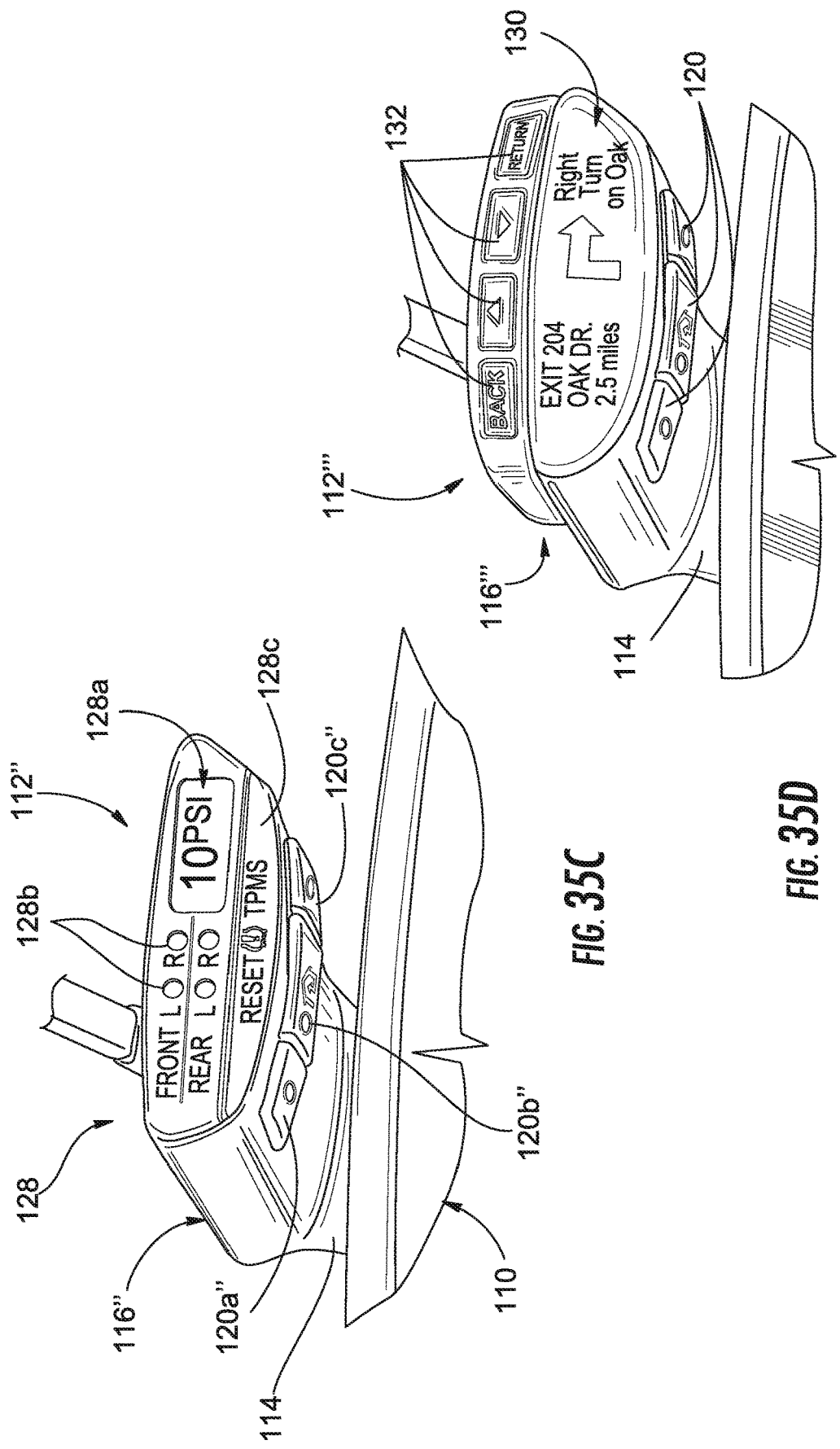

Optionally, and with reference to FIGS. 34 and 35A-D, an interior rearview mirror assembly 110 may be attachable or mountable to a windshield accessory module 112, which may be attachable or mountable to an interior surface of the windshield of a vehicle, such as at a mounting button or the like. Windshield accessory module 112 may include a body portion 114 that extends generally along the windshield and may include a head portion 116 at the upper end of the body portion 114 generally above the mirror assembly 110 and viewable by a driver of the vehicle when the windshield accessory module 112 and mirror assembly 110 are mounted in a vehicle, such as in a similar manner as described in U.S. patent application Ser. No. 10/355,454, filed Jan. 31, 2003, now U.S. Pat. No. 6,824,281, which is hereby incorporated herein by reference. Windshield accessory module 112 may include one or more accessories or circuitry therein, and may include one or more user interface controls or inputs and/or a display or indicator or indicators or the like at the head portion that are readily viewable and/or accessible above the mirror assembly, such as discussed below and as shown in FIGS. 35A-D and/or as described in U.S. patent application Ser. No. 10/355,454, filed Jan. 31, 2003, now U.S. Pat. No. 6,824,281, which is hereby incorporated herein by reference. As shown in FIGS. 34 and 35A, a wiring or cabling conduit 118 may extend upward from the body portion 114 and along the windshield 111 to conceal and route the wiring harness between the headliner of the vehicle and the windshield accessory module 112.

Preferably, the windshield accessory module may be configured to attach to a typical mounting button or the like for an interior rearview mirror assembly, and may include a replica of the mounting button or the like for the mirror assembly to mount thereto. The accessory module thus may attach to the existing button on the windshield and the mirror assembly may be attached to the button on the accessory module in the same manner. The mirror assembly may comprise a modular mirror assembly as described above, or may comprise other types of prismatic or electro-optic or electrochromic mirror assembly, without affecting the scope of the present invention. As shown in FIG. 34, a wiring harness 119 and connector or plug 119a may extend from accessory module 112 and plug into the back of the mirror casing or cap portion, such as in a similar manner as described above. The accessory module thus may provide an aftermarket addition to add additional electronic content or accessories, without having to replace the mirror assembly. The accessory module of the present invention thus may provide the desired accessories or options, while providing the vehicle manufacturer and/or the customer the freedom to select any mirror assembly. Optionally, for aftermarket applications, the windshield accessory module may be battery-operated and may include a battery compartment for receiving and connecting to a battery or power source or the like.

As shown in FIG. 35A, windshield accessory module 112 may include or may be associated with a garage door opening system, and head portion 116 may include one or more user actuatable inputs 120a-c for controlling or actuating the garage door opening system. Head portion 116 may also include an icon or indicia 122 or the like, which may be illuminated or back lit via a light source in head portion 116 to indicate to the user of the garage door opening system that the system is activated or that the button or input was successfully actuated. The garage door opening system may comprise a trainable garage door opening system and/or may utilize principles disclosed in U.S. Pat. Nos. 6,396,408; 6,362,771; 5,798,688 and 5,479,155; and/or U.S. pat. application Ser. No. 10/770,736, filed Feb. 3, 2004, now U.S. Pat. No. 7,023,322, which are hereby incorporated herein by reference.

Optionally, and with reference to FIG. 35B, the windshield accessory module 112' may also or otherwise include or be associated with a telematics system or cellular telephone system or the like. The head portion 116' thus may provide user inputs 124a, 124b, 124c for actuating the system, placing a telephone call and ending a telephone call, respectively. The head portion 116' may also include a microphone 126 for receiving voice or audio signals from within the cabin of the vehicle, such as via a microphone system of the types described in U.S. Pat. Nos. 6,243,003; 6,278,377 and/or 6,420,975, and/or in PCT Application No. PCT/US03/308877, filed Oct. 1, 2003 and published Apr. 15, 2004 as International Publication No. WO 2004/032568, which are hereby incorporated herein by reference. In the illustrated embodiment of FIG. 35B, the head portion 116' includes user inputs and/or indicators 120a', 120b', 120c' for controlling and actuating the garage door opening system and/or for indicating successful operation of the garage door opening system, such as described above.

Optionally, and with reference to FIG. 35C, the windshield accessory module 112" may also or otherwise include or be associated with a tire pressure monitoring system. The head portion 116" may include a display 128 that includes a pressure display 128a for displaying the tire pressure of a particular tire of the vehicle and indicators or light sources 128b for indicating which tire the display 128a is showing the pressure for. Head portion 116" may also include a reset button or input 128c for resetting the tire pressure monitoring system. The tire pressure monitoring system may comprise any tire pressure monitoring system, and may utilize the principles described in U.S. Pat. Nos. 6,124,647; 6,294,989; 6,445,287; 6,472,979 and/or 6,731,205, which are hereby incorporated herein by reference. The head portion 116" may also include one or more user inputs and/or indicators 120a", 120b", 120c" for controlling and actuating the garage door opening system and/or for indicating successful operation of the garage door opening system, such as described above.

Optionally, and with reference to FIG. 35D, the windshield accessory module 112''' may also or otherwise include or be associated with a navigational system for providing instructions to the driver to follow to arrive at a desired or input destination. The head portion 116''' may include a display screen or display device 130 for providing directional heading or driving instructions to the driver. For example, the display device 130 may display the next step to follow and may indicate how far the vehicle has to travel until it arrives at the next turn or intersection. The head portion 116''' may also include one or more user inputs or buttons 132 for controlling the navigational display and/or for scrolling through the instructions being displayed by the display device 130. The navigational system may be associated with or controlled or adjusted by a global positioning system of the vehicle and/or a telematics system of the vehicle and/or a compass system of the vehicle, and may utilize principles such as used in the compass and/or navigational systems of the types described in U.S. Pat. Nos. 6,678,614; 6,477,464; 5,924,212; 4,862,594; 4,937,945; 5,131,154; 5,255,442 and/or 5,632,092, and/or U.S. patent applications, Ser. No. 10/456,599, filed Jun. 6, 2003, now U.S. Pat. No. 7,004,593; Ser. No. 10/645,762, filed Aug. 20, 2003, now U.S. Pat. No. 7,167,796; and Ser. No. 10/422, 378, filed Apr. 24, 2003, now U.S. Pat. No. 6,946,978; and/or PCT Application No. PCT/US03/40611, filed Dec. 19, 2003 and published Jul. 15, 2004 as International Publication No. WO 2004/058540, which are all hereby incorporated herein by reference. As shown in FIG. 35D, head portion 116''' may also include one or more user inputs and/or indicators 120 for controlling and actuating the garage door opening system and/or for indicating successful operation of the garage door opening system, such as described above.

The desired accessory module or content may be used with any mirror assembly and, for aftermarket applications, may be used with an existing mirror assembly in the vehicle. The existing mirror assembly may be removed from the mounting button and the windshield module may be attached to the windshield button and the mirror assembly may be attached to the button of the module. Optionally, and particularly for aftermarket applications, the accessory module may include a power source or battery for providing power to the electronic accessories contained within the module and/or within an associated mirror assembly.

Although certain examples of the controls and/or displays that may be provided at the head portion of the windshield accessory module are shown in FIGS. 35A-D and described above, clearly other displays and/or user inputs and/or accessories or functions or features may be provided within or at the windshield accessory module, without affecting the scope of the present invention. The desired features or content may be provided on a circuit board and may include display elements and/or display screens or panels or the like. The circuit board and associated display elements and circuitry and inputs (or appropriate or selected or desired display elements and the like) may be mounted to or attached to or snapped into a common or universal body or base portion to convert or form the desired windshield electronics module for the particular application. If the screen or circuitry is larger than the standard head size of the module, a larger cap portion (such as shown in FIGS. 35B and 35D) may be implemented to contain and conceal the circuitry and the like within the head portion. The windshield electronics module or accessory module of the present invention thus provides various modules with the desired features or content, while utilizing common or universal components.

The windshield electronics module of the present invention thus eases assembly of various modules having varied content, and eases disassembly and repair of the modules. Optionally, however, the module may be sealed to contain the circuit board and display elements therewithin, without affecting the scope of the present invention. The components of the module, such as the telematics controls and the like, may be associated with other components and/or circuitry and/or systems of vehicle, such as a vehicle electronic or communication system, and may be connected via a hard wire or via various protocols or nodes, such as Bluetooth, SCP, UBP, J1850, CAN J2284, Fire Wire 1394, MOST, LIN and/or the like, depending on the particular application.

Therefore, the present invention provides a modular prismatic interior rearview mirror assembly which may have features, such as electronic accessories and/or displays or the like. The accessories or circuitry may be attached to one or more cap portions which may snap or otherwise affix or secure or mount to the rear portion of the mirror holder or bezel portion or reflective element assembly portion. The mirror holder may receive the reflective element, which may be a prismatic reflective element or an electro-optic or electrochromic reflective element, soon after the mirror holder is formed or heated, such that the reflective element may be installed to the mirror holder without a separate bezel portion. The cap portions and associated accessories and/or circuitry may be mounted to the mirror holder after the reflective element is installed and after the mirror holder has cooled and shrunk. The cap portion of the present invention thus avoids the increased costs associated with a two piece mirror holder having a separate bezel portion which is secured to the mirror holder to secure the reflective element at the mirror holder. The cap portions may be selected to have accessories and/or circuitry corresponding to openings in the mirror holder and/or to displays or display icons or the like at the reflective element. The cap portion may be selected to be formed of a different material than the bezel portion or molding, so as to provide the desired material properties and characteristics to both the bezel portion and the cap portion.

As described in PCT Application No. PCT/US03/35381, incorporated above, and as can also be seen with reference to FIG. 36, an electro-optic or electrochromic cell or reflective element assembly 210, such as for an interior or exterior rearview mirror assembly of a vehicle, includes a front substrate 212 and a rear substrate 214, with an electro-optic or electrochromic medium 216 disposed or sandwiched therebetween. Front substrate 212 includes an opaquifying or darkening or hiding conductive coating or layer 219 (such as, for example, an opaque or black conductive epoxy or dark colored conductive frit or chrome oxide/metallic chrome bilayer or the like, or other materials) applied or deposited around the border or perimeter of the front substrate 212. The opaquifying layer 219 may at least partially wrap around the perimeter edges of the substrate so that an edge portion 219*c* of opaquifying layer 219 extends at least partially along the perimeter edge 212*c* of substrate 212. The front substrate 212 also includes a semi-conductive, transparent coating or layer 218 (such as an ITO layer or doped ITO layer or the like) applied to or deposited on the rear surface 212*a* of front substrate 212 and overlapping the opaquifying or hiding conductive border layer or coating 219. Alternately, the semi-conductive layer 518 may be applied to or deposited on the rear surface of front substrate first, and then the opaquifying or black conductive layer may be applied to or deposited on the perimeter region of the semi-conductive layer.

The rear substrate 214 includes a metallic or conductive layer or coating 220 applied to or deposited on and substantially over the third surface 214*a* of rear substrate 214. The outer perimeter edge area or border region of the third surface 214*a* of the rear substrate 214 may be masked while the metallic reflector 220 is applied, such that the border region of the front surface 214*a* of substrate 214 provides a non-conductive surface or path or raceway 214*e* (such as a glass surface or the like) at least partially around the metallic reflector 220 and proximate to the edge of substrate 214.

As shown in FIG. 36, the front substrate has a height dimension that is greater than a corresponding height dimension of the rear substrate, such that the upper perimeter region or edge portion 212f and lower perimeter region or edge portion 212g of front substrate 212 extend beyond the corresponding perimeter regions or edge portions 214f, 214g of rear substrate 214 and define upper and lower overhang regions 212h, 212i. The connector or connectors may connect to the conductive layer at the rear surface of the front substrate at the overhang region or regions 212h, 212i and thus may not interfere or overlap the perimeter edge of the front substrate. The overhang regions of the front substrate relative to the rear substrate thus may allow for the electrical connectors to connect to the respective conductive layers substantially or entirely within the viewable profile of the front substrate by extending along the respective perimeter edges of the rear substrate, such that the connectors do not overlap the perimeter regions of the front substrate and, thus, are not viewable at the front surface of the front substrate. The front substrate may include a hiding layer or concealing layer at the perimeter regions or overhang regions, such as at the rear surface of the front substrate, to substantially hide or conceal the connectors and the seal of the reflective element assembly. The reflective element assembly thus may be suitable for a bezeless or minimal bezel mirror assembly.

As also described in PCT Application No. PCT/US03/35381, incorporated above, and as can also be seen with reference to FIG. 36, reflective element assembly 210 may provide an electrically conductive opaque or hiding or concealing layer 219 at least substantially around the perimeter edges of the front substrate, with the transparent semi-conductive layer 218 overlapping the opaque conducting layer 219 in the area at which the seal 217 is positioned around the electrochromic medium 216. The opaque conducting layer 219 thus provides a contacting region around the perimeter of the substrate for contacting the transparent semi-conductive layers or coatings 218. The seal 217 is positioned along the opaque conductive layer 219 and is thus masked or hidden by the opaque conductive layer to enhance the appearance of the reflective element assembly, particularly when the electro-optic or electrochromic medium is darkened or colored. The opaque conductive layer may thus allow for a smaller or no bezel overhang around the perimeter of the reflective element assembly. As can be seen in FIG. 36, the seal 217 may be positioned around the masked or border region of the rear substrate 214. The non-conductive perimeter seal 217 at least partially fills or covers or encompasses the non-conductive glass surface or masked region 214e to electrically isolate or insulate the conductive coating 220 from the conductive adhesive 226, such that the conductive coating 220 of rear substrate 214 is electrically isolated from the connector that connects to the conductive surface 218 of front substrate 212.

Optionally, and as also described in PCT Application No. PCT/US03/35381, incorporated above, and with reference to FIGS. 37A and 37B, an exterior rearview mirror cell or reflective element assembly for an exterior rearview mirror assembly of a vehicle includes a first or front substrate 312 (FIG. 37A) and a second or rear substrate 314 (FIG. 37B) and an electro-optic or electrochromic medium and seal 317 sandwiched therebetween, such as described above. As also described above, the front substrate 312 may have a transparent semi-conductive layer or coating 318 (such as ITO or the like) applied to the second or rear surface 312a of the substrate, and may include an opaquifying conductive border/perimeter coating or layer 319 (such as, for example, a black conductive epoxy or dark colored conductive frit or black chrome/metallic chrome layer or the like) applied around the perimeter edges of the front substrate 312. As shown in FIG. 37A, the perimeter coating or layer 319 may be along the perimeter edges of the front substrate 312 except in an electrical connection area or region 325 of substrate 312, where the perimeter coating 319 is inward of the outer edges of substrate 312. The electrical connection region 325 is coated by the semi-conductive layer 318 and/or a conductive layer or the like. A deletion line 321, such as a non-conductive area in the region 325 where the busbar layer and semi-conductive layer is etched off or otherwise removed from or not applied to the surface of the substrate, is formed at the electrical connection area 325 to separate and define and electrically isolate a rear substrate electrical connection area 325a or raceway portion of the semi-conductive layer from a front substrate electrical connection area 325b or surface portion of the semi-conductive layer.

An electrical connection or contact 322 is connected to or applied to the front substrate electrical connection area 325b to provide electrical power or connection to the semi-conductive layer 318 on the rear surface of the front substrate 312. Likewise, an electrical connection or contact 324 is connected to or applied to the electrically isolated rear substrate electrical connection area 325a and is in electrical communication with the conductive layer of the third surface 314a of rear substrate 314 via a conductive material or bridge 323, as discussed below.

With reference to FIG. 37B, rear substrate 314 includes a metallic reflector layer 320 (such as a layer or layers comprising, for example, chromium, chromium/rhodium, aluminum, silver, aluminum alloy, silver alloy, an ITO/silver/ITO stack, an ITO/aluminum/ITO stack or the like, such as ITO-silver-ITO stacks or layers, or display on demand stacks or layers or infrared transmitting stacks or layers of the types described in PCT application No. PCT/US03/29776, filed Sep. 19, 2003 and published Apr. 1, 2004 as International Publication No. WO 2004/026633) on its front or third surface 314a, and a perimeter black seal 317 generally around the perimeter edges of the substrate. As can be seen in FIG. 37B, an electrical connection area 327 may be defined at a region of the rear substrate 314, such as at a corner of the substrate, where the perimeter seal 317 is positioned inward of the outer edge of the substrate. The rear substrate 314 is formed to be substantially identical in shape to the front substrate 312, except at the electrical connection area 327, where the rear substrate may be cut back or reduced along a cut-away or cut back edge 314c. The conductive bridge 323 is positioned at a portion of the electrical connection area 327 to provide electrical connection to the metallic reflective coating or layer 320 via electrical connector 324 at front substrate 312.

When the substrates 312, 314 are placed together to form the electro-optic or electrochromic mirror cell or reflective element assembly (with the electro-optic or electrochromic medium disposed or sandwiched therebetween), the electrical connection area 327 of rear substrate 314 generally aligns with a portion of the electrical connection area 325 of front substrate 312. The conductive bridge 323 bridges or spans the gap or spacing between the electrical connection areas 325a and 327 to connect the electrical contact or connector 324 and electrical connection area 325a to the metallic conductive reflective layer 320 of rear substrate 314.

The cut-away edge 314c of rear substrate 314 provides for exposure of the electrical connectors or contacts 322, 324 along the outer edge 312c of the electrical connection area 325 of front substrate 312. The electrical contacts for providing electrical power to the conductive or semi-conductive layers at both substrates are made at only one of the substrates. The other edges of the substrates 312, 314 are generally flush or aligned to form a flush reflective element assembly for an exterior rearview mirror assembly. The reflective element assembly may thus be implemented in a mirror assembly having a minimal bezel or a bezelless mirror assembly to enhance the appearance of the mirror assembly.

As disclosed in U.S. patent application Ser. No. 10/427,051, filed Apr. 30, 2003, now U.S. Pat. No. 7,038,577, incorporated above, a camera or imaging sensor of an object detection system or lane change assist system is operable to capture an image of the exterior scene within the field of view of the camera. The captured image comprises an image data set, which is representative of the exterior scene, and which is received by the control. The control is operable to process image data within a reduced data set or subset of the image data set more than other image data of the image data set to reduce the processing requirements of the control. The reduced data set or subset or subsets is/are representative of a target zone or area or areas in the exterior scene where a vehicle or other object of interest may realistically be expected to be present within the exterior scene. The control is thus operable to primarily process the significant or relevant area or areas of the scene more than less relevant areas, and may limit or reduce processing of or substantially ignore the image data representative of some areas of the exterior scene where it is not likely that a vehicle or other object of interest would be present or where a vehicle cannot be present.

The camera or imaging sensor may comprise an imaging array sensor, such as a CMOS sensor or a CCD sensor or the like, such as disclosed in commonly assigned U.S. Pat. Nos. 5,550,677; 5,670,935; 5,796,094 and 6,097,023, and U.S. patent application Ser. No. 09/441,341, filed Nov. 16, 1999, now U.S. Pat. No. 7,339,149, or an extended dynamic range camera, such as the types disclosed in U.S. provisional application Ser. No. 60/426,239, filed Nov. 14, 2002. The imaging sensor may be implemented and operated in connection with other vehicular systems as well, or may be operable utilizing the principles of such other vehicular systems, such as a vehicle headlamp control system, such as the type disclosed in U.S. Pat. No. 5,796,094, a rain sensor, such as the types disclosed in commonly assigned U.S. Pat. Nos. 6,353,392; 6,313,454 and/or 6,320,176, a vehicle vision system, such as a forwardly or sidewardly or rearwardly directed vehicle vision system utilizing the principles disclosed in U.S. Pat. Nos. 5,550,677; 5,670,935 and 6,201,642, and/or in U.S. patent application Ser. No. 09/199,907, filed Nov. 25, 1998, now U.S. Pat. No. 6,717,610, a traffic sign recognition system, a system for determining a distance to a leading vehicle or object, such as utilizing the principles disclosed in U.S. Pat. No. 6,396,397.

The camera preferably comprises a pixelated imaging array sensor which has a plurality of photon accumulating light sensors or pixels. The camera includes circuitry which is operable to individually access each photosensor pixel or element of the array of photosensor pixels and to provide an output or image data set associated with the individual signals to the control, such as via an analog to digital converter (not shown). As the camera receives light from objects and/or light sources in the target scene, the control may then be operable to process the signal from at least some of the pixels to analyze the image data of the captured image, as discussed below.

The camera may be positioned along one or both sides of the vehicle, such as at or within the exterior rearview mirror at either or both sides of the vehicle. However, the camera may be positioned elsewhere along either or both sides and/or at the rear of the vehicle and directed sidewardly and rearwardly from the vehicle to capture an image at either side of the vehicle, without affecting the scope of the present invention. The camera may be positioned at the vehicle and oriented or angled downwardly so as to capture an image which has an upper edge or region generally at the horizon. Positioning or orienting the camera in such a manner provides for an increased horizontal pixel count across the captured image at the important areas along the side of the vehicle, since any vehicle or significant object positioned at or along a side of the subject vehicle will be substantially below the horizon and thus substantially within the captured image. The lane change assist system of the present invention thus may provide an increased portion of the captured image or increased pixel count at important or significant or relevant areas of the exterior scene, since the area well above the road or horizon is not as significant to the detection of a vehicle at or along a side of the subject vehicle. Additionally, positioning the camera to be angled generally downwardly also reduces the adverse effects that the sun and/or headlamps of other vehicles may have on the captured images. The camera thus may be operable to capture substantially an entire image of the sideward scene below the horizon.

Changes and modification in the specifically described embodiments may be carried out without departing from the principles of the present invention, which is intended to be limited only by the scope of the appended claims as interpreted according to the principles of patent law.

The embodiments of the invention in which an exclusive property or privilege is claimed are defined as follows:

1. A vehicular interior rearview mirror assembly, said vehicular interior rearview mirror assembly comprising:
   a prismatic mirror reflective element comprising a glass substrate having a planar front surface and a planar rear surface;
   wherein said glass substrate comprises a circumferential edge around the periphery of said glass substrate;
   said circumferential edge spanning a thickness dimension of said glass substrate between said planar front surface and said planar rear surface, and wherein said planar front surface of said glass substrate comprises an outermost surface of said prismatic mirror reflective element that is viewable by and is contactable by a driver of a vehicle equipped with said vehicular interior rearview mirror assembly;
   wherein said prismatic mirror reflective element comprises a mirror reflector established at said planar rear surface of said glass substrate of said prismatic mirror reflective element;
   a plastic molding;
   wherein said plastic molding is circumferentially disposed around said circumferential edge of said glass substrate without overlapping said planar front surface of said glass substrate, and wherein the plane of said planar front surface of said glass substrate is generally flush with an outermost part of said plastic molding;
   wherein, with said plastic molding circumferentially disposed around said circumferential edge of said glass substrate, the outermost part of said plastic molding provides a curved transition between said planar front surface of said prismatic mirror reflective element and another part of said plastic molding;

wherein the outermost part of said plastic molding providing the curved transition between said planar front surface of said prismatic mirror reflective element and the other part of said plastic molding comprises an outer curved surface;

wherein the outermost part of said plastic molding providing the curved transition between said planar front surface of said prismatic mirror reflective element and the other part of said plastic molding lacks an exposed sharp edge;

wherein said plastic molding comprises a portion of a mirror housing of said vehicular interior rearview mirror assembly;

a mounting structure configured to mount said vehicular interior rearview mirror assembly at an interior portion of the equipped vehicle; and wherein, with the mounting structure mounted at the interior portion of the equipped vehicle and when said mirror housing is moved by the driver of the equipped vehicle to adjust said prismatic mirror reflective element to a driver's desired setting, said prismatic mirror reflective element moves in tandem with movement of said mirror housing.

2. The vehicular interior rearview mirror assembly of claim 1, further comprising another plastic molding, and wherein the other plastic molding attaches to a rearward portion of said plastic molding to form said mirror housing.

3. The vehicular interior rearview mirror assembly of claim 2, wherein the other plastic molding comprises a cap portion having an aperture therethrough.

4. The vehicular interior rearview mirror assembly of claim 3, wherein a portion of the mounting structure configured to mount said vehicular interior rearview mirror assembly at the interior portion of the equipped vehicle passes through the aperture of said cap portion.

5. The vehicular interior rearview mirror assembly of claim 4, wherein said cap portion comprises a personalized cap portion.

6. The vehicular interior rearview mirror assembly of claim 5, wherein said personalized cap portion comprises indicia, and wherein said indicia comprises at least one selected from the group consisting of (i) a logo, (ii) a school logo, (iii) a sponsorship identification, (iv) an affiliation emblem and (v) a mascot.

7. The vehicular interior rearview mirror assembly of claim 1, wherein said vehicular interior rearview mirror assembly houses a visual indicator that, when actuated to emit visible light, is viewable by the driver of the equipped vehicle.

8. The vehicular interior rearview mirror assembly of claim 1, wherein said prismatic mirror reflective element has a length dimension and a width dimension, and wherein said length dimension spans laterally across said prismatic mirror reflective element and said width dimension spans vertically across said prismatic mirror reflective element when said vehicular interior rearview mirror assembly is normally mounted at the equipped vehicle, and wherein said plastic molding spans at least a portion of said width dimension of said prismatic mirror reflective element and spans at least a portion of said length dimension of said prismatic mirror reflective element.

9. The vehicular interior rearview mirror assembly of claim 1, wherein said prismatic mirror reflective element nests in said plastic molding.

10. The vehicular interior rearview mirror assembly of claim 1, wherein said plastic molding contacts said circumferential edge of said glass substrate.

11. The vehicular interior rearview mirror assembly of claim 1, wherein said prismatic mirror reflective element is attached at an attachment plate.

12. The vehicular interior rearview mirror assembly of claim 11, wherein a tape is adhered at a rear side of said prismatic mirror reflective element.

13. The vehicular interior rearview mirror assembly of claim 12, wherein the tape limits scattering of said glass substrate if the equipped vehicle is involved in an accident.

14. The vehicular interior rearview mirror assembly of claim 1, further comprising a plurality of individual indicating elements that, when individually actuated, visually indicate through said prismatic mirror reflective element to be viewed by the driver of the equipped vehicle, and wherein each of said plurality of individual indicating elements is spaced from and local to another of said plurality of individual indicating elements, and wherein said plurality of individual indicating elements comprises at least three individual indicating elements, and wherein said at least three individual indicating elements comprise first, second and third indicating elements that are generally linearly disposed to form a row of individual indicating elements at said prismatic mirror reflective element.

15. The vehicular interior rearview mirror assembly of claim 1, wherein said outer curved surface of the outermost part of said plastic molding provides a curved transition between said planar front surface of said glass substrate and a less-curved part of said plastic molding.

16. The vehicular interior rearview mirror assembly of claim 1, wherein the other part of said plastic molding is contiguous with said outer curved surface of the outermost part of said plastic molding.

17. The vehicular interior rearview mirror assembly of claim 1, wherein said mirror housing houses a toggle assembly, and wherein said toggle assembly comprises a pivot element configured to pivotally join with the mounting structure that is configured to mount said vehicular interior rearview mirror assembly at the interior portion of the equipped vehicle.

18. The vehicular interior rearview mirror assembly of claim 17, wherein said pivot element joins with a pivot element of the mounting structure to form a ball-and-socket joint which, with the mounting structure mounted at the interior portion of the equipped vehicle, allows movement of said mirror housing by the driver of the equipped vehicle to adjust said prismatic mirror reflective element to the driver's desired setting.

19. The vehicular interior rearview mirror assembly of claim 1, wherein said mirror housing houses at least one accessory behind said prismatic mirror reflective element.

20. The vehicular interior rearview mirror assembly of claim 1, further comprising a toggle mechanism that is actuatable to adjust said prismatic mirror reflective element.

21. The vehicular interior rearview mirror assembly of claim 20, wherein said toggle mechanism comprises a toggle assembly that is actuatable by the driver of the equipped vehicle to adjust said prismatic mirror reflective element.

22. The vehicular interior rearview mirror assembly of claim 21, wherein the mounting structure of said vehicular interior rearview mirror assembly comprises a first pivot element that forms a ball-and-socket joint with a pivot element of said toggle assembly.

23. The vehicular interior rearview mirror assembly of claim 22, wherein the mounting structure comprises a mounting base configured for attaching at the interior portion of the equipped vehicle.

24. The vehicular interior rearview mirror assembly of claim 23, wherein the interior portion of the equipped vehicle comprises an in-cabin windshield portion of a windshield of the equipped vehicle.

25. The vehicular interior rearview mirror assembly of claim 24, wherein the mounting base is configured to mount to a mirror mounting button attached at the in-cabin windshield portion of the windshield of the equipped vehicle.

26. The vehicular interior rearview mirror assembly of claim 25, wherein said vehicular interior rearview mirror assembly comprises a single ball-and-socket interior rearview mirror assembly.

27. The vehicular interior rearview mirror assembly of claim 25, wherein the mounting structure of said vehicular interior rearview mirror assembly comprises a second pivot element that forms a ball-and-socket joint with a pivot element of the mounting base.

28. The vehicular interior rearview mirror assembly of claim 27, wherein said vehicular interior rearview mirror assembly comprises a double ball-and-socket interior rearview mirror assembly.

29. The vehicular interior rearview mirror assembly of claim 1, further comprising a pivot element configured to pivotally join with the mounting structure that is configured to mount said vehicular interior rearview mirror assembly at the interior portion of a vehicle, and wherein said pivot element joins with a pivot element of the mounting structure to form a ball-and-socket joint which, with the mounting structure mounted at the interior portion of the equipped vehicle, allows movement by the driver of the equipped vehicle of said mirror housing to adjust said prismatic mirror reflective element to the driver's desired setting.

30. A vehicular interior rearview mirror assembly, said vehicular interior rearview mirror assembly comprising:
a prismatic mirror reflective element comprising a glass substrate having a planar front surface and a planar rear surface;
wherein said glass substrate comprises a circumferential edge around the periphery of said glass substrate;
said circumferential edge spanning a thickness dimension of said glass substrate between said planar front surface and said planar rear surface, and wherein said planar front surface of said glass substrate comprises an outermost surface of said prismatic mirror reflective element that is viewable by and is contactable by a driver of a vehicle equipped with said vehicular interior rearview mirror assembly;
wherein said prismatic mirror reflective element comprises a mirror reflector established at said planar rear surface of said glass substrate of said prismatic mirror reflective element;
a plastic molding;
wherein said plastic molding is circumferentially disposed around said circumferential edge of said glass substrate without overlapping said planar front surface of said glass substrate, and wherein the plane of said planar front surface of said glass substrate is generally flush with an outermost part of said plastic molding;
wherein, with said plastic molding circumferentially disposed around said circumferential edge of said glass substrate, the outermost part of said plastic molding provides a curved transition between said planar front surface of said prismatic mirror reflective element and another part of said plastic molding;
wherein the outermost part of said plastic molding providing the curved transition between said planar front surface of said prismatic mirror reflective element and the other part of said plastic molding comprises an outer curved surface;
wherein the outermost part of said plastic molding providing the curved transition between said planar front surface of said prismatic mirror reflective element and the other part of said plastic molding lacks an exposed sharp edge;
wherein the other part of said plastic molding is contiguous with said outer curved surface of the outermost part of said plastic molding;
wherein said plastic molding comprises a portion of a mirror housing of said vehicular interior rearview mirror assembly;
a mounting structure configured to mount said vehicular interior rearview mirror assembly at an interior portion of the equipped vehicle;
wherein, with the mounting structure mounted at the interior portion of the equipped vehicle and when said mirror housing is moved by the driver of the equipped vehicle to adjust said prismatic mirror reflective element to a driver's desired setting, said prismatic mirror reflective element moves in tandem with movement of said mirror housing; and
a toggle mechanism that, with the mounting structure mounted at the interior portion of the equipped vehicle, is actuatable by the driver of the equipped vehicle to adjust said prismatic mirror reflective element.

31. The vehicular interior rearview mirror assembly of claim 30, wherein said prismatic mirror reflective element nests in said plastic molding.

32. The vehicular interior rearview mirror assembly of claim 30, wherein said plastic molding contacts said circumferential edge of said glass substrate.

33. The vehicular interior rearview mirror assembly of claim 30, wherein said prismatic mirror reflective element is attached at an attachment plate.

34. The vehicular interior rearview mirror assembly of claim 33, wherein a tape is adhered at a rear side of said prismatic mirror reflective element.

35. The vehicular interior rearview mirror assembly of claim 34, wherein the tape limits scattering of said glass substrate if the equipped vehicle is involved in an accident.

36. The vehicular interior rearview mirror assembly of claim 30, wherein said outer curved surface of the outermost part of said plastic molding provides a curved transition between said planar front surface of said glass substrate and a less-curved part of said plastic molding.

37. The vehicular interior rearview mirror assembly of claim 30, wherein said mirror housing houses said toggle mechanism, and wherein said toggle mechanism comprises a pivot element configured to pivotally join with the mounting structure that is configured to mount said vehicular interior rearview mirror assembly at the interior portion of the equipped vehicle.

38. The vehicular interior rearview mirror assembly of claim 30, wherein the mounting structure of said vehicular interior rearview mirror assembly comprises a first pivot element that forms a ball-and-socket joint with a pivot element of said toggle mechanism.

39. The vehicular interior rearview mirror assembly of claim 38, wherein the mounting structure comprises a mounting base configured for attaching at the interior portion of the equipped vehicle.

40. The vehicular interior rearview mirror assembly of claim 39, wherein the interior portion of the equipped vehicle comprises an in-cabin windshield portion of a windshield of the equipped vehicle.

41. The vehicular interior rearview mirror assembly of claim 40, wherein the mounting base is configured to mount to a mirror mounting button attached at the in-cabin windshield portion of the windshield of the equipped vehicle.

42. The vehicular interior rearview mirror assembly of claim 41, wherein said vehicular interior rearview mirror assembly comprises a single ball-and-socket interior rearview mirror assembly.

43. The vehicular interior rearview mirror assembly of claim 41, wherein the mounting structure of said vehicular interior rearview mirror assembly comprises a second pivot element that forms a ball-and-socket joint with a pivot element of the mounting base.

44. The vehicular interior rearview mirror assembly of claim 43, wherein said vehicular interior rearview mirror assembly comprises a double ball-and-socket interior rearview mirror assembly.

45. The vehicular interior rearview mirror assembly of claim 30, further comprising a pivot element configured to pivotally join with the mounting structure that is configured to mount said vehicular interior rearview mirror assembly at the interior portion of a vehicle, and wherein said pivot element joins with a pivot element of the mounting structure to form a ball-and-socket joint which, with the mounting structure mounted at the interior portion of the equipped vehicle, allows movement by the driver of the equipped vehicle of said mirror housing to adjust said prismatic mirror reflective element to the driver's desired setting.

46. A vehicular interior rearview mirror assembly, said vehicular interior rearview mirror assembly comprising:
   a prismatic mirror reflective element comprising a glass substrate having a planar front surface and a planar rear surface;
   wherein said prismatic mirror reflective element is attached at an attachment plate;
   wherein said glass substrate comprises a circumferential edge around the periphery of said glass substrate;
   said circumferential edge spanning a thickness dimension of said glass substrate between said planar front surface and said planar rear surface, and wherein said planar front surface of said glass substrate comprises an outermost surface of said prismatic mirror reflective element that is viewable by and is contactable by a driver of a vehicle equipped with said vehicular interior rearview mirror assembly;
   wherein said prismatic mirror reflective element comprises a mirror reflector established at said planar rear surface of said glass substrate of said prismatic mirror reflective element;
   a plastic molding;
   wherein said plastic molding is circumferentially disposed around said circumferential edge of said glass substrate without overlapping said planar front surface of said glass substrate, and wherein the plane of said planar front surface of the said glass substrate is generally flush with an outermost part of said plastic molding;
   wherein, with said plastic molding circumferentially disposed around said circumferential edge of said glass substrate, the outermost part of said plastic molding provides a curved transition between said planar front surface of said prismatic mirror reflective element and another part of said plastic molding;
   wherein the outermost part of said plastic molding providing the curved transition between said planar front surface of said prismatic mirror reflective element and the other part of said plastic molding comprises an outer curved surface;
   wherein the outermost part of said plastic molding providing the curved transition between said planar front surface of said prismatic mirror reflective element and the other part of said plastic molding lacks an exposed sharp edge;
   wherein said plastic molding comprises a portion of a mirror housing of said vehicular interior rearview mirror assembly;
   a mounting structure configured to mount said vehicular interior rearview mirror assembly at an interior portion of the equipped vehicle;
   wherein, with the mounting structure mounted at the interior portion of the equipped vehicle and when said mirror housing is moved by the driver of the equipped vehicle to adjust said prismatic mirror reflective element to a driver's desired setting, said prismatic mirror reflective element moves in tandem with movement of said mirror housing;
   a toggle mechanism that is actuatable to adjust said prismatic mirror reflective element;
   wherein said toggle mechanism comprises a toggle assembly that is actuatable by the driver of the equipped vehicle to adjust said prismatic mirror reflective element;
   wherein the mounting structure of said vehicular interior rearview mirror assembly comprises a first pivot element that forms a ball-and-socket joint with a pivot element of said toggle assembly;
   wherein the mounting structure comprises a mounting base configured for attaching at the interior portion of the equipped vehicle; and
   wherein the interior portion of the equipped vehicle comprises an in-cabin windshield portion of a windshield of the equipped vehicle.

47. The vehicular interior rearview mirror assembly of claim 46, wherein said prismatic mirror reflective element nests in said plastic molding.

48. The vehicular interior rearview mirror assembly of claim 46, wherein said plastic molding contacts said circumferential edge of said glass substrate.

49. The vehicular interior rearview mirror assembly of claim 46, wherein a tape is adhered at a rear side of said prismatic mirror reflective element, and wherein the tape limits scattering of said glass substrate if the equipped vehicle is involved in an accident.

50. The vehicular interior rearview mirror assembly of claim 46, further comprising a plurality of individual indicating elements that, when individually actuated, visually indicate through said prismatic mirror reflective element to be viewed by the driver of the equipped vehicle, and wherein each of said plurality of individual indicating elements is spaced from and local to another of said plurality of individual indicating elements, and wherein said plurality of individual indicating elements comprises at least three individual indicating elements, and wherein said at least three individual indicating elements comprise first, second and third indicating elements that are generally linearly disposed to form a row of individual indicating elements at said prismatic mirror reflective element.

51. The vehicular interior rearview mirror assembly of claim 46, wherein said outer curved surface of the outermost part of said plastic molding provides a curved transition between said planar front surface of said glass substrate and a less-curved part of said plastic molding.

52. The vehicular interior rearview mirror assembly of claim 46, wherein the other part of said plastic molding is contiguous with said outer curved surface of the outermost part of said plastic molding.

53. The vehicular interior rearview mirror assembly of claim 46, wherein the mounting base is configured to mount to a mirror mounting button attached at the in-cabin windshield portion of the windshield of the equipped vehicle.

54. The vehicular interior rearview mirror assembly of claim 46, wherein said vehicular interior rearview mirror assembly comprises a single ball-and-socket interior rearview mirror assembly.

55. The vehicular interior rearview mirror assembly of claim 46, wherein the mounting structure of said vehicular interior rearview mirror assembly comprises a second pivot element that forms a ball-and-socket joint with a pivot element of the mounting base.

56. The vehicular interior rearview mirror assembly of claim 55, wherein said vehicular interior rearview mirror assembly comprises a double ball-and-socket interior rearview mirror assembly.

* * * * *